US011989400B2

(12) United States Patent
Hu et al.

(10) Patent No.: US 11,989,400 B2
(45) Date of Patent: May 21, 2024

(54) DATA SHARING METHOD AND DEVICE

(71) Applicant: Huawei Technologies Co., Ltd., Shenzhen (CN)

(72) Inventors: Zhikun Hu, Shanghai (CN); Feng He, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/906,709

(22) PCT Filed: Mar. 22, 2021

(86) PCT No.: PCT/CN2021/082093
§ 371 (c)(1),
(2) Date: Sep. 19, 2022

(87) PCT Pub. No.: WO2021/185375
PCT Pub. Date: Sep. 23, 2021

(65) Prior Publication Data
US 2023/0141166 A1 May 11, 2023

(30) Foreign Application Priority Data

Mar. 20, 2020 (CN) .......................... 202010203171.X
Mar. 26, 2020 (CN) .......................... 202010225568.9

(51) Int. Cl.
*G06F 3/04845* (2022.01)
*G06F 3/0488* (2022.01)
(Continued)

(52) U.S. Cl.
CPC ........ *G06F 3/04845* (2013.01); *G06F 3/0488* (2013.01); *G06T 19/006* (2013.01); *H04L 67/12* (2013.01)

(58) Field of Classification Search
CPC .. G06F 3/04845; G06F 3/0488; G06F 16/587; G06F 21/31; G06F 3/011;
(Continued)

(56) References Cited

U.S. PATENT DOCUMENTS 10,212,157 B2 2/2019 Dolan et al.
2012/0210254 A1 8/2012 Fukuchi et al.
(Continued)

FOREIGN PATENT DOCUMENTS

CN 103873510 A 6/2014
CN 105373306 A 3/2016
CN 107340870 A 11/2017

*Primary Examiner* — Angie Badawi
(74) *Attorney, Agent, or Firm* — Slater Matsil, LLP

(57) ABSTRACT

A data sharing method and a device are provided. A first image is obtained by integrating a first 3D identifier and a second 3D identifier of a digital world into an image of a real world captured by a camera and performing AR rendering, the first 3D identifier is used to identify at least a building, a plant, or a mountain scenery in the real world, and the second 3D identifier is used to identify a first user in the first image. The first device displays one or a plurality of virtual objects in response to a second operation. In response to a sliding operation of which a start point of a sliding track is a first virtual object and an end point is an image of the first user, a server is requested to transmit the first virtual object to a second device.

19 Claims, 38 Drawing Sheets

(51) Int. Cl.
  *G06T 19/00*     (2011.01)
  *H04L 67/12*     (2022.01)
(58) Field of Classification Search
  CPC . G06F 3/0486; G06F 3/04883; G06T 19/006;
      H04L 67/12; H04M 2250/52; G06Q
      30/0241; G06Q 30/0643; G06Q 50/01;
      G06V 20/20; G06V 40/00; H04W 4/029
  See application file for complete search history.

(56)      References Cited

U.S. PATENT DOCUMENTS

2013/0042296 A1    2/2013  Hastings et al.
  2018/0139203 A1    5/2018  Dolan et al.
  2019/0371028 A1*  12/2019  Harrises ................ G06V 20/20

* cited by examiner (a)

(b)

TO

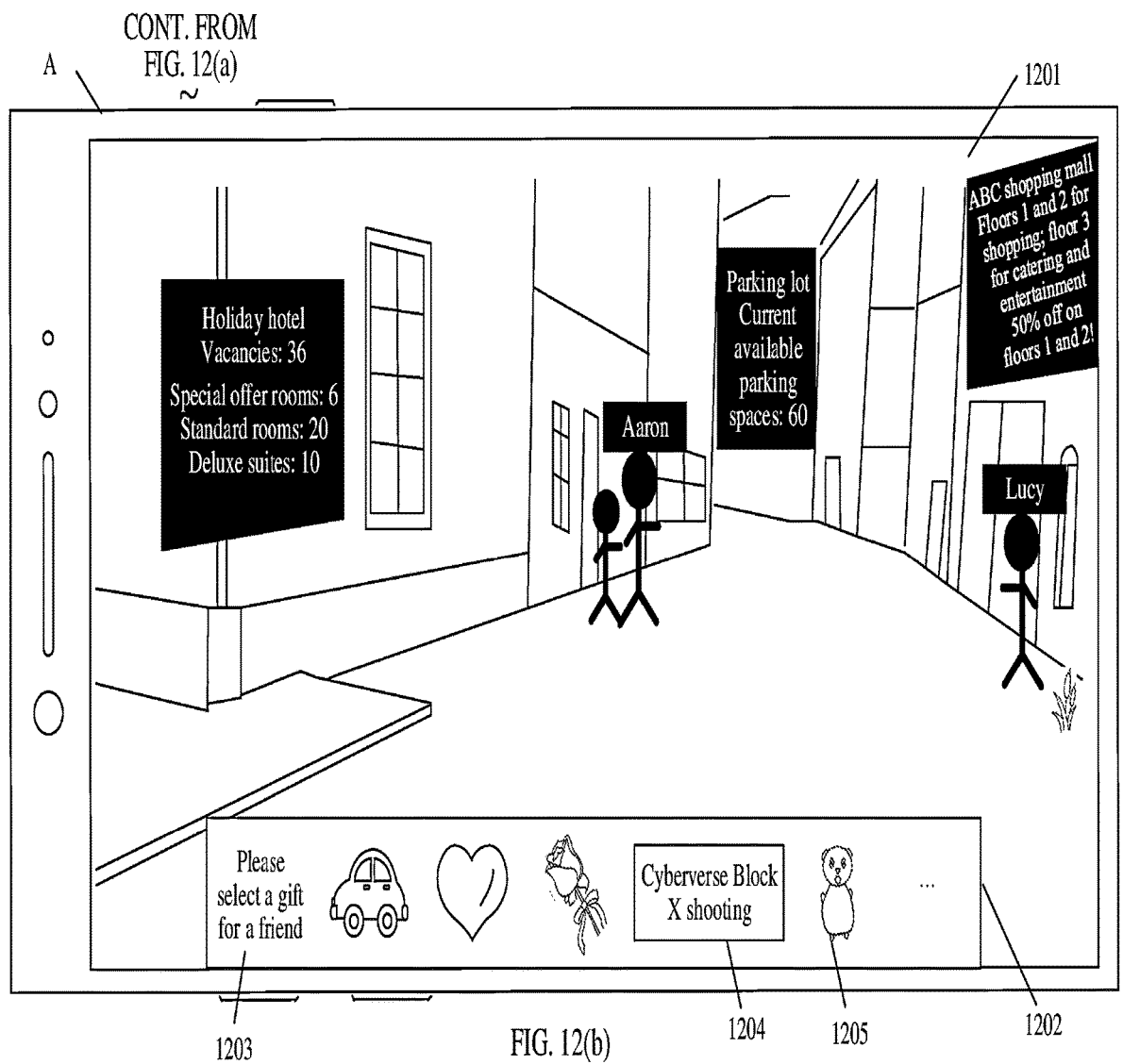

TO

| CONT. FROM FIG. 16A-1 | CONT. FROM FIG. 16A-1 | CONT. FROM FIG. 16A-1 |
|---|---|---|

S1007: Send a first push message, where the first push message includes a first ID and the first virtual object →

S1008: The mobile phone B receives the first push message from the server C, and displays a first interface, where the first interface is used to indicate that the mobile phone B receives the first virtual object from the first ID S1601: The mobile phone B sends a first push response to the server C in response to a third operation of the user b on the first interface, where the first push response is used to indicate the mobile phone B to accept the first virtual object shared by the mobile phone A ←

S1602: The server C receives the first push response from the mobile phone B, deletes an identifier of the first virtual object from first virtual information (that is, virtual information of the first ID), and adds the identifier of the first virtual object to second virtual information (that is, virtual information of the second ID)

← S1603: First sharing result

| TO FIG. 16A-3 | TO FIG. 16A-3 | TO FIG. 16A-3 |
|---|---|---|

FIG. 16A-2

CONT.
FROM
FIG. 16A-2

CONT.
FROM
FIG. 16A-2

CONT.
FROM
FIG. 16A-2

S1604: The mobile phone A receives the first sharing result from the server C, and sends first prompt information, where the first prompt information is used to indicate that the first virtual object is successfully shared S1605: The mobile phone B sends a second push response to the server C in response to a fourth operation of the user b on the first interface, where the second push response is used to indicate the mobile phone B to reject the first virtual object shared by the mobile phone A S1606: The server C receives the second push response from the mobile phone B, and the server C does not modify the first virtual information and the second virtual information S1607: Second sharing result S1608: The mobile phone A receives the second sharing result from the server C, and sends second prompt information, where the second prompt information is used to indicate that the first virtual object fails to be shared

FIG. 16A-3

When performing image shooting in Block X, Bob turns 10° rightwards at a current location in Block X

TO

After receiving a shooting file (that is, a virtual object) shared by a user a at home, Lucy turns 10° rightwards at a current location at home

TO

DATA SHARING METHOD AND DEVICE

CROSS-REFERENCE TO RELATED APPLICATIONS

This application is a national stage of International Application No. PCT/CN2021/082093, filed on Mar. 22, 2021, which claims priority to Chinese Patent Application No. 202010203171.X, filed on Mar. 20, 2020 and Chinese Patent Application No. 202010225568.9, filed on Mar. 26, 2020. All of the aforementioned applications are hereby incorporated by reference in their entireties.

TECHNICAL FIELD

Embodiments of this application relate to the field of communication technologies and augmented reality (augmented reality, AR)/virtual reality (virtual reality, VR) technologies, and in particular, to a data sharing method and a device.

BACKGROUND

With development of communication technologies, there are an increasing quantity of manners of sharing data between electronic devices. For example, social software may be installed in electronic devices, and the electronic devices may share data with each other by using the social software. For example, the data that can be shared between the electronic devices may include a file, an image, a message, or the like.

Two electronic devices (for example, a mobile phone A and a mobile phone B) may share data with each other by using social software in the following manner: A user of the mobile phone A and a user of the mobile phone B operate respective devices and add each other as friends in the social software. The mobile phone A and the mobile phone B establish a session in the social software. The mobile phone A loads, in response to an operation of the user, to-be-shared data (for example, an image) to a dialog box corresponding to the session. The mobile phone A shares the image with the mobile phone B in response to a sharing operation (for example, an operation of tapping a "share" or "send" button) of the user.

In the foregoing data sharing solution, there is much UI interaction between an electronic device and a user, and the data sharing solution is not applicable to data sharing in an AR/VR scenario. For example, in the AR/VR scenario, an electronic device needs to display a large amount of AR/VR scenario information. If the foregoing solution is used for data sharing in the AR/VR scenario, excessive UI interaction may affect display of the AR/VR scenario information, and affect display effects of the AR/VR scenario information.

SUMMARY

This application provides a data sharing method and a device, to reduce UI interaction for data sharing in an AR/VR scenario, thereby ensuring display effects of information in the AR/VR scenario.

According to a first aspect, this application provides a data sharing method. The method may be used by a first device to share data with a second device. A first application (application, app) is installed on the first device. The first app is used to provide a digital world that is in a 1:1 correspondence with a real world. For example, the first app may be a Cyberverse (Cyberverse) app. The first device logs in to a first account in the first app.

The first device may receive a first operation of a user. The first operation is used to trigger the first device to start the first app. The first device may display a first image in response to the first operation. The first image is obtained by integrating a plurality of pieces of 3D identification information of the digital world into a second image of the real world captured by a camera of the first device and performing AR rendering. The plurality of pieces of 3D identification information include a first 3D identifier and a second 3D identifier. The first 3D identifier is used to identify at least a building, a plant, or a mountain scenery in the real world. The first image and the second image include an image of a first user, and the second 3D identifier is used to identify the first user. It may be understood that the first image displayed by the first device is a virtual-reality integrated image obtained by fusing an image of the real world and a 3D identifier of the digital world.

The first device may receive a second operation of the user. The first device may display one or a plurality of virtual objects in response to the second operation. The one or the plurality of virtual objects may include: an image or a file in the first device, and a virtual model or an emoticon that is provided by a server of the first app and that is used for mutual sharing between different accounts of the first app.

The first device may further receive a first sliding operation of the user. A start point of a sliding track of the first sliding operation is a first virtual object in the plurality of virtual objects, and an end point is the image of the first user. In response to the first sliding operation, the first device may display a dynamic image of the first virtual object moving towards the image of the first user along the sliding track. The first device may further request the server to transmit the first virtual object to the second device logging in to a second account. The second account is an account associated with the first user.

The start point of the sliding track of the first sliding operation is the first virtual object, which indicates that the user (for example, a second user) selects the first virtual object as to-be-shared data. The end point of the sliding track of the first sliding operation is the image of the first user, which indicates that the second user selects the first user as a destination end for receiving the first virtual object. That is, the first user wants to share the first virtual object with the second user.

In the method in this application, the first device can present, to the user by using the Cyberverse app, a virtual-reality integrated image (namely, the first image) obtained after AR rendering is performed on the real world wherever the user goes, so that the user can easily learn of various information in a surrounding real scenario.

According to this solution, the first device can implement sharing of a virtual object in response to a parabolic operation pointing to an image of a target user. This can reduce UI interaction for data sharing in an AR/VR scenario, thereby ensuring display effects of information in the AR/VR scenario. In addition, by using the foregoing solution, a visualization feature of an AR/VR platform provided by the Cyberverse app for the real world can be fully demonstrated, and a visualized data sharing service in the real world can be provided for the user.

Further, if the first user who has registered an account with the Cyberverse app exists in a field of view of the camera of the first device, the first image may include the second 3D identifier of the first user. The second 3D identifier of the first user may identify the first user, so that the user using the first device can identify and select the target user.

In a possible design of the first aspect, in response to the first operation, the first device may capture the second image by using the camera, and collect data by using a preset sensor. The preset sensor includes at least one of a gyroscope sensor and an acceleration sensor, and a global positioning system (Global Positioning System, GPS) positioning sensor. Then, the first device may obtain location information and posture information of the first device based on the second image and the data collected by the preset sensor. The posture information of the first device is used to indicate a spatial posture of the first device. Then, the first device may obtain, from the server, a 3D model of the digital world corresponding to the location information and the posture information of the first device. The 3D model of the digital world includes the first 3D identifier and garage kit data of an object identified by the first 3D identifier. The garage kit data is used to indicate a three-dimensional structure of the object identified by the first 3D identifier. The 3D model of the digital world is created based on 3D data of the real world. The first device may further obtain the second 3D identifier from the server based on a user biometric feature of the first user in the second image. The user biometric feature includes a face image or iris information. Finally, the first device may integrate the first 3D identifier and the second 3D identifier into the second image based on the 3D model of the digital world, and the location information and the posture information of the first device, perform AR rendering to obtain the first image, and display the first image.

It may be understood that if the spatial posture space (including the location information and the posture information) of the first device is different, the image of the real world (that is, the second image) captured by the camera of the first device is different. Therefore, the spatial posture space of the first device may affect an image of the real world captured by a camera of a mobile phone A. On the contrary, the first device may calculate spatial posture information of the mobile phone A by using the second image.

In this application, the 3D data (for example, 3D building data) of the real world may be collected, and the 3D model of the real world is constructed based on the 3D data. For example, the 3D building data may include location contour coordinates, height information, and the like of a building. In addition, the 3D model of the digital world that is in a 1:1 correspondence with the real world may be further constructed. In the 3D model of the digital world, 3D identifiers, that is, first 3D identifiers, of a plurality of objects (such as a building, a plant, or a mountain scenery) in the real world are added. For example, the first 3D identifier may include at least information such as a building name, merchant information, a user comment, or advertisement information. According to model data of the 3D model of the digital world, an object identified by the first 3D identifier in the real world, a display position of the first 3D identifier in an image of the real world, and the like may be determined. Therefore, the first device may integrate the first 3D identifier into the second image based on the 3D model of the digital world, and the location information and the posture information of the first device.

The first 3D identifier of the digital world is integrated into the image (that is, the second image) of the real world based on the 3D model of the digital world that is in a 1:1 correspondence with the real world. On a premise of actually restoring the image of the real world, related information (for example, the first 3D identifier) of the digital world may be added to the image of the real world. In this way, display effects of the first device in the AR/VR scenario can be improved, and visual experience of the user can be improved.

In another possible design of the first aspect, the first device may obtain the location information and the posture information of the first device from the server based on the second image and the data collected by the preset sensor. Specifically, the first device may send, to the server, the second image and the data collected by the preset sensor. The server may perform spatial computing based on the second image and the data collected by the preset sensor, to determine the location information and the posture information, and then send the location information and the posture information to the first device. In this way, the first device may receive the location information and the posture information of the first device from the server.

In this application, an error of location information (for example, GPS information) obtained by the first device is large, and the error may range from 10 meters to 40 meters. The server may determine the location information of the first device based on the data collected by the preset sensor and the second image, and an error of the location information determined by the server is at a centimeter level. In this way, accuracy of the location information and the posture information can be improved.

In another possible design of the first aspect, the first device may obtain the user biometric feature in the second image, and then obtain the second 3D identifier from the server based on the user biometric feature. Specifically, the first device may obtain the user biometric feature in the second image, and then send the user biometric feature to the server. The server may query the account (for example, the second account) associated with the first user and corresponding to the user biometric feature, and then send the second account and the second 3D identifier of the second account to the first device. The first device may receive the second account and the second 3D identifier of the second account from the server.

In another possible design of the first aspect, the first device may send the second image to the server. The second image includes the user biometric feature. The server queries the account (for example, the second account) associated with the first user and corresponding to the user biometric feature, and then sends the second account and the second 3D identifier of the second account to the first device. The first device may receive the second account and the second 3D identifier of the second account from the server. In this way, power consumption of the first device can be reduced.

In another possible design of the first aspect, a location of the second 3D identifier in the first image may be preset based on a location of the user biometric feature in the second image. Alternatively, a location of the second 3D identifier in the first image is determined based on location information of the second device. The location information of the second device may be obtained by the first device from the server.

In another possible design of the first aspect, that the first device displays one or a plurality of virtual objects in response to a second operation may include: The first device obtains first virtual information in response to the second operation; and the first device displays the one or the plurality of virtual objects indicated by the first virtual information. The first virtual information includes an identifier of a virtual object downloaded by the first account from the server, and/or an identifier of a virtual object shared by another account with the first account.

In this design, the first device may store the first virtual information. The first virtual information may be obtained from the server when the first device logs in to the first account. Alternatively, the first device may obtain the first virtual information from the server in response to the second operation.

In another possible design of the first aspect, the method further includes: The first device deletes an identifier of the first virtual object from the first virtual information in response to the first sliding operation. The first device may delete the identifier of the first virtual object from the first virtual information stored in the first device. The first device may further request the server to delete the identifier of the first virtual object from the first virtual information stored in the server.

In another possible design of the first aspect, after the first device requests the server to transmit the first virtual object to the second device logging in to the second account, the method further includes: The first device receives a first sharing result from the server. The first sharing result is used to indicate that the second device accepts the first virtual object. The first device sends first prompt information. The first prompt information is used to indicate that the first virtual object is successfully shared.

In this design, the first device sends the first prompt information, to prompt the user that the first virtual object is successfully shared, so that the user can learn of a sharing status (for example, the sharing succeeds) of the first virtual object. In this way, user experience of the first app may be prompted.

In another possible design of the first aspect, the method further includes: The first device receives a second sharing result from the server. The second sharing result is used to indicate that the second device rejects the first virtual object. The first device sends second prompt information. The second prompt information is used to indicate that the first virtual object fails to be shared.

In this design, the first device sends the first prompt information, to prompt the user that the first virtual object is successfully shared, so that the user can learn of a sharing status (for example, the sharing fails) of the first virtual object. In this way, user experience of the first app may be prompted.

In another possible design of the first aspect, the method further includes: The first device displays a user biometric feature recording interface in response to a first event. The user biometric feature includes a face image or iris information. The first device receives a user biometric feature of a second user that is entered by the second user on the user biometric feature recording interface. The first device sends the first account and the user biometric feature of the second user to the server.

It may be understood that the user biometric feature of the second user may be used by another electronic device (for example, the second device) to identify the user of the first device (that is, the second user), and the second 3D identifier of the second user is displayed in the virtual-reality integrated image displayed by the second device.

According to a second aspect, this application provides a data sharing method. The method may be used by a first device to share data with a second device. A first app is installed on both the first device and the second device. The first app is used to provide a digital world that is in a 1:1 correspondence with a real world.

A server may obtain location information and posture information of the first device, and obtain a user biometric feature of a first user in a second image that is of a real scene and that is captured by the first device. The user biometric feature includes a face image or iris information. The posture information is used to indicate a spatial posture of the first device. The server may send, to the first device, a second 3D identifier and a 3D model of the digital world corresponding to the location information and the posture information. The 3D model of the digital world includes a first 3D identifier and garage kit data of an object identified by the first 3D identifier. The server may receive a first request message from the first device. The first request message includes a first account logged in to by the first device in the first app, a first virtual object, and a second account. The second account is associated with the first user. The first request message is triggered in response to a first sliding operation of a user on a first image. A start point of a sliding track of the first sliding operation is the first virtual object, and an end point is an image of the first user. Finally, the server may send a first push message to the second device logging in to the second account. The first push message includes the first account and the first virtual object.

It should be noted that, for detailed descriptions of the garage kit data, the first 3D identifier, the second 3D identifier, and the first virtual object, refer to the descriptions in the first aspect and any possible design of the first aspect.

In this application, the server may obtain, based on the location information of the first device and the user biometric feature of the first user in the second image, the 3D model of the digital world corresponding to the location information and the second 3D identifier of the first user corresponding to the user biometric identifier, and send the 3D model and the second 3D identifier to the first device.

In this way, the first device may integrate the first 3D identifier and the second 3D identifier into the second image and perform AR rendering to obtain the virtual-reality integrated first image. The first device may send the first request message to the server in response to the first sliding operation of the user on the first image, to request the server to push the first virtual object to the second account that is associated with the first user and indicated by the end point of the sliding track of the first sliding operation.

In other words, the server may support the first device in presenting, by using the Cyberverse app, the virtual-reality integrated image (namely, the first image) obtained after AR rendering is performed on the real world, so that the user can easily learn of various information in a surrounding real scenario.

In addition, according to this solution, the server can support the first device in implementing sharing of a virtual object in response to a parabolic operation pointing to an image of a target user. This can reduce UI interaction for data sharing in an AR/VR scenario, thereby ensuring display effects of information in the AR/VR scenario. In addition, by using the foregoing solution, a visualization feature of an AR/VR platform provided by the Cyberverse app for the real world can be fully demonstrated, and a visualized data sharing service in the real world can be provided for the user.

In a possible design of the second aspect, a method for obtaining the location information and the posture information of the first device by the server may include: The server receives the second image from the first device and data collected by a preset sensor of the first device; and performs spatial computing based on the second image and the data collected by the preset sensor, to determine the location information and the posture information.

In this application, an error of location information (for example, GPS information) obtained by the first device is large, and the error may range from 10 meters to 40 meters. The server may determine the location information of the first device based on the data collected by the preset sensor and the second image, and an error of the location information determined by the server is at a centimeter level. In this way, the server obtains the location information and the posture information of the first device, so that accuracy of the location information and the posture information can be improved.

In another possible design of the second aspect, before the server receives the location information from the first device, the method may further include: The server receives the second account and the user biometric feature from the second device; and the server stores the user biometric feature based on the second account.

It may be understood that the user biometric feature of the first user may be used by another electronic device (for example, the first device) to identify the user of the second device (that is, the first user), and the second 3D identifier of the first user is displayed in the virtual-reality integrated image displayed by the first device.

In another possible design of the second aspect, after the server sends the first push message to the second device, the method further includes: The server receives a first push response from the second device. The first push response is used to indicate that the second device accepts the first virtual object. Alternatively, the server receives a second push response from the second device. The second push response is used to indicate that the second device rejects the first virtual object.

In this design, the server may determine a sharing status (for example, sharing succeeds or sharing fails) of the first virtual object based on the first push response or the second push response.

In another possible design of the second aspect, the server stores first virtual information and second virtual information. The first virtual information includes an identifier of a virtual object downloaded by the first account from the server, and/or an identifier of a virtual object shared by another account with the first account. The second virtual information includes an identifier of a virtual object downloaded by the second account from the server, and/or an identifier of a virtual object shared by another account with the second account.

It may be understood that the server may generate and update virtual information of each account (for example, the first virtual information of the first account) based on records of downloading virtual objects from the server by accounts and records of sharing virtual objects between the accounts.

In another possible design of the second aspect, the method further includes: In response to the first push response, the server deletes an identifier of the first virtual object from the first virtual information, and adds the identifier of the first virtual object to the second virtual information.

The first push response is used to indicate that the second device accepts the first virtual object, that is, the first virtual object is successfully shared. In this case, the first virtual object belongs to the second account. Therefore, the server may delete the identifier of the first virtual object from the first virtual information, and add the identifier of the first virtual object to the second virtual information.

In another possible design of the second aspect, the method further includes: In response to the first request message, the server deletes the identifier of the first virtual object from the first virtual information, and adds the identifier of the first virtual object to the second virtual information.

In this design, regardless of whether the first virtual object is successfully shared, in response to the first request message, the server may determine that the first virtual object belongs to the second account. Therefore, the server may delete the identifier of the first virtual object from the first virtual information, and add the identifier of the first virtual object to the second virtual information.

In another possible design of the second aspect, in response to the first request message, after the server deletes the identifier of the first virtual object from the first virtual information, and adds the identifier of the first virtual object to the second virtual information, the server may receive the second push response. In this case, the first virtual object fails to be shared. In this case, in response to the second push response, the server may add the identifier of the first virtual object to the first virtual information, and delete the identifier of the first virtual object from the second virtual information. In this case, the first virtual object still belongs to the first account.

According to a third aspect, this application provides an electronic device. The electronic device is a first device, a first app is installed on the first device, and the first app is used to provide a digital world that is in a 1:1 correspondence with a real world. The first device logs in to a first account in the first app. The first device includes a wireless communication module, a memory, a display, a camera, and one or more processors. The wireless communication module, the memory, the display, and the camera are coupled to the processor. The memory is configured to store computer program code. The computer program code includes computer instructions.

When the computer instructions are executed by the processor, the first device is enabled to perform the following operations: receiving a first operation of a user, where the first operation is used to trigger the first device to start the first app; displaying a first image in response to the first operation, where the first image is obtained by integrating a plurality of pieces of 3D identification information of the digital world into a second image of the real world captured by the camera and performing augmented reality AR rendering, the first image and the second image include an image of a first user, the plurality of pieces of 3D identification information include a first 3D identifier and a second 3D identifier, the first 3D identifier is used to identify at least a building, a plant, or a mountain scenery in the real world, and the second 3D identifier is used to identify the first user; receiving a second operation of the user; displaying one or a plurality of virtual objects in response to the second operation, where the one or the plurality of virtual objects include: an image or a file in the first device, and a virtual model or an emoticon that is provided by a server of the first app and that is used for mutual sharing between different accounts of the first app; receiving a first sliding operation of the user, where a start point of a sliding track of the first sliding operation is a first virtual object in the plurality of virtual objects, and an end point is the image of the first user; in response to the first sliding operation, displaying a dynamic image of the first virtual object moving towards the image of the first user along the sliding track; and requesting the server to transmit the first virtual object to a second device logging in to a second account, where the second account is an account associated with the first user.

In a possible design of the third aspect, when the computer instructions are executed by the processor, the first device is enabled to further perform the following steps: in response to the first operation, capturing the second image by using the camera, and collecting data by using a preset sensor; obtaining location information and posture information of the first device based on the second image and the data collected by the preset sensor, where the posture information of the first device is used to indicate a spatial posture of the first device; obtaining, from the server, a 3D model of the digital world corresponding to the location information and the posture information of the first device; obtaining the second 3D identifier from the server based on a user biometric feature of the first user in the second image; and integrating the first 3D identifier and the second 3D identifier into the second image based on the 3D model of the digital world, and the location information and the posture information of the first device, performing AR rendering to obtain the first image, and displaying the first image.

The preset sensor includes at least one of a gyroscope sensor and an acceleration sensor, and a GPS positioning sensor. The 3D model of the digital world includes the first 3D identifier and garage kit data of an object identified by the first 3D identifier. The garage kit data is used to indicate a three-dimensional structure of the object identified by the first 3D identifier. The 3D model of the digital world is created based on 3D data of the real world. The user biometric feature includes a face image or iris information.

In another possible design of the third aspect, when the computer instructions are executed by the processor, the first device is enabled to further perform the following steps: sending, to the server, the second image and the data collected by the preset sensor; and receiving the location information and the posture information of the first device from the server. The location information and the posture information of the first device is determined by performing spatial computing based on the second image and the data collected by the preset sensor.

In another possible design of the third aspect, when the computer instructions are executed by the processor, the first device is enabled to further perform the following steps: obtaining the user biometric feature in the second image; sending the user biometric feature to the server; and receiving the second account and the second 3D identifier of the second account from the server, where the second account is an account that is associated with the first user and that is corresponding to the user biometric feature.

In another possible design of the third aspect, when the computer instructions are executed by the processor, the first device is enabled to further perform the following steps: sending the second image to the server, where the second image includes the user biometric feature; and receiving the second account and the second 3D identifier of the second account from the server, where the second account is an account that is associated with the first user and that is corresponding to the user biometric feature.

In another possible design of the third aspect, a location of the second 3D identifier in the first image is preset based on a location of the user biometric feature in the second image. Alternatively, a location of the second 3D identifier in the first image is determined based on location information of the second device, and the location information of the second device is obtained by the first device from the server.

In another possible design of the third aspect, when the computer instructions are executed by the processor, the first device is enabled to further perform the following steps: obtaining first virtual information in response to the second operation, where the first virtual information includes an identifier of a virtual object downloaded by the first account from the server, and/or an identifier of a virtual object shared by another account with the first account; and displaying the one or the plurality of virtual objects indicated by the first virtual information.

In another possible design of the third aspect, when the computer instructions are executed by the processor, the first device is enabled to further perform the following steps: obtaining, from the first device, the first virtual information stored by the memory based on the first account of the first app; or obtaining, from the server based on the first account, the first virtual information stored by the server based on the first account.

In another possible design of the third aspect, when the computer instructions are executed by the processor, the first device is enabled to further perform the following step: deleting an identifier of the first virtual object from the first virtual information in response to the first sliding operation.

In another possible design of the third aspect, when the computer instructions are executed by the processor, the first device is enabled to further perform the following steps: after requesting the server to transmit the first virtual object to the second device logging in to the second account, receiving a first sharing result from the server, where the first sharing result is used to indicate that the second device accepts the first virtual object; and sending first prompt information, where the first prompt information is used to indicate that the first virtual object is successfully shared.

In another possible design of the third aspect, when the computer instructions are executed by the processor, the first device is enabled to further perform the following steps: receiving a second sharing result from the server, where the second sharing result is used to indicate that the second device rejects the first virtual object; and sending second prompt information, where the second prompt information is used to indicate that the first virtual object fails to be shared.

In another possible design of the third aspect, when the computer instructions are executed by the processor, the first device is enabled to further perform the following steps: displaying a user biometric feature recording interface in response to a first event, where the user biometric feature includes a face image or iris information; receiving, by the first device, a user biometric feature of a second user that is entered by the second user on the user biometric feature recording interface; and sending the first account and the user biometric feature of the second user to the server.

According to a fourth aspect, this application provides a server. The server is a server of a first app, and the first app is used to provide a digital world that is in a 1:1 correspondence with a real world. The server includes a wireless communication module, a memory, and one or more processors, and the wireless communication module and the memory are coupled to the processor. The memory is configured to store computer program code. The computer program code includes computer instructions.

When the computer instructions are executed by the processor, the server is enabled to perform the following operations: obtaining location information and posture information of a first device, and obtaining a user biometric feature of a first user in a second image that is of a real scene and that is captured by the first device; sending, to the first device, a second 3D identifier and a 3D model of the digital world corresponding to the location information and the posture information; receiving a first request message from the first device, where the first request message includes a first account logged in to by the first device in the first app, a first virtual object, and a second account, and the second account is associated with the first user; and sending a first push message to the second device logging in to the second account, where the first push message includes the first account and the first virtual object.

It should be noted that, for detailed descriptions of the posture information, the user biometric feature, the 3D model of the digital world, the second 3D identifier, the first 3D identifier, the first request message, and the first virtual object, refer to the descriptions in the second aspect and possible designs of the second aspect. Details are not described herein again.

In a possible design of the fourth aspect, when the computer instructions are executed by the processor, the server is further enabled to perform the following steps: receiving the second image from the first device and data collected by a preset sensor of the first device; and performing spatial computing based on the second image and the data collected by the preset sensor, to determine the location information and the posture information.

In another possible design of the fourth aspect, when the computer instructions are executed by the processor, the server is further enabled to perform the following steps: before receiving the location information from the first device, receiving the second account and the user biometric feature from the second device; and storing the user biometric feature based on the second account.

In another possible design of the fourth aspect, when the computer instructions are executed by the processor, the server is further enabled to perform the following steps: after sending the first push message to the second device logging in to the second account in the first app, receiving a first push response from the second device, where the first push response is used to indicate that the second device accepts the first virtual object; or receiving a second push response from the second device, where the second push response is used to indicate that the second device rejects the first virtual object.

In another possible design of the fourth aspect, the memory stores first virtual information and second virtual information. The first virtual information includes an identifier of a virtual object downloaded by the first account from the server, and/or an identifier of a virtual object shared by another account with the first account. The second virtual information includes an identifier of a virtual object downloaded by the second account from the server, and/or an identifier of a virtual object shared by another account with the second account.

In another possible design of the fourth aspect, when the computer instructions are executed by the processor, the server is further enabled to perform the following step: in response to the first push response, deleting an identifier of the first virtual object from the first virtual information, and adding the identifier of the first virtual object to the second virtual information.

In another possible design of the fourth aspect, when the computer instructions are executed by the processor, the server is further enabled to perform the following step: in response to the first request message, deleting the identifier of the first virtual object from the first virtual information, and adding the identifier of the first virtual object to the second virtual information.

In another possible design of the fourth aspect, when the computer instructions are executed by the processor, the server is further enabled to perform the following step: in response to the second push response, adding the identifier of the first virtual object to the first virtual information, and deleting the identifier of the first virtual object from the second virtual information.

According to a fifth aspect, this application provides a chip system. The chip system may be applied to an electronic device including a wireless communication module, a memory, and a display. The chip system includes one or more interface circuits and one or more processors. The interface circuit and the processor are connected through a line. The interface circuit is configured to: receive a signal from the memory, and send the signal to the processor. The signal includes computer instructions stored in the memory. When the processor executes the computer instructions, the electronic device performs the method according to any one of the first aspect and the possible designs of the first aspect.

According to a sixth aspect, this application provides a computer-readable storage medium. The computer-readable storage medium includes computer instructions. When the computer instructions are run on an electronic device, the electronic device is enabled to perform the method according to any one of the first aspect and the possible designs of the first aspect.

According to a seventh aspect, this application provides a chip system. The chip system may be applied to a server including a wireless communication module and a memory. The chip system includes one or more interface circuits and one or more processors. The interface circuit and the processor are connected through a line. The interface circuit is configured to: receive a signal from the memory, and send the signal to the processor. The signal includes computer instructions stored in the memory. When the processor executes the computer instructions, the server performs the method according to any one of the second aspect and the possible designs of the second aspect.

According to an eighth aspect, this application provides a computer-readable storage medium. The computer-readable storage medium includes computer instructions. When the computer instructions are run on a server, the server is enabled to perform the method according to any one of the second aspect and the possible designs of the second aspect.

According to a ninth aspect, an embodiment of this application provides a computer program product. When the computer program product runs on a computer, the computer is enabled to perform the method according to any one of the first aspect, the second aspect, and the possible designs of the first aspect and the second aspect.

It may be understood that for beneficial effects that can be achieved by the electronic device according to the third aspect and any possible design of the third aspect, the server according to the fourth aspect and any possible design of the fourth aspect, the chip system according to the fifth aspect and the seventh aspect, the computer-readable storage medium according to the sixth aspect and the eighth aspect, and the computer program product according to the ninth aspect, refer to the beneficial effects in the first aspect or the second aspect and any possible design of the first aspect or the second aspect. Details are not described herein again.

BRIEF DESCRIPTION OF THE DRAWINGS

FIG. 16A-1 to FIG. 16A-3 are a flowchart of another data sharing method according to an embodiment of this application;

DETAILED DESCRIPTION OF ILLUSTRATIVE EMBODIMENTS

Terms in embodiments of this application are used only for the purpose of describing specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any or all possible combinations of one or more associated listed items.

An embodiment of this application provides a data sharing method. The method may be applied to a communication system including at least two electronic devices and a server. The at least two electronic devices may include a first device and a second device.

Figure 1:
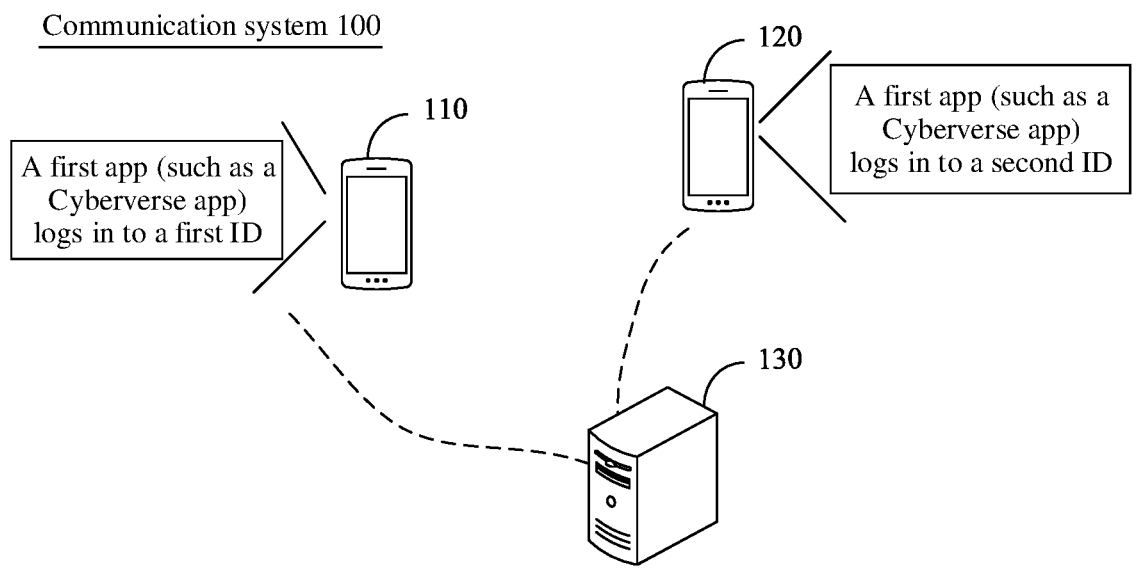
FIG. 1 is a schematic diagram of an architecture of a communication system according to an embodiment of this application.

FIG. 1 is a schematic diagram of an architecture of a communication system according to an embodiment of this application. As shown in FIG. 1, a communication system 100 may include a first device 110, a second device 120, and a server 130.

A first app is installed on the first device 110 and the second device 120. The server 130 is a management server or an application server of the first app. The server 130 may be one server, or may be a server cluster including a plurality of servers. This is not limited in this embodiment of this application.

The first device 110 logs in to a first account in the first app installed on the first device 110, and the second device 120 logs in to a second account in the first app installed on the second device 120. The first account may also be referred to as a first identity (Identity, ID), and the second account may also be referred to as a second ID.

For example, the first app may be a Cyberverse app. The name of the Cyberverse app comes from Cyber (Cyber) and Universe (Universe). Cyberverse is an augmented reality technology based on virtual-reality integration. The Cyberverse app has a 3D high definition map capability, a spatial computing capability, a strong environment understanding capability, and a super-realistic virtual-reality integration rendering capability. In the 5G architecture, the Cyberverse technology can provide construction and service capabilities of an earth-level virtual-reality integration world.

It may be understood that an electronic device (for example, the first device 110 or the second device 120) on which the Cyberverse app is installed may link a user, a real world, a digital world, and the like by using the Cyberverse app, to bring a brand new interaction mode and visual experience to the user. It should be noted that, for detailed descriptions of the Cyberverse app, refer to descriptions in the following embodiments. Details are not described herein.

For example, an electronic device (such as a first device or a second device) in embodiments of this application may be a portable computer (such as a mobile phone), a notebook computer, a personal computer (personal computer, PC), a wearable electronic device (such as a smartwatch, smart glasses, or a smart helmet), a tablet computer, an AR/virtual reality (virtual reality, VR) device, a vehicle-mounted device, or the like. A specific form of the electronic device is not specially limited in the following embodiments.

The Cyberverse app provides a service for the user in a plurality of spaces such as a scenic spot, a museum, a smart campus, an airport, a high-speed railway station, and a commercial space. For example, in this embodiment of this application, that the first device 110 is a mobile phone is used as an example. In response to an operation of starting the Cyberverse app by the user, the mobile phone may start a camera, perform, by using the Cyberverse app, AR enhancement on an image of a real world captured by the camera, and integrate information about a digital world into the image of the real world, to obtain and display a virtual-reality integrated image.

Figure 2A:
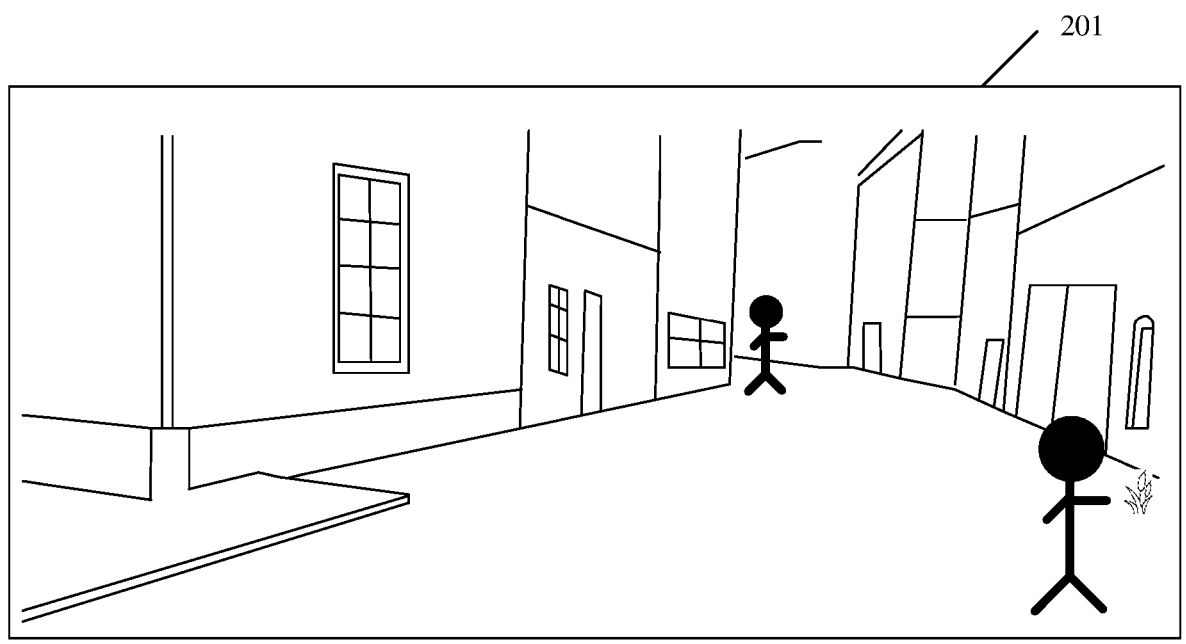
FIG. 2(a) to FIG. 2(c) are a schematic diagram of an interface of a Cyberverse app according to an embodiment of this application.

For example, in response to an operation of starting the Cyberverse app by the user, the mobile phone may start a camera, and the camera may capture an image 201 of a real world shown in FIG. 2(a). The mobile phone may perform, by using the Cyberverse app, AR enhancement on the image 201 of the real world captured by the camera, and integrate information about a digital world into the image of the real world, to obtain and display a virtual-reality integrated image 202 shown in FIG. 2(b).

Figure 2B:
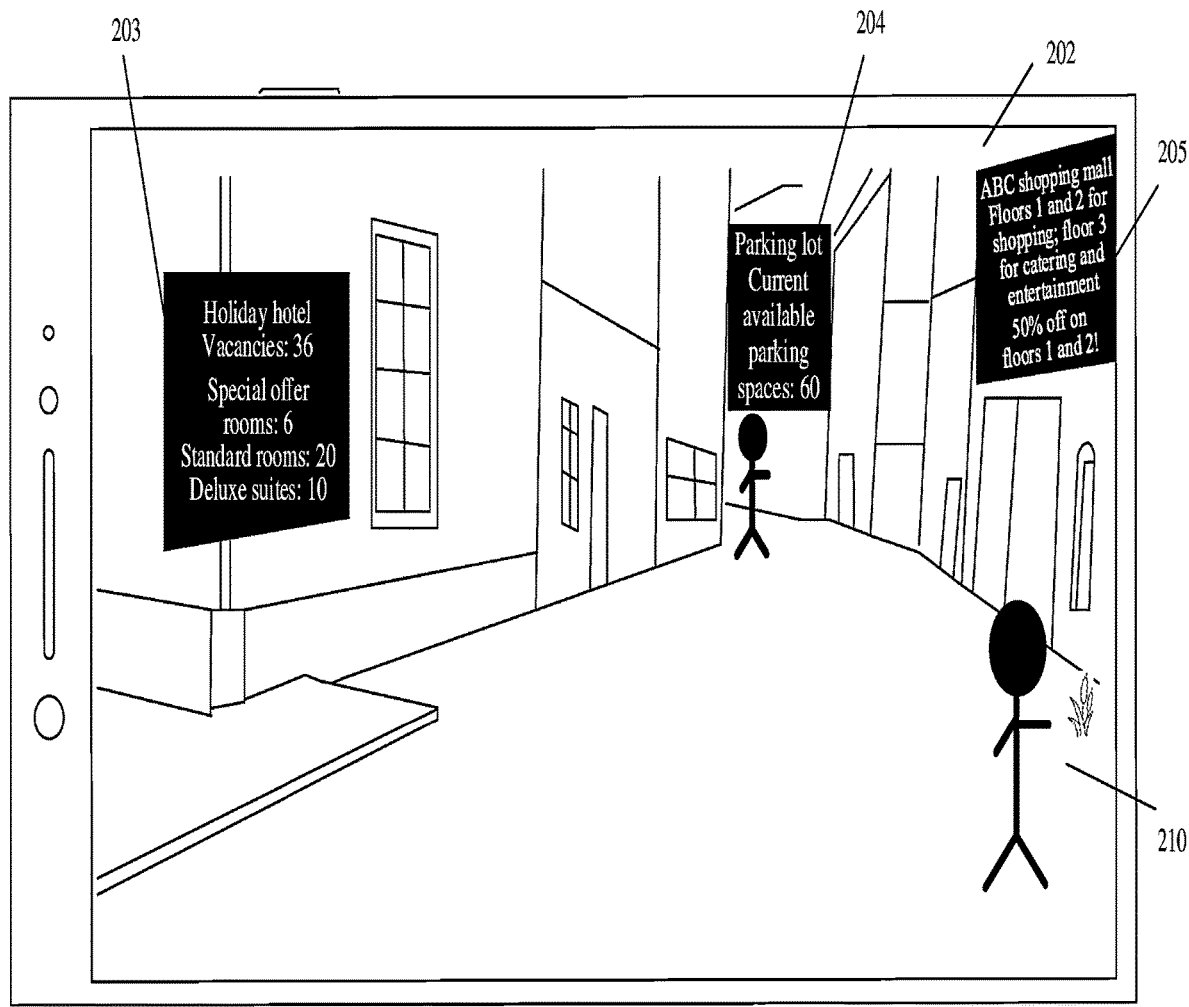

It should be noted that, the virtual-reality integrated image 202 shown in FIG. 2(b) not only includes the image 201 of the real world, but also includes 3D identification information (which may also be referred to as a digital signage) of a plurality of buildings/places in the image 201 of the real world, for example, a 3D identifier 205 of an ABC shopping mall, a 3D identifier 204 of a parking lot, and a 3D identifier 203 of a holiday hotel. The 3D identifier may include at least information such as a building name, merchant information, a user comment, or advertisement information. In this way, wherever the user goes, the user can view, by using the Cyberverse app on a mobile phone screen, the real world after AR enhancement, and can easily learn of various information in a surrounding real scenario. The 3D identifiers of the plurality of buildings/places are the information about the digital world. For detailed descriptions of the information about the digital world, refer to subsequent related descriptions in this embodiment. Details are not described herein.

Figure 2C:
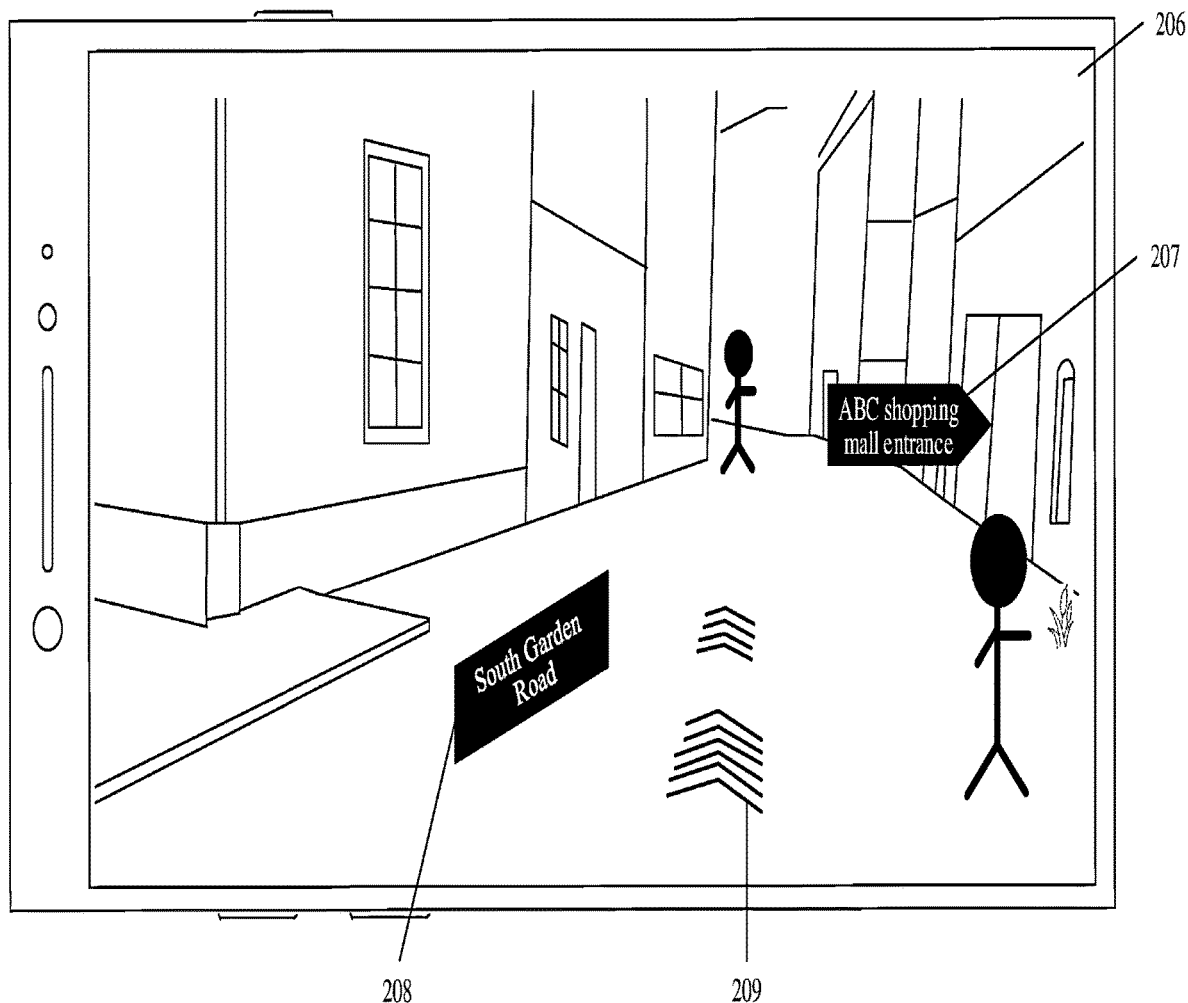

For another example, in a navigation mode, the mobile phone may perform, by using the Cyberverse app, AR enhancement on the image 201 of the real world captured by the camera, to obtain and display a virtual-reality integrated image 206 shown in FIG. 2(c). It should be noted that, the virtual-reality integrated image 202 shown in FIG. 2(b) not only includes the image 201 of the real world, but also includes information such as a road name 208 (for example, South Garden Road), a movement identifier 209, and a destination identifier 207 in the image 201 of the real world.

Figure 3:
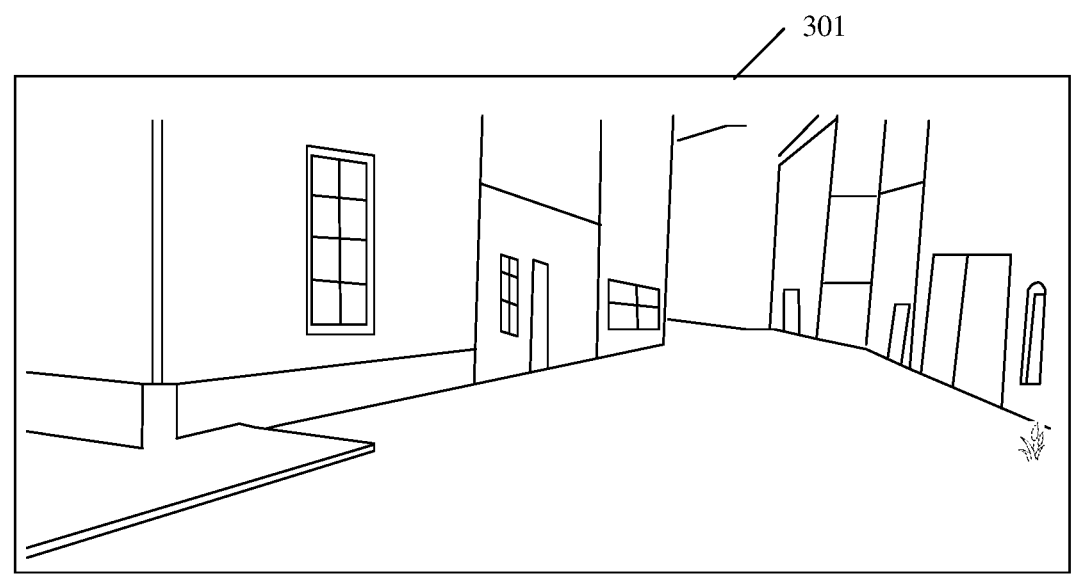
FIG. 3 is a schematic diagram of another interface of a Cyberverse app according to an embodiment of this application.
Figure 3:
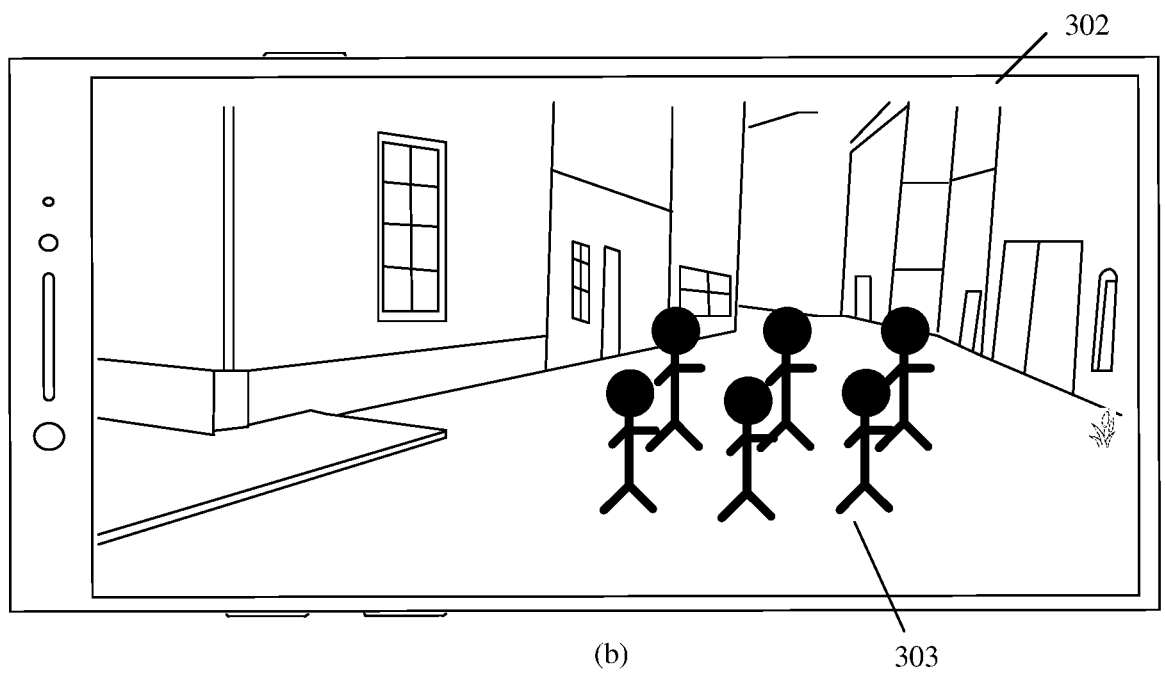

For another example, in response to the operation of starting the Cyberverse app by the user, the mobile phone may start the camera, and the camera may capture an image 301 of the real world shown in (a) in FIG. 3. In response to the operation of the user, the mobile phone may add a prestored model to the image 301 of the real world by using the Cyberverse app, to obtain and display a virtual-reality integrated image 302 shown in (b) in FIG. 3. It should be noted that, the virtual-reality integrated image 302 shown in (b) in FIG. 3 not only includes the image 301 of the real world, but also includes the model 303 prestored in the mobile phone. The prestored model may be a static or dynamic image shot by the mobile phone by using the Cyberverse app. For example, the prestored model 303 shown in (b) in FIG. 3 may be a dynamic image of performance of a plurality of persons. In this way, the mobile phone may perform, by using the Cyberverse app, virtual-reality integration on the dynamic image of performance of a plurality of persons and any image of the real world, to obtain dynamic images of performance of the plurality of persons in different real scenarios.

It should be noted that a function of the Cyberverse app is not limited to the function described in the foregoing example. For example, the Cyberverse app may also be applied to a vehicle-mounted device, and may provide a driver with more accurate and rich information (for example, information such as a status of a lane in which a vehicle is driving or a real-time movement of a front vehicle) than that of a vehicle dashboard.

With reference to the foregoing descriptions, it can be learned that if a user b that uses the second device 120 is in a field of view of the camera of the first device 110 (for example, the mobile phone), the first device 110 may display, by using the Cyberverse app, a virtual-reality integrated image including an image of the user b. For example, as shown in FIG. 2(b), the virtual-reality integrated image 202 includes an image 210 of the user b. In this embodiment of this application, the first device 110 (for example, the mobile phone) may share data with the second device 120 in response to a parabolic operation that is input by the user and that points to the image 210 of the user b in the virtual-reality integrated image 202. That is, the first device 110 and the second device 120 can implement data sharing in an AR/VR scenario, and can reduce UI interaction for data sharing in the AR/VR scenario, thereby ensuring display effects of information in the AR/VR scenario.

Figure 4:
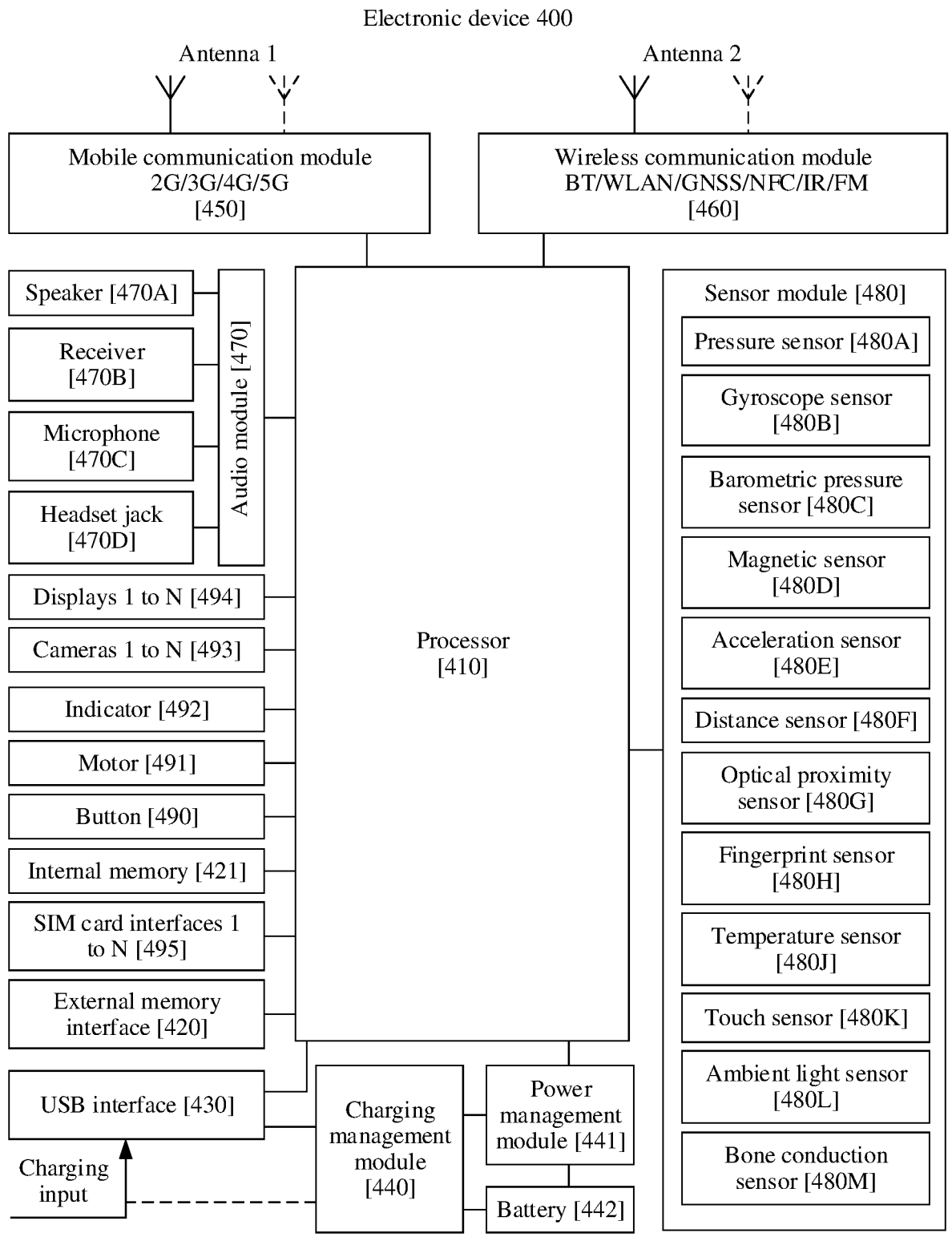
FIG. 4 is a schematic diagram of a structure of an electronic device according to an embodiment of this application.

FIG. 4 is a schematic diagram of a structure of an electronic device 400 according to an embodiment. The electronic device 400 is the first device 110 or the second device 120 in this embodiment. As shown in FIG. 4, the electronic device 400 may include a processor 410, an external memory interface 420, an internal memory 421, a universal serial bus (universal serial bus, USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 170C, a headset jack 470D, a sensor module 480, a button 490, a motor 491, an indicator 492, a camera 493, a display 494, a subscriber identification module (subscriber identification module, SIM) card interface 495, and the like.

A camera in the following embodiments may be a structured light camera, which is also referred to as a point cloud depth camera, a 3D structured light camera, or a depth camera.

An image presented on an electronic device (for example, a mobile phone) is usually a two-dimensional image. A depth corresponding to each location in the two-dimensional image cannot be displayed in the image. When capturing a 3D image, the structured light camera obtains both a color of each location in the image and a depth of each location. A principle of structured light is that an invisible grating is emitted through a light source to form a stripe or an image with a feature, and then corresponding three-dimensional image data such as a three-dimensional face model is reversely obtained through calculation based on distribution and a warping degree of a pattern. In the following embodiments, collection of depth information of each location in an image is not limited to the structured light camera. The electronic device 400 may alternatively estimate depth information of each location in an image based on an optical camera by using an algorithm such as deep learning.

The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, a bone conduction sensor 480M, and the like.

It may be understood that the structure shown in this embodiment does not constitute a specific limitation on the electronic device 400. In some other embodiments of this application, the electronic device 400 may include more or fewer components than those shown in the figure, or some components may be combined, or some components may be split, or different component arrangements may be used. The components shown in the figure may be implemented by hardware, software, or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 400, and is a decision maker that directs each component in the electronic device 400 to coordinate work according to an instruction. The controller may generate an operation control signal based on an instruction operation code and a time sequence signal, to complete control of instruction reading and instruction execution.

A memory may be disposed in the processor 410, and is configured to store instructions and data. In some embodiments, the memory in the processor 410 is a cache. The memory may store instructions or data that has been used or cyclically used by the processor 410. If the processor 410 needs to use the instructions or the data again, the processor 410 may directly invoke the instructions or the data from the memory. This avoids repeated access and reduces waiting time of the processor 410, thereby improving system efficiency.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment of the present invention is merely an example for description, and does not constitute a limitation on a structure of the electronic device 400. In some other embodiments of this application, the electronic device 400 may alternatively use an interface connection manner different from that in the foregoing embodiment, or use a combination of a plurality of interface connection manners.

The charging management module 440 is configured to receive a charging input from a charger. The charger may be a wireless charger or a wired charger. In some wired charging embodiments, the charging management module 440 may receive a charging input of the wired charger through the USB interface 430. In some wireless charging embodiments, the charging management module 440 may receive a wireless charging input through a wireless charging coil of the electronic device 400. When charging the battery 442, the charging management module 440 may further supply power to the electronic device by using the power management module 441.

The power management module 441 is configured to connect the battery 442, the charging management module 440, and the processor 410. The power management module 441 receives an input from the battery 442 and/or the charging management module 440, and supplies power to the processor 410, the internal memory 421, the external memory, the display 494, the camera 493, the wireless communication module 460, and the like. The power management module 441 may be further configured to monitor parameters such as a battery capacity, a battery cycle count, and a battery health status (electric leakage or impedance). In some other embodiments, the power management module 441 may alternatively be disposed in the processor 410. In some other embodiments, the power management module 441 and the charging management module 440 may alternatively be disposed in a same device.

A wireless communication function of the electronic device 400 may be implemented through the antenna 1, the antenna 2, the mobile communication module 450, the wireless communication module 460, the modem processor, the baseband processor, and the like. In some embodiments, in the electronic device 400, the antenna 1 and the mobile communication module 450 are coupled, and the antenna 2 and the wireless communication module 460 are coupled, so that the electronic device 400 can communicate with a network and another device by using a wireless communication technology.

The antenna 1 and the antenna 2 are configured to transmit and receive an electromagnetic wave signal. Each antenna in the electronic device 400 may be configured to cover one or more communication frequency bands. Different antennas may be further multiplexed, to improve antenna utilization.

The mobile communication module 450 may provide a wireless communication solution that includes 2G/3G/4G/5G or the like and that is applied to the electronic device 400. The mobile communication module 450 may include at least one filter, a switch, a power amplifier, a low noise amplifier (low noise amplifier, LNA), and the like. The wireless communication module 460 may provide a wireless communication solution that is applied to the electronic device 400, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

The electronic device 400 implements a display function by using the GPU, the display 494, the application processor, and the like. The GPU is a microprocessor for image processing, and is connected to the display 494 and the application processor. The GPU is configured to: perform mathematical and geometric computation, and render an image. The processor 410 may include one or more GPUs that execute program instructions to generate or change display information.

The display 494 is configured to display an image, a video, and the like. The display 494 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 400 may include one or N displays 494, where N is a positive integer greater than 1.

The electronic device 400 can implement an image shooting function by using the ISP, the camera 493, the video codec, the GPU, the display 494, the application processor, and the like.

The ISP is configured to process data fed back by the camera 493. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of an image shooting scenario. In some embodiments, the ISP may be disposed in the camera 493.

The camera 493 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 400 may include one or N cameras 493, where N is a positive integer greater than 1.

The digital signal processor is configured to process a digital signal, and may process another digital signal in addition to the digital image signal. For example, when the electronic device 400 selects a frequency, the digital signal processor is configured to perform Fourier transformation on frequency energy. The video codec is configured to compress or decompress a digital video. The electronic device 400 may support one or more video codecs. In this way, the electronic device 400 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 400 may be implemented through the NPU, for example, image recognition, facial recognition, speech recognition, and text understanding.

The external memory interface 420 may be configured to connect to an external storage card, for example, a micro SD card, to extend a storage capability of the electronic device 400. The external storage card communicates with the processor 410 through the external memory interface 420, to implement a data storage function. For example, files such as music and videos are stored in the external storage card.

The internal memory 421 may be configured to store computer-executable program code. The computer-executable program code includes instructions. The processor 410 runs the instructions stored in the internal memory 421, to perform various functional applications of the electronic device 400 and data processing. The internal memory 421 may include a program storage area and a data storage area. The program storage area may store an operating system, an application required by at least one function (for example, a voice playing function or an image playing function), and the like. The data storage area may store data (such as audio data and an address book) created during use of the electronic device 400, and the like. In addition, the internal memory 421 may include a high-speed random access memory, or may include a nonvolatile memory, for example, at least one magnetic disk storage device, a flash memory, or a universal flash storage (universal flash storage, UFS).

The electronic device 400 may implement audio functions, for example, music playing and recording, by using the audio module 470, the speaker 470A, the receiver 470B, the microphone 170C, the headset jack 470D, the application processor, and the like.

The audio module 470 is configured to convert digital audio information into an analog audio signal for output, and is also configured to convert an analog audio input into a digital audio signal. The audio module 470 may be further configured to encode and decode an audio signal. The speaker 470A, also referred to as a "loudspeaker", is configured to convert an audio electrical signal into a sound signal. The electronic device 400 may listen to music or answer a call in a hands-free mode over the speaker 470A. The receiver 470B, also referred to as an "earpiece", is configured to convert an audio electrical signal into a sound signal. The microphone 170C, also referred to as a "mike" or a "mic", is configured to convert a sound signal into an electrical signal. The headset jack 470D is configured to connect to a wired headset. The headset jack 470D may be the USB interface 430, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 480A is configured to sense a pressure signal, and can convert the pressure signal into an electrical signal. In some embodiments, the pressure sensor 480A may be disposed on the display 494.

The gyroscope sensor 480B may be configured to determine a motion posture of the electronic device 400. In some embodiments, an angular velocity of the electronic device 400 around three axes (namely, axes x, y, and z) may be determined through the gyroscope sensor 480B. The gyroscope sensor 480B may be configured to perform image stabilization during photographing. For example, when the shutter is pressed, the gyroscope sensor 480B detects an angle at which the electronic device 400 jitters, obtains, through calculation based on the angle, a distance for which a lens module needs to compensate, and allows the lens to cancel a jitter of the electronic device 400 through reverse motion, to implement image stabilization. The gyroscope sensor 480B may be further used in a navigation scenario and a motion-sensing game scenario.

The acceleration sensor 480E may detect values of accelerations in various directions (usually on three axes) of the electronic device 400. When the electronic device 400 is still, a magnitude and a direction of gravity may be detected. The acceleration sensor 480E may be further configured to identify a posture of the electronic device, and is used in an application such as switching between a landscape mode and a portrait mode or a pedometer.

The distance sensor 480F is configured to measure a distance. The electronic device 400 may measure the distance in an infrared manner or a laser manner. In some embodiments, in an image shooting scenario, the electronic device 400 may measure a distance by using the distance sensor 480F, to implement quick focusing.

The button 490 includes a power button, a volume button, and the like. The button 490 may be a mechanical button, or may be a touch button. The electronic device 400 may receive a button input, and generate a button signal input related to a user setting and function control of the electronic device 400.

The motor 491 may generate a vibration prompt. The motor 491 may be used for an incoming call vibration prompt, or may be used for touch vibration feedback. The indicator 492 may be an indicator light, and may be used to indicate a charging status or a power change; or may be used to indicate a message, a missed call, a notification, or the like. The SIM card interface 495 is configured to connect a SIM card. The SIM card may be inserted into the SIM card interface 495 or removed from the SIM card interface 495, to implement contact with or separation from the electronic device 400. The electronic device 400 may support one or N SIM card interfaces, where N is a positive integer greater than 1.

For ease of understanding, in embodiments of this application, an example in which the first device 110 shown in FIG. 1 is a mobile phone A, a user a (namely, a second user) uses the mobile phone A, the second device shown in FIG. 1 is a mobile phone B, a user b (namely, a first user) uses the mobile phone B, a server is a server C, and the first app is the Cyberverse app is used to describe a data sharing method provided in embodiments of this application with reference to the accompanying drawings.

The Cyberverse app is installed on both the mobile phone A and the mobile phone B. For example, the Cyberverse app is installed on the mobile phone A before delivery, or the Cyberverse app may be installed on the mobile phone A from the App store. Certainly, the Cyberverse app is installed on the mobile phone B before delivery, or the Cyberverse app may be installed on the mobile phone B from the App store.

Figure 5A:
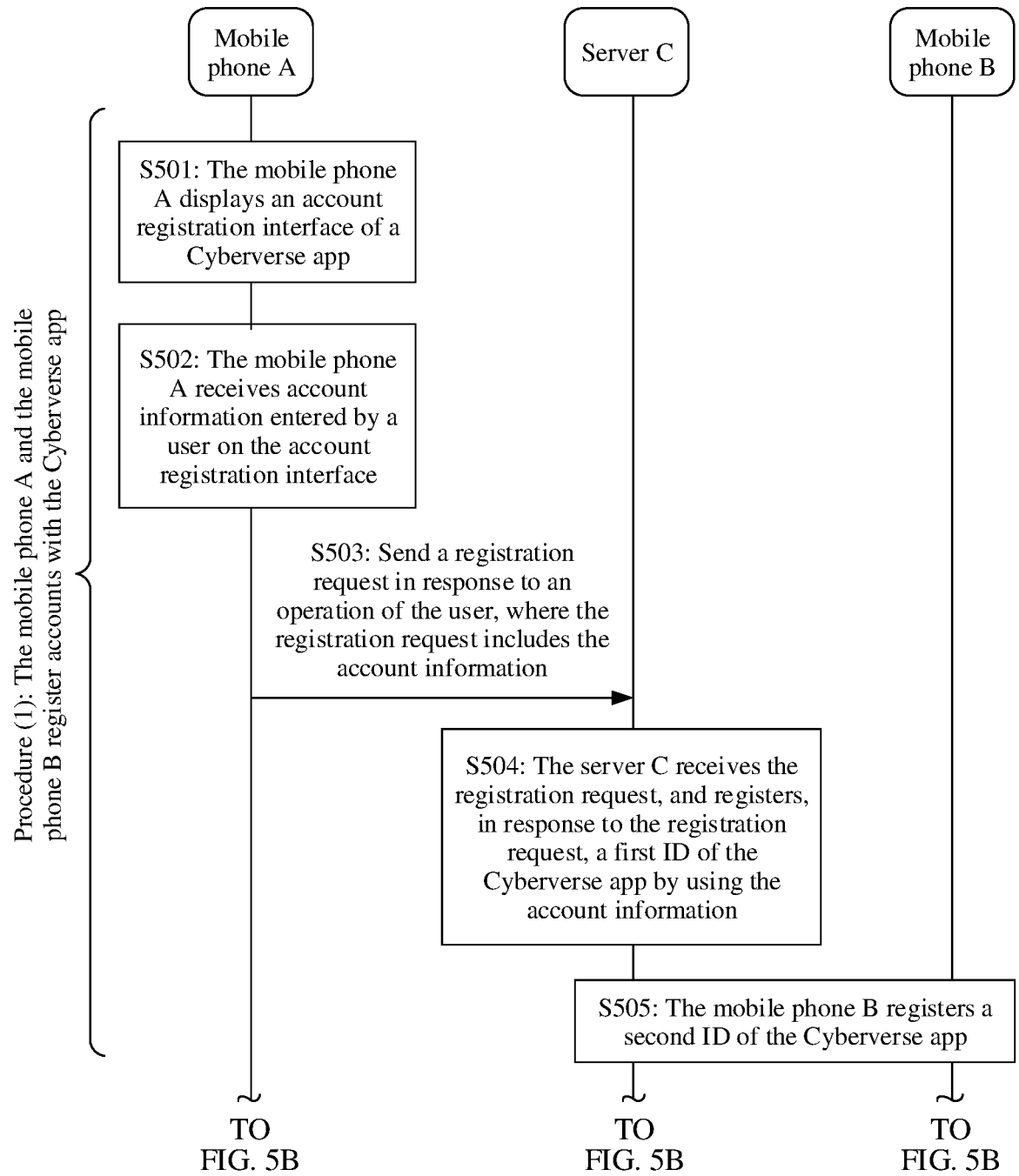
FIG. 5A to FIG. 5C are a flowchart of a data sharing method according to an embodiment of this application.
Figure 5B:
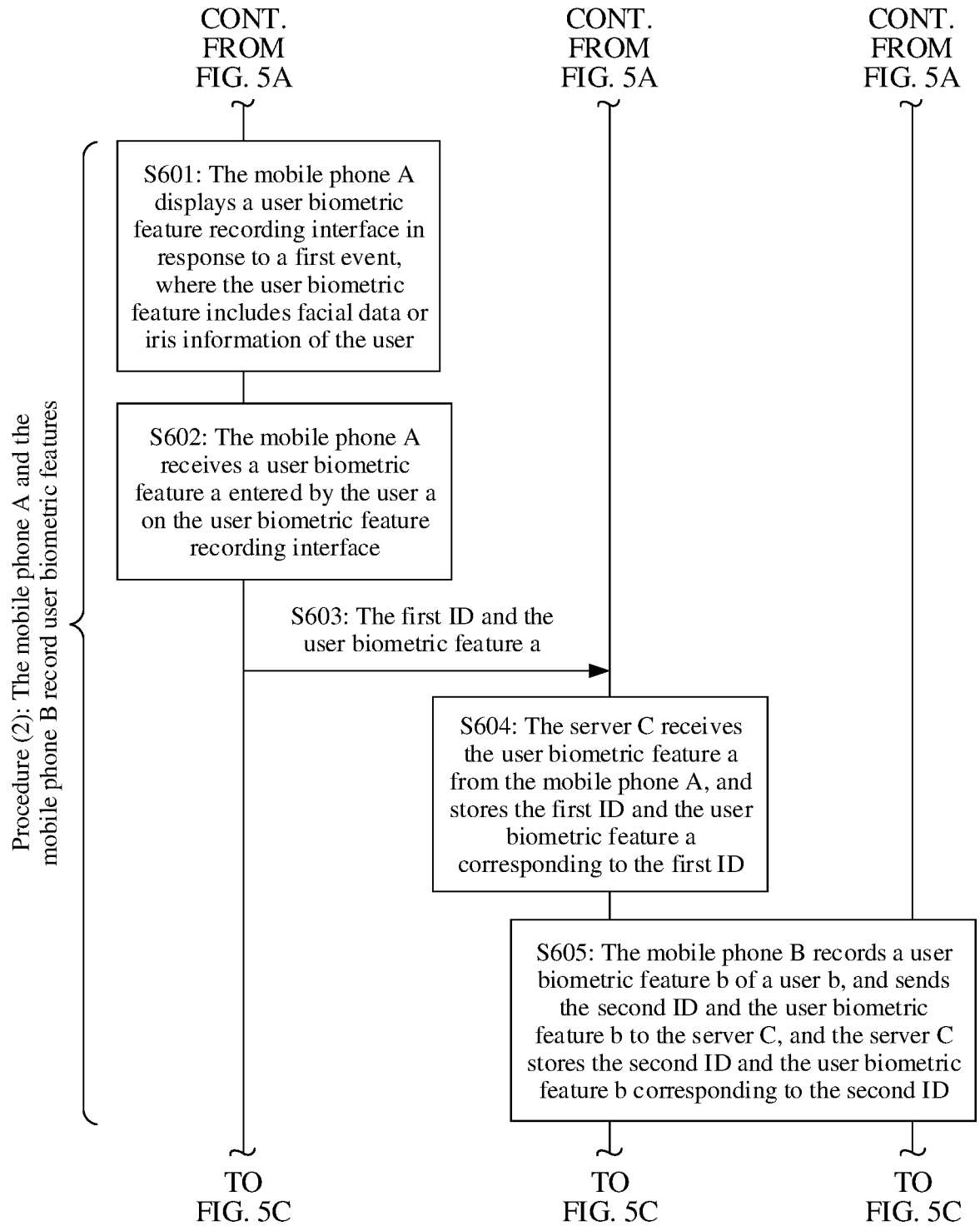
Figure 5C:
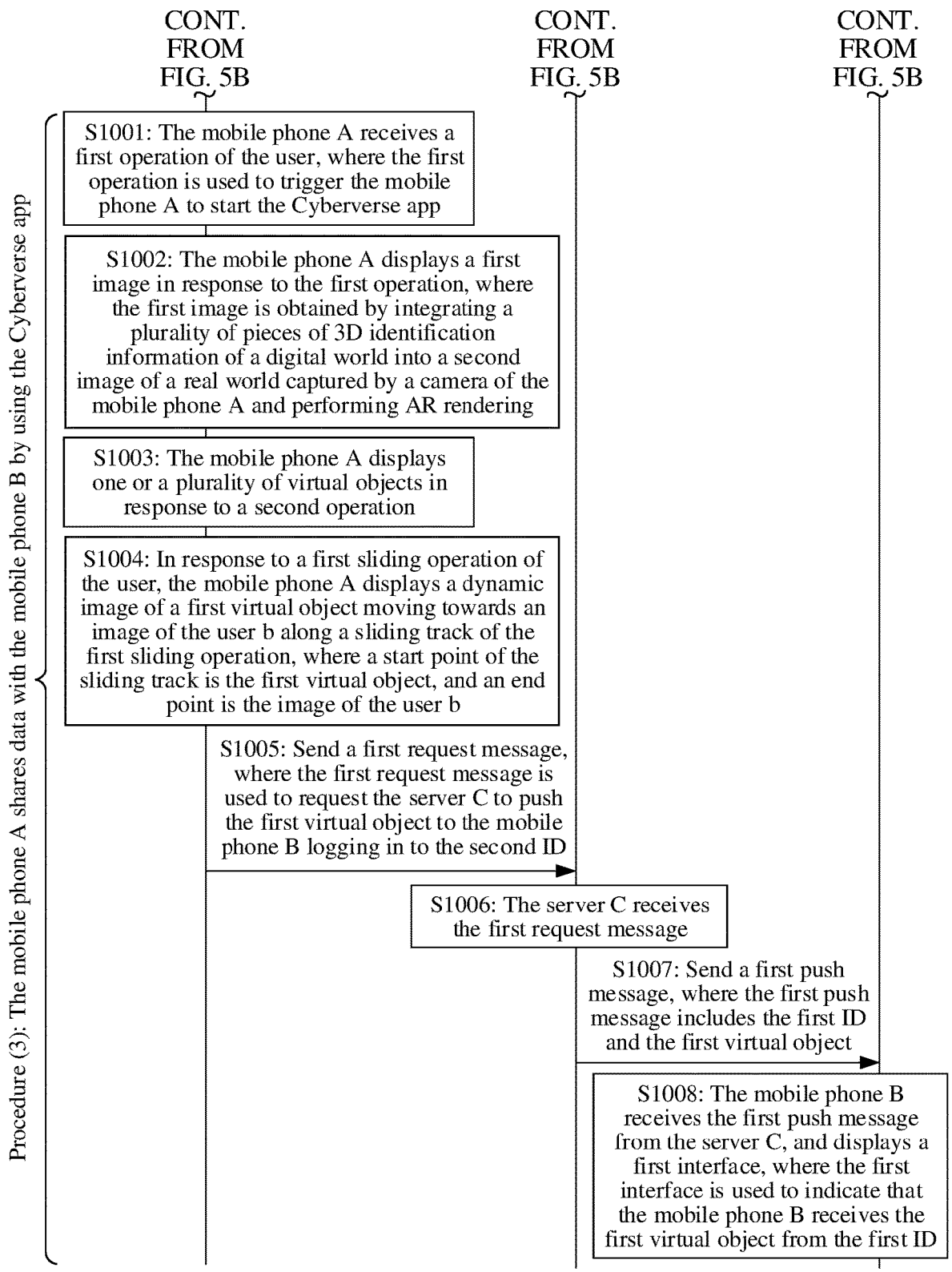

For example, after the Cyberverse app is installed on the mobile phone A and the mobile phone B, as shown in FIG. 5A to FIG. 5C, the method in this embodiment of this application may include three procedures: a procedure (1) to a procedure (3). Procedure (1): The mobile phone A and the mobile phone B register accounts with the Cyberverse app. Procedure (2): The mobile phone A and the mobile phone B record user biometric features. Procedure (3): The mobile phone A shares data with the mobile phone B by using the Cyberverse app.

As shown in FIG. 5A, the foregoing procedure (1), that is, "the mobile phone A and the mobile phone B register accounts with the Cyberverse app", may include S501 to S505.

S501: The mobile phone A displays an account registration interface of the Cyberverse app.

The account registration interface is used to register an account in the Cyberverse app.

Figure 6A:
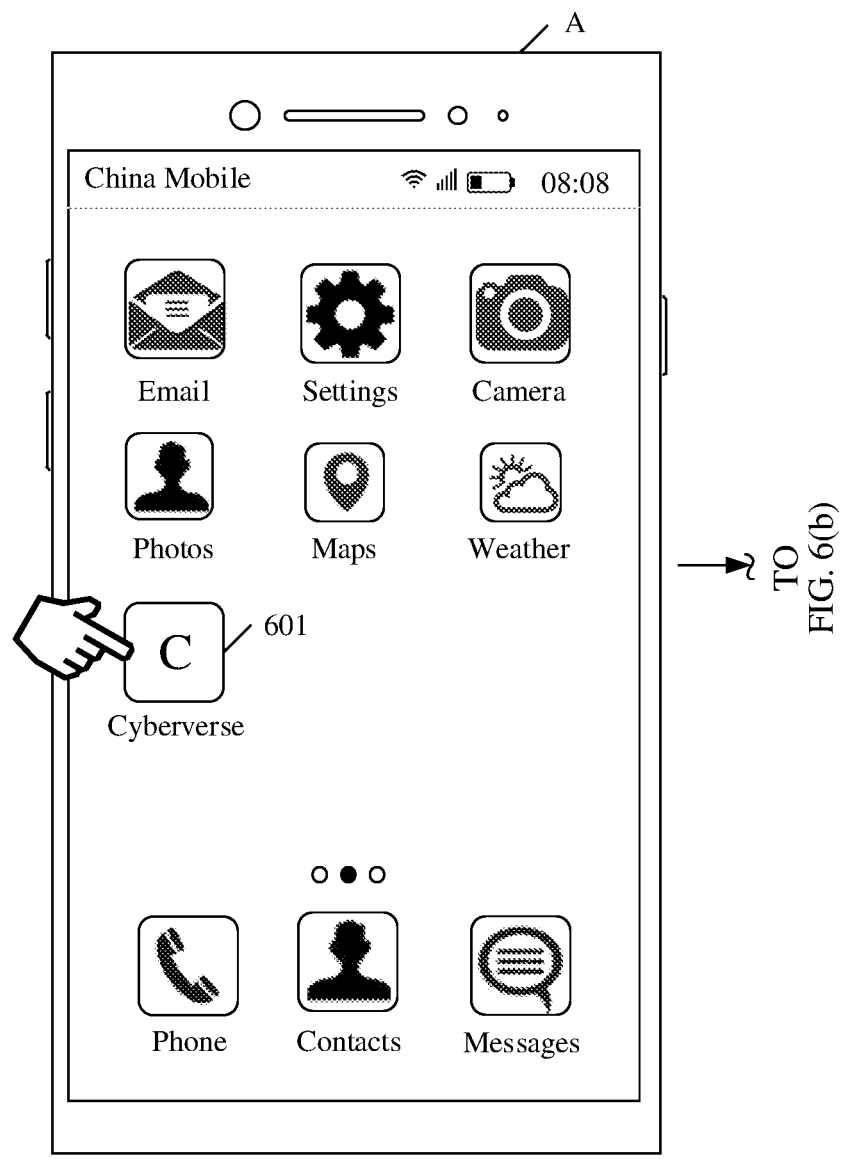
FIG. 6(a) to FIG. 6(c) are a schematic diagram of another interface of a Cyberverse app according to an embodiment of this application.
Figure 6B:
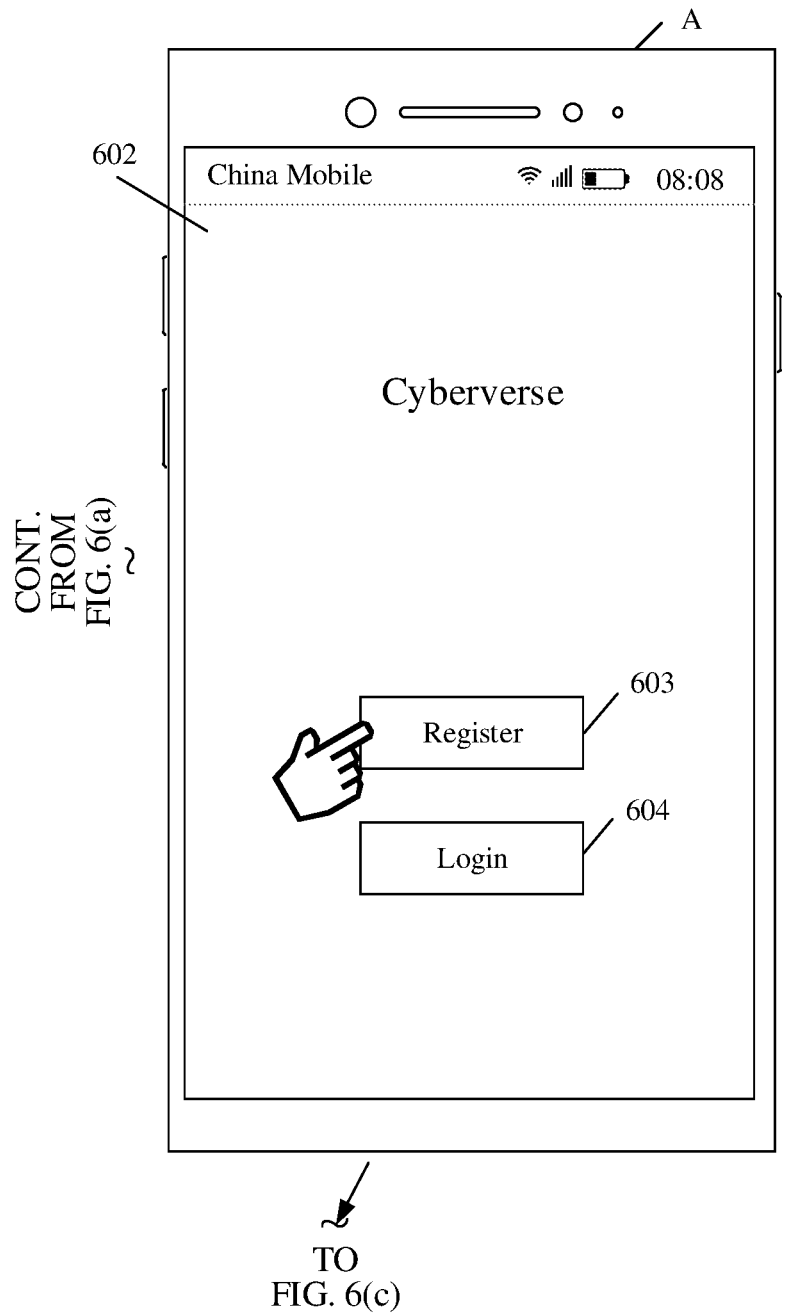
Figure 6C:
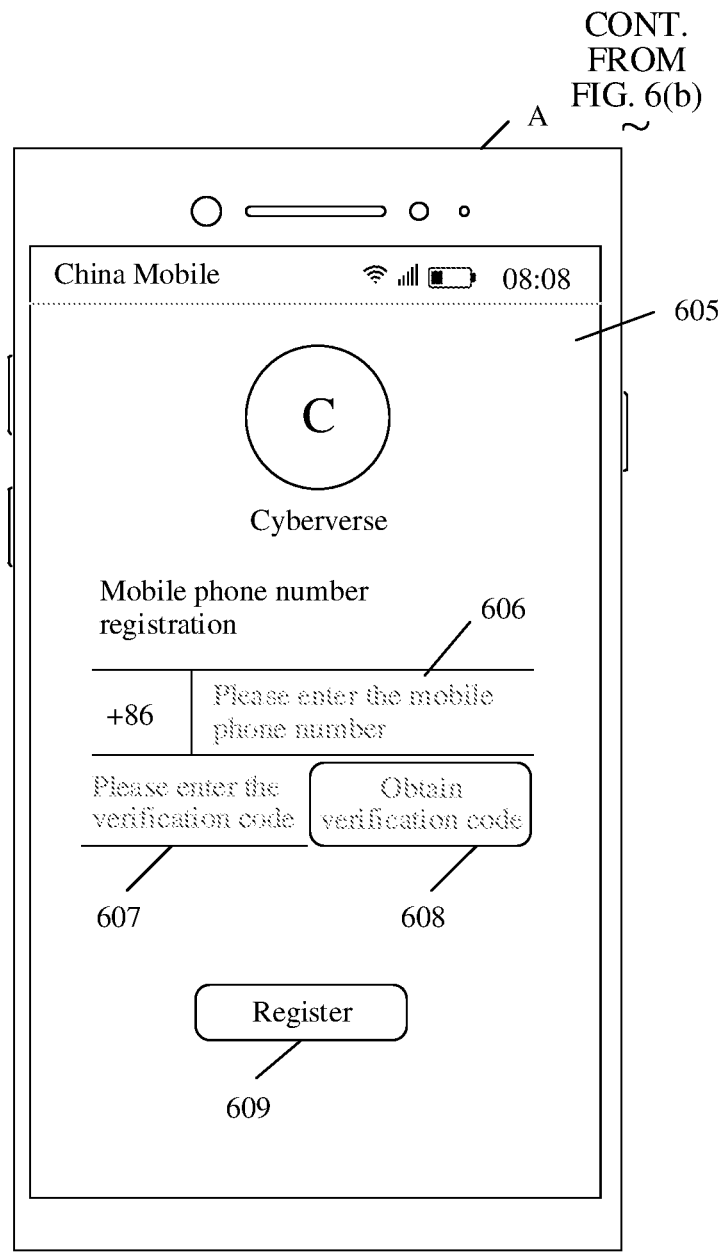
Figure 7:
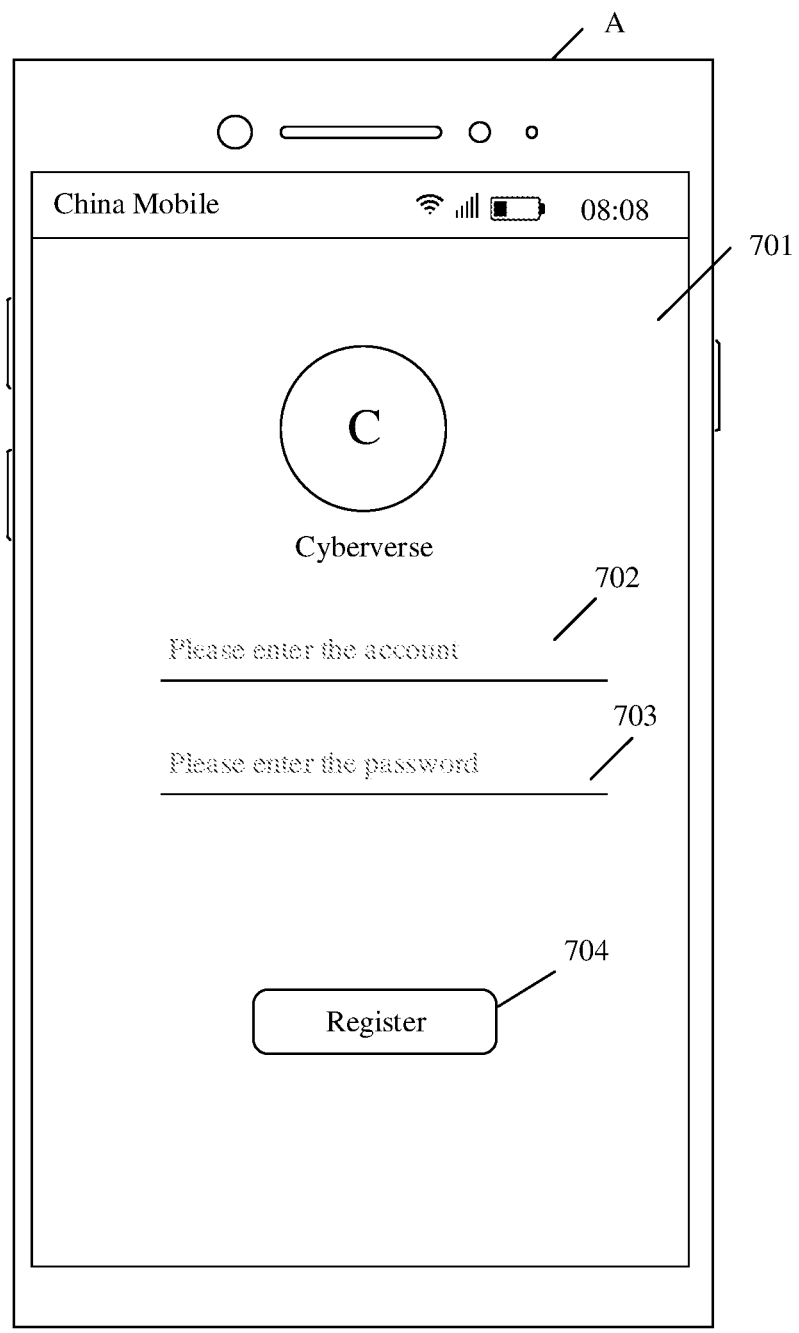
FIG. 7 is a schematic diagram of another interface of a Cyberverse app according to an embodiment of this application.

For example, after the Cyberverse app is installed on the mobile phone A, as shown in FIG. 6(*a*), a home screen of the mobile phone A includes an icon 601 of the Cyberverse app. In response to a tap operation (for example, a single-tap operation) performed by a user on the icon 601 of the Cyberverse app shown in FIG. 6(*a*), the mobile phone A may display an interface 602 shown in FIG. 6(*b*). The interface 602 includes a "register" option 603 and a "login" option 604. The "login" option 604 is used to trigger the mobile phone A to display a login interface of the Cyberverse app. The mobile phone A may receive, on the login interface, an account and a password entered by the user, and use the account and the password to log in to the account in the Cyberverse app. The "register" option 603 is used to trigger the mobile phone A to display the account registration interface of the Cyberverse app. For example, the mobile phone A may display an account registration interface 605 of the Cyberverse app shown in FIG. 6(*c*). For another example, the mobile phone A may display an account registration interface 701 of the Cyberverse app shown in FIG. 7.

S502: The mobile phone A receives account information entered by the user on the account registration interface.

S503: The mobile phone A sends a registration request to the server C in response to an operation of the user, where the registration request includes the account information.

S504: The server C receives the registration request, and registers, in response to the registration request, a first ID of the Cyberverse app by using the account information.

In an implementation, the account information may include the first ID (for example, a mobile phone number or an email address) and a verification code. For example, the account registration interface 605 shown in FIG. 6(*c*) is an account registration interface in which an account is registered by using a mobile phone number. For example, the account registration interface 605 includes an "account input box" 606, a "verification code input box" 607, an "obtain verification code" button 608, and a "register" button 609.

The "account input box" 606 is used to enter a mobile phone number, and the mobile phone number may be used as an account (for example, the first ID) of the Cyberverse app. After receiving a mobile phone number a (namely, the first ID) entered by the user in the "account input box" 606, the mobile phone A may display the mobile phone number a (namely, the first ID) in the "account input box" 606. Then, the user may tap the "obtain verification code" button 608. In response to the tap operation (for example, a single-tap operation) performed by the user on the "obtain verification code" button 608, the mobile phone A may request the server C to send verification code to a mobile phone (for example, the mobile phone A) corresponding to the mobile phone number a. After the mobile phone A receives the verification code, the user may enter the verification code in the "verification code input box" 607. The mobile phone may receive and display the verification code entered by the user in the "verification code input box" 607. Finally, the mobile phone A may receive a tap operation (for example, a single-tap operation) performed by the user on the "register" button 609, and the mobile phone A may send the registration request to the server C in response to the tap operation. The registration request includes the account information, for example, the mobile phone number a (namely, the first ID) and the verification code. The server C may receive the registration request, and the server C may register, in response to the registration request, the first ID (for example, the mobile phone number a) of the Cyberverse app by using the account information (for example, the mobile phone number a and the verification code).

In another implementation, the account information may include the first ID (for example, a mobile phone number or an email address) and a login password. For example, the account registration interface 701 shown in FIG. 7 includes an "account input box" 702, a "password input box" 703, and a "register" button 704.

The "account input box" 702 is used to enter the mobile phone number or the email address, and the mobile phone number or the email address may be used as an account (for example, the first ID) of the Cyberverse app. The "password input box" 703 is used to input a login password set by the user. The mobile phone A may receive and display the first ID entered by the user in the "account input box" 702, and receive and display the login password entered by the user in the "password input box" 703. Then, the mobile phone A may receive a tap operation (for example, a single-tap operation) performed by the user on the "register" button 704, and the mobile phone A may send the registration request to the server C in response to the tap operation. The registration request includes the account information. The server C may receive the registration request, and the server C may register, in response to the registration request, the first ID of the Cyberverse app by using the account information.

In some embodiments, the first ID may alternatively be a Huawei ID. That is, the user may use a Huawei ID to register with the Cyberverse app.

S505: The mobile phone B registers a second ID of the Cyberverse app.

It should be noted that, for a method for registering the second ID of the Cyberverse app by the mobile phone B, refer to the method for registering the first ID of the Cyberverse app by the mobile phone A described in S501 to S504 in the foregoing embodiment. Details are not described in this embodiment of this application again.

For example, in this embodiment of this application, a user registration and login mechanism of the Cyberverse app may be implemented by using a Huawei mobile services (Huawei mobile services, HMS) account system. HMS is a collection of open capabilities of Huawei cloud services. Developers only need to integrate the HMS SDK to use Huawei ID, in-app purchase, message push, social networking, and other capabilities.

It should be noted that in this embodiment of this application, a sequence of "registering the first ID of the Cyberverse app by the mobile phone A" and "registering the second ID of the Cyberverse app by the mobile phone B" is not limited. In other words, in this embodiment of this application, S501 to S504 may be performed first, and then S505 is performed; or S505 may be performed first, and then S501 to S504 are performed; or S501 to S504 and S505 may be simultaneously performed.

It may be understood that, after registering accounts with the Cyberverse app, the mobile phone A and the mobile phone B may share data by using the Cyberverse app. In this embodiment of this application, to implement that the electronic device (for example, the mobile phone B) can identify, based on an image (for example, a face image) of the user a captured by a camera, an account (namely, the first ID) used by the mobile phone A of the user a to log in to the Cyberverse app when the electronic device uses the Cyberverse app, when registering an account with the Cyberverse app, the mobile phone A may further record a user biometric identifier (for example, facial data or iris information) of the user a. As shown in FIG. 5B, the foregoing procedure (2), that is, the mobile phone A and the mobile phone B record user biometric features, may include S601 to S605.

S601: The mobile phone A displays a user biometric feature recording interface in response to a first event, where the user biometric feature includes facial data or iris information of the user.

In an implementation, the first event may be that the mobile phone A receives a registration success indication message sent by the server C. The server C may send the registration success indication message to the mobile phone A after registering the first ID of the Cyberverse app by using the account information.

Optionally, in some embodiments, the mobile phone A may display an interface 1 after receiving the registration success indication message from the server C. The interface 1 is used to indicate that account registration succeeds, and request the user to confirm whether to enter the user biometric feature. The mobile phone A may receive an operation 1 of the user on the interface 1. The operation 1 is used to indicate the mobile phone A to enter the user biometric feature. The mobile phone A may display the user biometric feature recording interface in response to the operation 1 of the user on the interface 1. The mobile phone A may further receive an operation 2 of the user on the interface 1. The operation 2 is used to indicate the mobile phone A not to enter the user biometric feature. The mobile phone A may display a home page of the Cyberverse app in response to the operation 2 of the user on the interface 1.

Figure 8:
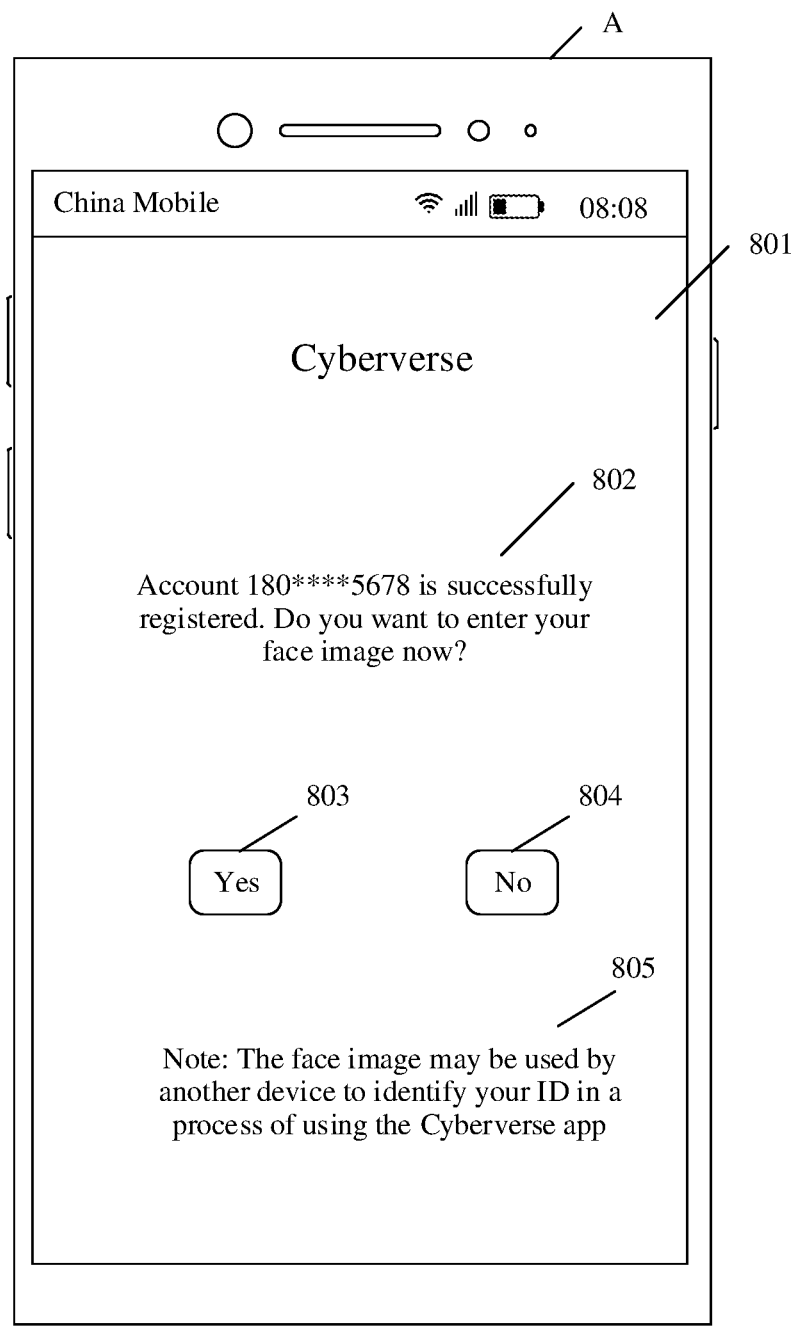
FIG. 8 is a schematic diagram of another interface of a Cyberverse app according to an embodiment of this application.

For example, in response to receiving the registration success indication message from the server C, the mobile phone A may display an interface 801 shown in FIG. 8. The interface 801 includes prompt information 802, for example, "Account 180****5678 is successfully registered. Do you want to enter facial data now?" The operation 1 may be a tap operation (for example, a single-tap operation) performed by the user on a "Yes" button 803 on the interface 801. The operation 2 may be a tap operation (for example, a single-tap operation) performed by the user on a "No" button 804 on the interface 801.

Optionally, the interface 1 may further include prompt information 805, for example, "the facial data may be used by another device to identify your ID in a process of using the Cyberverse app". The prompt information 805 may describe, to the user, a purpose of entering the facial data (that is, the user biometric feature) by the mobile phone A, so that the user selects, based on a requirement, whether to enter the facial data.

In another implementation, the first event may be that the mobile phone A receives an operation (not shown in the figure) that is entered by the user in the Cyberverse app and used to trigger the Cyberverse app to enter the user biometric feature.

S602: The mobile phone A receives a user biometric feature a entered by the user a on the user biometric feature recording interface.

It should be noted that, for a method for displaying the user biometric feature (for example, facial data or iris information of the user) recording interface by the mobile phone, and entering the user biometric feature a on the recording interface, refer to related descriptions in a conventional technology. Details are not described herein in this embodiment of this application.

Optionally, the mobile phone A may store the user biometric feature a. Specifically, the mobile phone A may store the first ID, the user biometric feature, and a correspondence between the first ID and the user biometric feature a. The user biometric feature may be used by the mobile phone A to log in to the first ID in the Cyberverse app.

It should be noted that the user biometric feature a stored in the mobile phone A may be a face image, iris information, or the like directly captured by a camera of the mobile phone A. Alternatively, the user biometric feature a stored in the mobile phone A may be a biometric feature model generated by the mobile phone A based on information such as a face image or iris information captured by a camera. For example, the user biometric feature stored in the mobile phone A may be a face 3D model generated by the mobile phone A based on a face image captured by a camera. The face 3D model may be a face 3D point cloud.

S603: The mobile phone A sends the first ID and the user biometric feature a to the server C.

S604: The server C receives the user biometric feature a from the mobile phone A, and stores the first ID and the user biometric feature a corresponding to the first ID.

S605: The mobile phone B records a user biometric feature b of the user b, and sends the second ID and the user biometric feature b to the server C, and the server C stores the second ID and the user biometric feature b corresponding to the second ID.

It should be noted that, for a specific description of S605, refer to the detailed descriptions of S601 to S604 in the foregoing embodiment. Details are not described again in this embodiment of this application.

It should be noted that, in this embodiment of this application, S601 to S604 may be performed first, and then S605 is performed; or S605 may be performed first, and then S601 to S604 are performed; or S601 to S604 and S605 may be simultaneously performed. In addition, it should be noted that in this embodiment of this application, a sequence of performing S501 to S504 and S605, and a sequence of performing S601 to S604 and S505 are not limited.

Figure 9A:
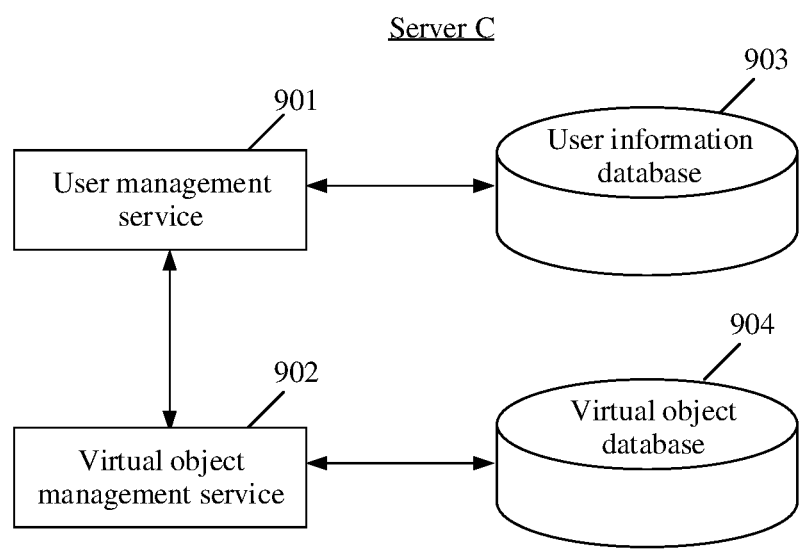
FIG. 9A is a schematic diagram of a principle framework of a server in a data sharing method according to an embodiment of this application.

For example, FIG. 9A is a schematic diagram of a principle framework of the server C in a data sharing method according to an embodiment of this application. As shown in FIG. 9A, the server C may be divided into four modules: a user management service 901, a user information database 903, a virtual object management service 902, and a virtual object database 904.

The user management service 901 is configured to store a user biometric identifier (including the ID and the user biometric feature) from an electronic device (for example, the mobile phone A and the mobile phone B) into the user information database 903. The user information database 903 is configured to store the ID and the user biometric feature. The user management service 901 may also be referred to as a user management system or a user management module.

For example, the server C may invoke the user management service 901 shown in FIG. 9A, and store the first ID, the user biometric feature a corresponding to the first ID, the second ID, and the user biometric feature b corresponding to the second ID into the user information database 903 shown in FIG. 9A.

For example, the user information database 903 shown in FIG. 9A may store the ID and the user biometric feature shown in Table 1.

TABLE 1

ID and user biometric feature

| ID | User biometric feature |
|---|---|
| First ID | User biometric feature a |
| Second ID | User biometric feature b |
| ... | ... |

Optionally, the user information database 903 shown in FIG. 9A may further store a user name or nickname set by the user a for the first ID. For example, assuming that a user name or nickname corresponding to the first ID is Bob (Bob), and a user name or nickname corresponding to the second ID is Lucy (Lucy), the user information database 903 shown in FIG. 9A may store the ID and the user biometric feature shown in Table 2.

TABLE 2

ID and user biometric feature

| ID | User biometric feature | User name/Nickname |
|---|---|---|
| First ID | User biometric feature a | Bob |
| Second ID | User biometric feature b | Lucy |
| Third ID | User biometric feature X | Aaron |
| ... | ... | ... |

The virtual object database 904 may be configured to store virtual objects that can be shared by a plurality of electronic devices (for example, the mobile phone A or the mobile phone B) by using the Cyberverse app. For example, the virtual objects may include a virtual ship, a virtual car, a virtual currency, a virtual rose, an emoticon, and the like.

For example, the virtual object database 904 shown in FIG. 9A may store information about a virtual object shown in Table 3.

TABLE 3

Information about a virtual object

| Identifier (for example, virtual identifier 1) of an emoticon a | Emoticon a |
| Identifier (for example, virtual identifier 2) of a virtual ship | Virtual ship |
| Identifier (for example, virtual identifier 3) of a virtual car | Virtual car |
| Identifier (for example, virtual identifier 4) of an emoticon b | Emoticon b |
| ... | ... |
| Identifier (for example, virtual identifier n) of a virtual rose | Virtual rose |

In a process of using the Cyberverse app, the electronic device (for example, the mobile phone A or the mobile phone B) may download the virtual object from the server C. It should be noted that, in a process of using the Cyberverse app, the electronic device may download the virtual object from the server C free of charge, or download the virtual object from the server C by using the virtual currency. The virtual object management service 902 is configured to: in response to a download request of the electronic device (for example, the mobile phone A), obtain, from the virtual object database 904, a virtual object that the mobile phone A requests to download, and then send the virtual object to the mobile phone A.

In addition, the virtual object database 904 may be further configured to store virtual information of each ID. The virtual information of each ID may include an identifier of a virtual object downloaded when the electronic device logs in to the ID, and an identifier of a virtual object received by the ID from another ID. For example, the virtual object database 904 may be configured to store a virtual object list of IDs, for example, a virtual object list shown in Table 4-1 and Table 4-2. The virtual object list includes: an identifier of a virtual object downloaded when the electronic device logs in to the ID, and an identifier of a virtual object received by the ID from another ID.

For example, the mobile phone A logs in to the first ID in the Cyberverse app, and the mobile phone B logs in to the second ID in the Cyberverse app. In this embodiment of this application, virtual information of the first ID is referred to as first virtual information, and virtual information of the second ID is referred to as second virtual information.

The virtual object management service 902 shown in FIG. 9A may store the first virtual information shown in Table 4-1 and the second virtual information shown in Table 4-2 in the virtual object database 904 based on a record of downloading a virtual object by each ID from the server C, and a record of sharing a virtual object between IDs.

As shown in Table 4-1, the virtual information of the first ID (that is, the first virtual information) may include: the first ID, the identifier of the virtual car, the identifier of the emoticon a (for example, the love icon), and the identifier of the virtual rose.

TABLE 4-1

| First virtual information | |
| --- | --- |
| Account ID of the Cyberverse app | Identifier of a virtual object |
| First ID | Identifier (for example, virtual identifier 1) of an emoticon a (for example, a love icon) |
| First ID | Identifier (for example, virtual identifier 3) of a virtual car |
| First ID | Identifier (for example, virtual identifier n) of a virtual rose |

As shown in Table 4-2, the virtual information of the second ID (that is, the second virtual information) may include: the second ID, the identifier of the virtual rose, and the identifier of the emoticon b.

TABLE 4-2

| Second virtual information | |
| --- | --- |
| Account ID of the Cyberverse app | Identifier of a virtual object |
| Second ID | Identifier (for example, virtual identifier n) of a virtual rose |
| Second ID | Identifier (for example, virtual identifier 4) of an emoticon b |

It should be noted that, in this embodiment of this application, data shared between electronic devices may include the virtual object, and may further include data such as a file or an image stored in the electronic device. After the mobile phone A shares data with the mobile phone B, download/sharing information of the virtual object shown in Table 2 may change.

Figure 9B:
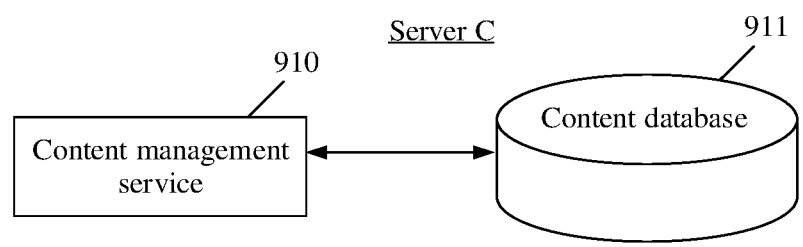
FIG. 9B is a schematic diagram of another principle framework of a server in a data sharing method according to an embodiment of this application.

FIG. 9B is a schematic diagram of another principle framework of the server C in a data sharing method according to an embodiment of this application. As shown in FIG. 9B, the server C may be divided into two modules: a content management service 910 and a content database 911. The content management service 910 may also be referred to as a content management system or a content management module. The content management service 910 integrates all functions of the user management service 901 and the virtual object management service 902 shown in FIG. 9A. The content database 911 may be configured to store all data in the user information database 903 and the virtual object database 904 shown in FIG. 9A.

In other words, in this embodiment of this application, the server C may use the principle framework shown in FIG. 9A, and use different management services and databases to manage and store a user biometric identifier and a virtual object that correspond to an ID in the Cyberverse app.

Alternatively, the server C may use the principle framework shown in FIG. 9B, and use one management service and one database to manage and store a user biometric identifier and a virtual object that correspond to an ID in the Cyberverse app. This is not limited in this embodiment of this application.

Figure 10:
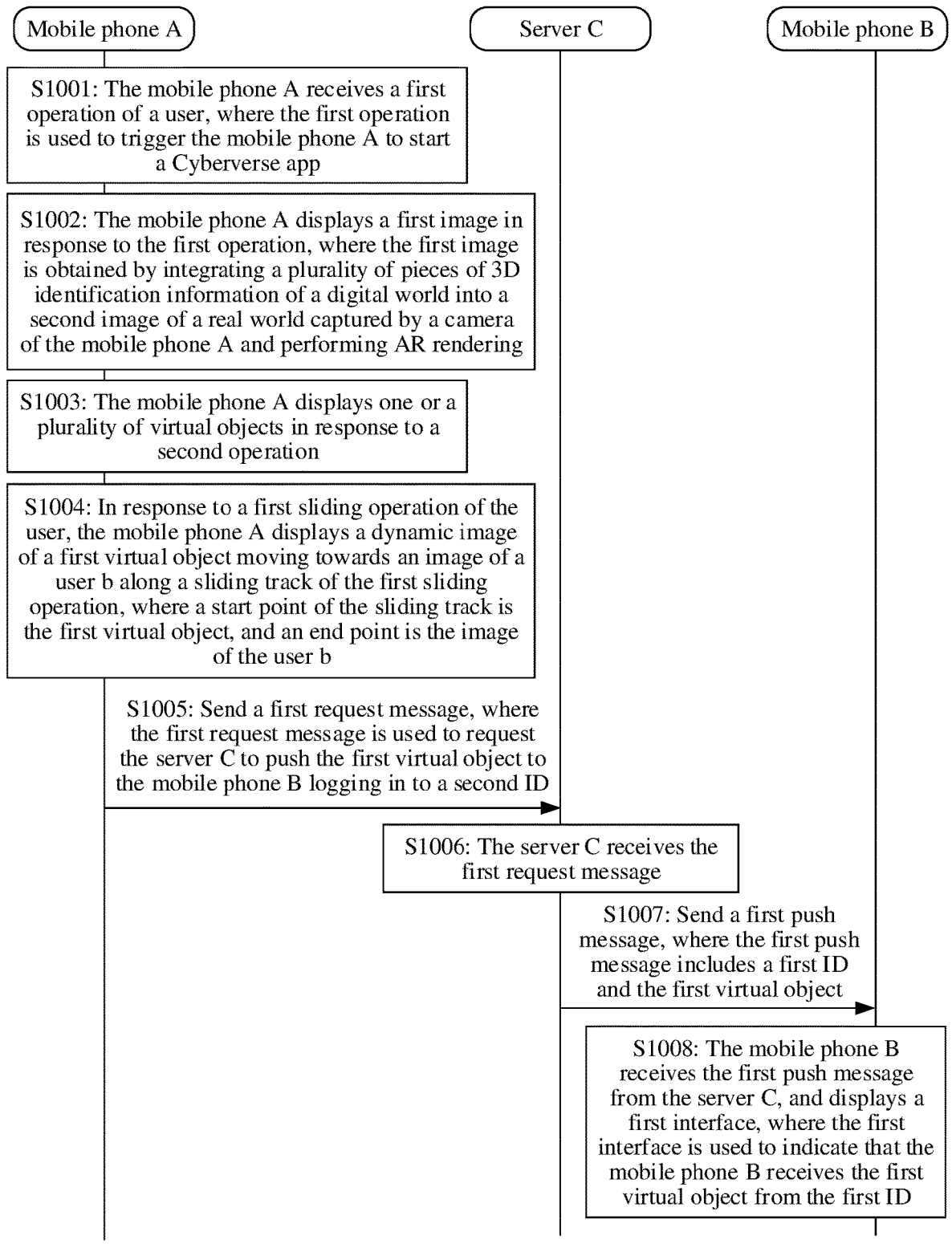
FIG. 10 is a flowchart of another data sharing method according to an embodiment of this application.

After the foregoing procedure in which the mobile phone A and the mobile phone B record the user biometric features, the mobile phone A may share data with the mobile phone B by using the Cyberverse app. Specifically, after the foregoing procedure (2), the method in this embodiment of this application further includes the procedure (3), that is, the mobile phone A shares data with the mobile phone B by using the Cyberverse app. For example, as shown in FIG. 10, the data sharing method provided in this embodiment of this application may include S1001 to S1005. For another example, as shown in FIG. 5C, the foregoing procedure (3), that is, a procedure in which the mobile phone A shares data with the mobile phone B by using the Cyberverse app, may include S1001 to S1008. As shown in FIG. 10, the method in this embodiment of this application may include S1001 to S1008.

S1001: The mobile phone A receives a first operation of the user, where the first operation is used to trigger the mobile phone A to start the Cyberverse app.

The first operation may be a tap operation (for example, a single-tap operation) performed by the user (for example, the user a) on the icon 601 of the Cyberverse app shown in FIG. 6(a) after the mobile phone A logs in to the first ID in the Cyberverse app. It may be understood that, after the mobile phone A logs in to the first ID in the Cyberverse app for the first time, provided that the mobile phone A does not log out of the first ID in the Cyberverse app, the mobile phone A may start the Cyberverse app in response to the first operation of the user, and automatically log in to the first ID in the Cyberverse app.

S1002: The mobile phone A displays a first image in response to the first operation, where the first image is obtained by integrating a plurality of pieces of 3D identification information of a digital world into a second image of a real world captured by a camera of the mobile phone A and performing AR rendering.

The plurality of pieces of 3D identification information may include a first 3D identifier and a second 3D identifier. The first 3D identifier is used to identify at least a building, a plant, or a mountain scenery in the real world. The second 3D identifier is used to identify a user (for example, the user b) of the first app.

For example, the method for displaying the first image by the mobile phone A in response to the first operation may include S1002A to S1002E.

S1002A: In response to the first operation, the mobile phone A captures the second image by using the camera, and the mobile phone collects data by using a preset sensor.

The second image is an image of the real world captured by the camera. For example, the second image may be an image 1101 of the real world shown in FIG. 11A(a). The preset sensor may include at least one sensor such as a gyroscope sensor, an acceleration sensor, or a magnetic sensor, and a GPS positioning sensor. Data collected by the GPS positioning sensor is used to determine location information of the mobile phone A. Data collected by the magnetic sensor, the acceleration sensor, and the gyroscope sensor is used to determine posture information of the mobile phone A, for example, an orientation of the camera of the mobile phone A.

S1002B: The mobile phone A obtains spatial posture information of the mobile phone A based on the second image and the data collected by the preset sensor.

The spatial posture information of the mobile phone A may include the location information and the posture information of the mobile phone A. For example, the location information may include a current geographical coordinate location of the mobile phone A. The mobile phone A may determine the location information of the mobile phone A by using the data collected by the GPS positioning sensor. For example, the posture information may be the orientation of the camera of the mobile phone A. For another example, the posture information is used to indicate a spatial posture of the mobile phone A, for example, a spatial posture of the mobile phone A relative to a ground coordinate system. For example, the spatial posture of the mobile phone A relative to the ground coordinate system may be represented by a Euler angle of a preset coordinate system of the mobile phone A relative to the ground coordinate system. For detailed descriptions of the Euler angle of the preset coordinate system of the mobile phone A relative to the ground coordinate system, refer to detailed descriptions of FIG. 17 in an embodiment of this application. Details are not described herein.

It may be understood that if the spatial posture information (including the location information and the posture information) of the mobile phone A is different, the image of the real world captured by the camera of the mobile phone A is different.

On one hand, if the location information of the mobile phone A is different (that is, the mobile phone A is located at different locations), the image of the real world captured by the camera of the mobile phone A is different. For example, the image 1101 of the real world shown in FIG. 11A(a) and an image 1106 of the real world shown in FIG. 11B(a) are images captured by the mobile phone A at different locations on a same street. The image 1101 of the real world is different from the image 1106 of the real world.

On the other hand, even if the location information of the mobile phone A is the same (that is, the mobile phone A is at a same location), if the posture information of the mobile phone A is different, the image of the real world captured by the camera of the mobile phone A is different. For example, it is assumed that the mobile phone A is at a same location, and an image captured by the camera when a display of the mobile phone A is parallel to a horizontal plane is different from an image captured by the camera when the display of the mobile phone A is perpendicular to the horizontal plane.

In conclusion, the spatial posture information of the mobile phone A may affect the image of the real world (namely, the second image) captured by the camera of the mobile phone A. On the contrary, the mobile phone A may calculate the spatial posture information of the mobile phone A by using the second image.

In an embodiment, the mobile phone A may calculate the spatial posture information of the mobile phone A based on the second image and the data collected by the preset sensor.

In some other embodiments, the mobile phone A may send, to the server C by using the Cyberverse app, the second image and the data collected by the preset sensor. The server C calculates the spatial posture information of the mobile phone A based on the second image and the data collected by the preset sensor; and then the server C may send the spatial posture information of the mobile phone A to the mobile phone A.

Specifically, the mobile phone A may send, to the server C, the second image and the data collected by the preset sensor of the mobile phone A. The server C performs spatial computing based on the second image uploaded by the mobile phone A this time and the data collected by the preset sensor, to determine the spatial posture information of the mobile phone A. The spatial posture information includes the location information and the posture information (for example, the orientation of the camera) of the mobile phone A.

In this embodiment of this application, an error of location information (for example, GPS information) obtained by the mobile phone A is large, and the error may range from 10 meters to 40 meters. The server C may re-determine the location information of the mobile phone A based on the data collected by the preset sensor of the mobile phone A and the second image, and an error of the location information determined by the server C is at a centimeter level.

The server C may determine the posture information of the mobile phone A, for example, the orientation of the camera, based on the second image uploaded by the mobile phone A and the data collected by the preset sensor. In an embodiment, the mobile phone A may alternatively determine the posture information of the mobile phone A based on the data collected by the preset sensor, and send the posture information determined by the mobile phone A to the server C. The server C corrects, based on the data collected by the preset sensor of the mobile phone A and the second image, the posture information determined by the mobile phone A.

S1002C: The mobile phone A obtains, from the server C, a 3D model of the digital world corresponding to the location information and the posture information of the mobile phone A.

For example, the mobile phone A may send a first message to the server C by using the Cyberverse app. The first message includes the location information and the posture information of the mobile phone A. The server C may receive the first message from the mobile phone A, and obtain the 3D model of the digital world corresponding to the location information and the posture information in the first message. The server C may send a second message to the mobile phone A. The second message includes the 3D model of the digital world corresponding to the location information and the posture information of the mobile phone A. The mobile phone A may receive the second message from the server C, to obtain the 3D model of the digital world.

Alternatively, after obtaining the location information and the posture information of the mobile phone A, the server C may obtain the 3D model of the digital world corresponding to the location information and the posture information. Then, the 3D model of the digital world is sent to the mobile phone A.

The 3D model of the digital world includes the first 3D identifier and garage kit data of the first 3D identifier. The 3D model of the digital world is created based on 3D data of the real world. In this embodiment of this application, the garage kit data may refer to a three-dimensional structure of an object. Each object in the digital world stored by the server C on the cloud has a three-dimensional structure of the object. The server C may send a three-dimensional structure of a corresponding object to the mobile phone A, and the mobile phone A stores the three-dimensional structure. It should be understood that the three-dimensional structure of the object is a three-dimensional structure used by the mobile phone A to determine a collected two-dimensional image, and the garage kit data is not presented on a display interface of the mobile phone A.

It may be understood that after determining the location information and the posture information of the mobile phone A, the server C may determine, based on information about the digital world and the posture information that are stored in the server C, data of an object (for example, a digital signage and garage kit data of a building) in an image captured by the camera, to send the data to the mobile phone A.

In this embodiment of this application, the 3D data (for example, 3D building data) of the real world may be collected, and a 3D model of the real world is constructed based on the 3D data. For example, the 3D building data may include location contour coordinates, height information, and the like of a building. In addition, the 3D model of the digital world that is in a 1:1 correspondence with the real world may be further constructed. In the 3D model of the digital world, 3D identifiers, that is, first 3D identifiers, of a plurality of objects (such as a building, a plant, or a mountain scenery) in the real world are added. For example, the first 3D identifier may include at least information such as a building name, merchant information, a user comment, or advertisement information. The first 3D identifier may also be referred to as a data signage. According to model data (such as garage kit data) of the 3D model of the digital world, an object identified by the first 3D identifier in the real world, a three-dimensional structure of the first 3D identifier, a display location and posture information of the first 3D identifier information in an image of the real world, and the like may be determined.

The server C stores the 3D model of the real world (for example, model data of the 3D model of the real world) and the 3D model of the digital world (for example, the model data of the 3D model of the digital world). For example, the 3D model of the real world and the 3D model of the digital world may be stored in the virtual object database 904 shown in FIG. 9A.

Figure 11A:
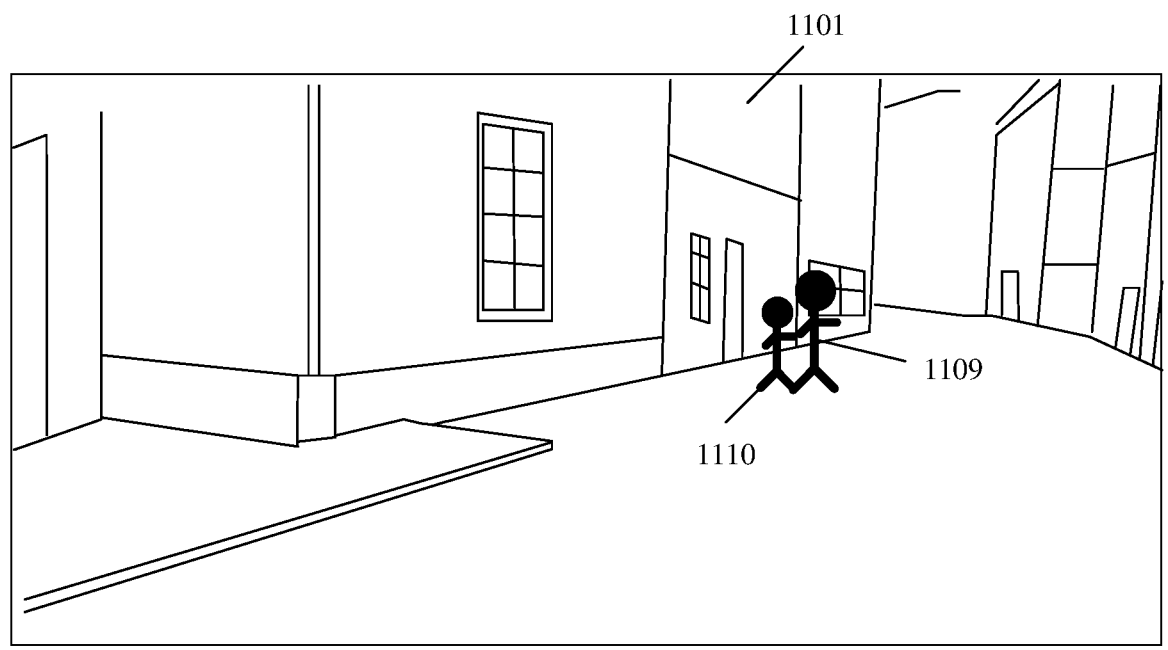
FIG. 11A(a) and FIG. 11A(b) are a schematic diagram of another interface of a Cyberverse app according to an embodiment of this application.
Figure 11A:
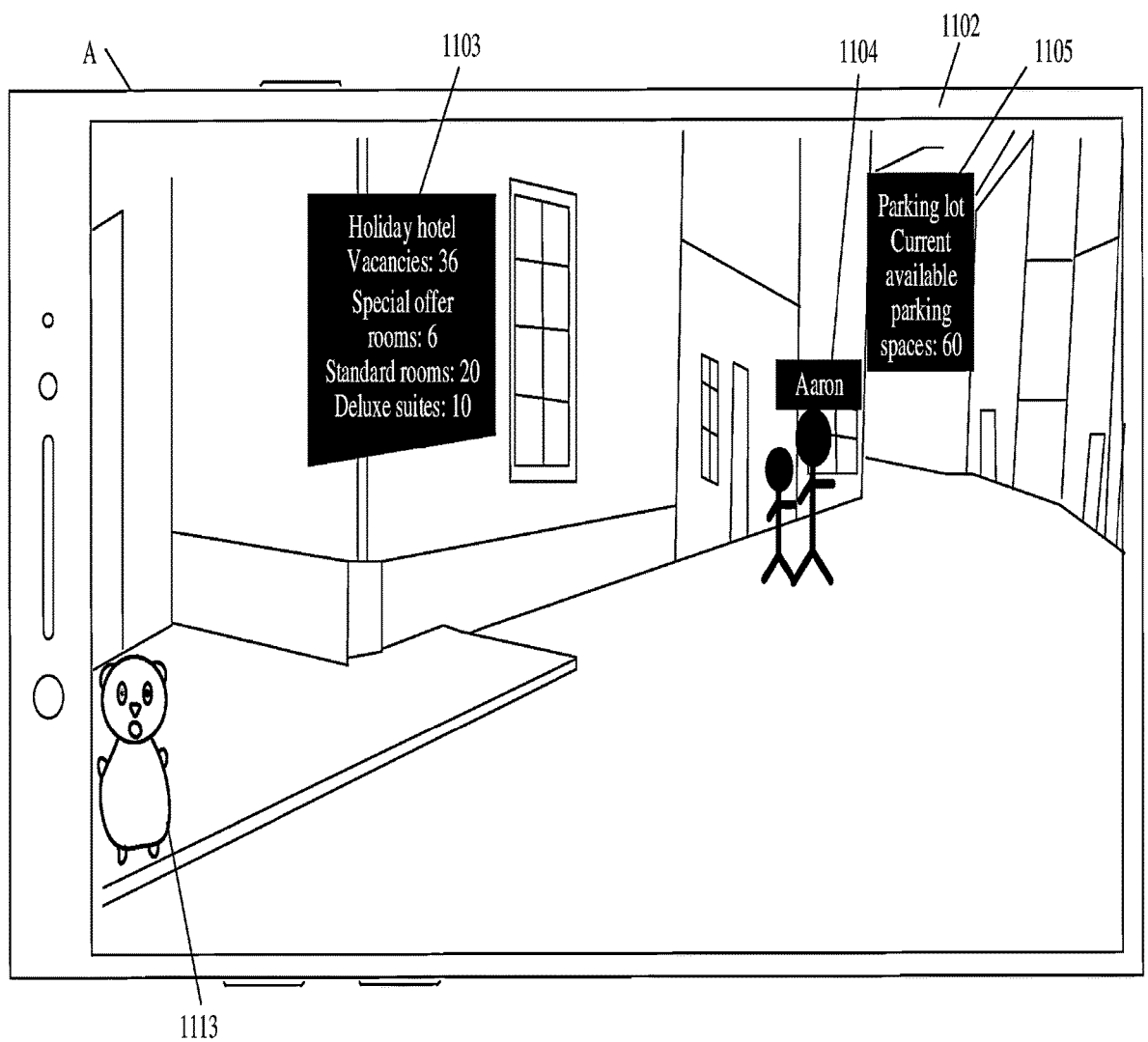

In some other embodiments, the first 3D identifier may alternatively be a virtual object in the digital world, for example, a virtual model of an animal or virtual models of various objects (such as coffee cups) in the real world. It may be understood that the virtual object in the digital world may alternatively be a virtual model of an animal or virtual models of various objects (such as coffee cups) in the real world added by a designer to the 3D model of the digital world that is in a 1:1 correspondence with the real world. For example, as shown in FIG. 11A(b), the first image further includes a first 3D identifier 1113. The first 3D identifier 1113 is a virtual model (demo) of a bear. The second image of the real world shown in FIG. 11A(a) does not include the virtual model of the bear. The virtual model of the bear may be added by a designer to the 3D model of the digital world that is in a 1:1 correspondence with the real world.

S1002D: The mobile phone A obtains the second 3D identifier of the user b from the server C based on a user biometric feature of the user b in the second image, where the user biometric feature includes a face image or iris information.

The second 3D identifier may be the second ID, or the user name or the nickname corresponding to the second ID. In the following embodiment, the method in this embodiment of this application is described by using an example in which the second ID is the nickname (for example, Lucy) corresponding to the second ID.

In an implementation, the mobile phone A may send the second image to the server. The server C may receive the second image, and obtain the user biometric feature b in the second image. Then, the server C may query an ID (for example, the second ID) of the Cyberverse app corresponding to the user biometric feature b, obtain the second 3D identifier corresponding to the second ID, and send the second 3D identifier to the mobile phone A.

Optionally, the mobile phone A may send the second image to the server C by using the first message. That is, the first message may further include the second image.

In another implementation, the mobile phone A may obtain the user biometric feature b in the second image, and then send the user biometric feature b to the server C. The server C may query an ID (for example, the second ID) of the Cyberverse app corresponding to the user biometric feature b, obtain the second 3D identifier corresponding to the second ID, and send the second 3D identifier to the mobile phone A.

Optionally, the mobile phone A may send the user biometric feature b to the server C by using the first message. That is, the first message may further include the user biometric feature b.

Optionally, the server C may send the second 3D identifier to the mobile phone A by using the second message. That is, the second message may further include the second 3D identifier.

It should be noted that the second image may include a user biometric feature of one user, or may include user biometric features of a plurality of users. Therefore, in this embodiment of this application, the mobile phone A may perform S1002D to obtain second 3D identifiers of the plurality of users.

S1002E: The mobile phone A integrates the first 3D identifier and the second 3D identifier into the second image based on the 3D model of the digital world, and the location information and the posture information of the mobile phone A, performs AR rendering to obtain the first image, and displays the first image.

It may be understood that the digital world and the real world are in a 1:1 correspondence. The second image is an image of the real world captured by the camera. Then, the mobile phone A may determine, based on the 3D model of the digital world, the first 3D identifier added to each object in the second image in the digital world, and a location at which the first 3D identifier is added in the real world. In this way, the mobile phone A may perform AR enhancement on the second image, integrate the first 3D identifier and the second 3D identifier of the digital world into the second image based on the foregoing location, and render the second image (that is, the image of the real world) into which the first 3D identifier and the second 3D identifier are integrated, to obtain a virtual-reality integrated first image.

In this embodiment of this application, after obtaining the 3D model (including the first 3D identifier, the garage kit data of the first 3D identifier, and the second 3D identifier) of the digital world, the mobile phone A may match the data with each object in the second image. The 3D model of the digital world further indicates a correspondence between the first 3D identifier, garage kit data of the first 3D identifier, and the second 3D identifier, and each object in the second image, so that the mobile phone A can integrate 3D identification information of the object into the second image, perform AR rendering to obtain the first image, and display, in real time, the first image including the 3D identification information of the corresponding object. As shown in FIG. 11A(a) and FIG. 11A(b), a building "holiday hotel" on the left corresponds to a first 3D identifier 1103, and a building "parking lot" on the right corresponds to a first 3D identifier 1105.

For example, the image 1101 of the real world shown in FIG. 11A(a) is the second image captured by the camera of the mobile phone A. Generally, the mobile phone A may display the second image captured by the camera. However, in this embodiment of this application, the mobile phone A does not display the second image, but displays the virtual-reality integrated first image obtained by rendering the second image. For example, the mobile phone A may display a first image 1102 shown in FIG. 11A(b). As shown in FIG. 11A(b), the first image 1102 may include not only the second image, but also a plurality of pieces of 3D identifier information, for example, the first 3D identifier 1103 of the holiday hotel, a second 3D identifier 1104 of a user Aaron (Aaron), and the first 3D identifier 1105 of the parking lot.

In some embodiments, the second image captured by the camera of the mobile phone A may include an image of a user who has registered an account with the Cyberverse app. For example, the image 1101 (namely, the second image) of the real world shown in FIG. 11A(a) includes an image 1109 of a user X and an image 1110 of a user Y. The user X (that is, a user corresponding to the image 1109) registers an account (for example, the third ID) with the Cyberverse app by using an electronic device (for example, a mobile phone) of the user, and enters a user biometric feature of the user X. The nickname of the third ID is Aaron. As shown in Table 2, the server C stores the third ID, the user biometric feature X of the user X, the nickname Aaron of the third ID, and a correspondence between the third ID, the user biometric feature X of the user X, and the nickname Aaron of the third ID. The user Y (that is, a user corresponding to the image 1110) does not register an account with the Cyberverse app by using an electronic device of the user.

For example, as shown in FIG. 11A(b), the first image 1102 displayed by the mobile phone A includes the second 3D identifier 1104 of the user X corresponding to the image 1109 shown in FIG. 11A(a). However, the first image 1102 does not include the second 3D identifier of the user corresponding to the image 1110 shown in FIG. 11A(a).

It may be understood that the second 3D identifier of the user in the first image may be used to not only identify the user, but also indicate that the user is interactive. For example, the mobile phone A displays, in the first image, the second 3D identifier of the user corresponding to the user biometric feature in the second image, to clearly indicate, to the user a (that is, a user using the mobile phone A), a user whose ID has been registered with the Cyberverse app and that is included in a field of view of the camera of the mobile phone A. This facilitates communication between registered users of the Cyberverse app.

For example, if the user X is near the user a and is located within the field of view of the camera of the mobile phone A, the mobile phone A may implement the following functions in response to an operation performed by the user a on an image of the user X in the first image: sharing data with the mobile phone of the user X, adding the user X as a friend in the Cyberverse app, and the like. In this embodiment of this application, a method for sharing, by the mobile phone A in response to an operation performed by the user a on an image of any user in the first image, data with an electronic device of the user is described.

It should be noted that, in some embodiments, the mobile phone A may store, in the Cyberverse app, an ID and a user biometric feature of a user whose first ID has been added as a friend. Optionally, the mobile phone A may further store the second 3D identifier of the user. In this case, the mobile phone A does not need to query the server C for the ID corresponding to the user biometric feature of the added friend and the second 3D identifier (for example, the user name or the nickname).

For example, the mobile phone A may store the ID and the user biometric feature table shown in Table 5.

TABLE 5

| ID and user biometric feature | | |
|---|---|---|
| ID | User biometric feature | User name/Nickname |
| Second ID | User biometric feature b | Lucy |
| Third ID | User biometric feature X | Aaron |
| . . . | . . . | . . . |

Specifically, after the camera of the mobile phone A captures the second image, the mobile phone A may identify and obtain the user biometric feature in the second image. Then, the mobile phone A may search the mobile phone A for the ID corresponding to the user biometric feature in the second image. If the mobile phone A does not find the ID corresponding to the user biometric feature, the mobile phone A may send the first message including the user biometric feature or the second image to the server C. If the mobile phone A finds the ID corresponding to the user biometric feature, the first message sent by the mobile phone A to the server C may not include the user biometric feature or the second image.

Optionally, in some embodiments, the second 3D identifier of the user included in the first image is a second 3D identifier of a user whose first ID has been added as a friend. That is, even if the second image includes user biometric features of a plurality of users whose IDs have been registered with the Cyberverse app, the first image includes only the second 3D identifier of the user whose first ID has been added as a friend.

For example, it is assumed that the second image includes user biometric features of a user 1, a user 2, and a user 3. The user 1 has not registered an ID with the Cyberverse app, and the user 2 and the user 3 have registered IDs with the Cyberverse app. The ID of the user 2 and the first ID are in a friend relationship, and the ID of the user 3 and the first ID are not in a friend relationship. In this case, the first image includes images of the user 1 and the user 3, but the first image does not include second 3D identifiers of the user 1 and the user 3. The first image includes an image of the user 2 and a second 3D identifier of the user 2.

In some embodiments, the mobile phone A needs to be authorized by the user X to display the second 3D identifier of the user X in the first image. For example, the mobile phone of the user X may receive a setting of the user X, and a display permission of the second 3D identifier of the user X is set as any one of: visible to all, visible to friends, or the like. The server C may store display permissions of second 3D identifiers of users corresponding to IDs.

It may be understood that, as the mobile phone A moves, the spatial posture information of the mobile phone A changes, the field of view of the camera of the mobile phone A changes, and the second image captured by the camera also changes accordingly. For example, after the mobile phone A moves, the second image captured by the camera of the mobile phone A may change from the second image 1101 shown in FIG. 11A(a) to the second image 1106 shown in FIG. 11B(a). The second image 1106 is different from the second image 1101. For example, the second image 1106 includes an image 1111 of the user b.

If images (that is, second images) of real scenes captured by the camera of the mobile phone A are different, when the Cyberverse app of the mobile phone A performs AR enhancement on the images of the different real scenes, information about the digital world that needs to be integrated is different, and virtual-reality integrated images (that is, first images) obtained by the Cyberverse app are also different. For example, the first image displayed by the mobile phone A may change from the first image 1102 shown in FIG. 11A(b) to a first image 1107 shown in FIG. 11B(b). The first image 1107 is different from the first image 1102. For example, the first image 1107 includes 3D identification information 1108 (that is, the first 3D identifier) of an ABC shopping mall, the image of the user b (that is, Lucy), and the second 3D identifier (for example, Lucy 1112) of the user b, but the first image 1102 does not include a first 3D identifier 1108 (that is, the first 3D identifier) of the ABC shopping mall, the image of the user b (that is, Lucy), and the second 3D identifier (for example, Lucy 1112) of Lucy.

Figure 11B:
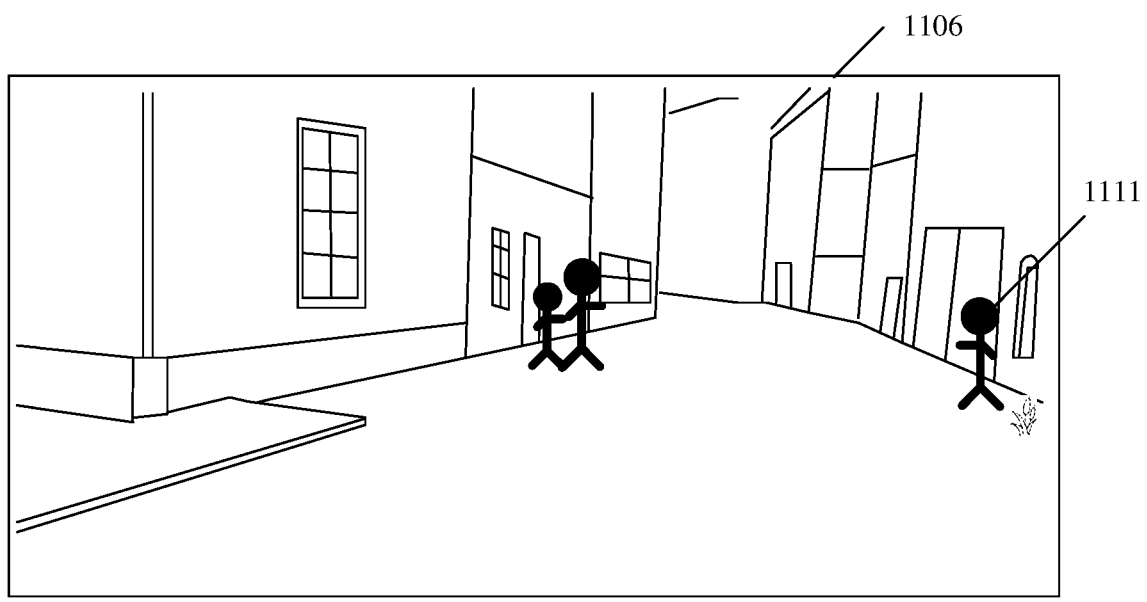
FIG. 11B(a) and FIG. 11B(b) are a schematic diagram of another interface of a Cyberverse app according to an embodiment of this application.
Figure 11B:
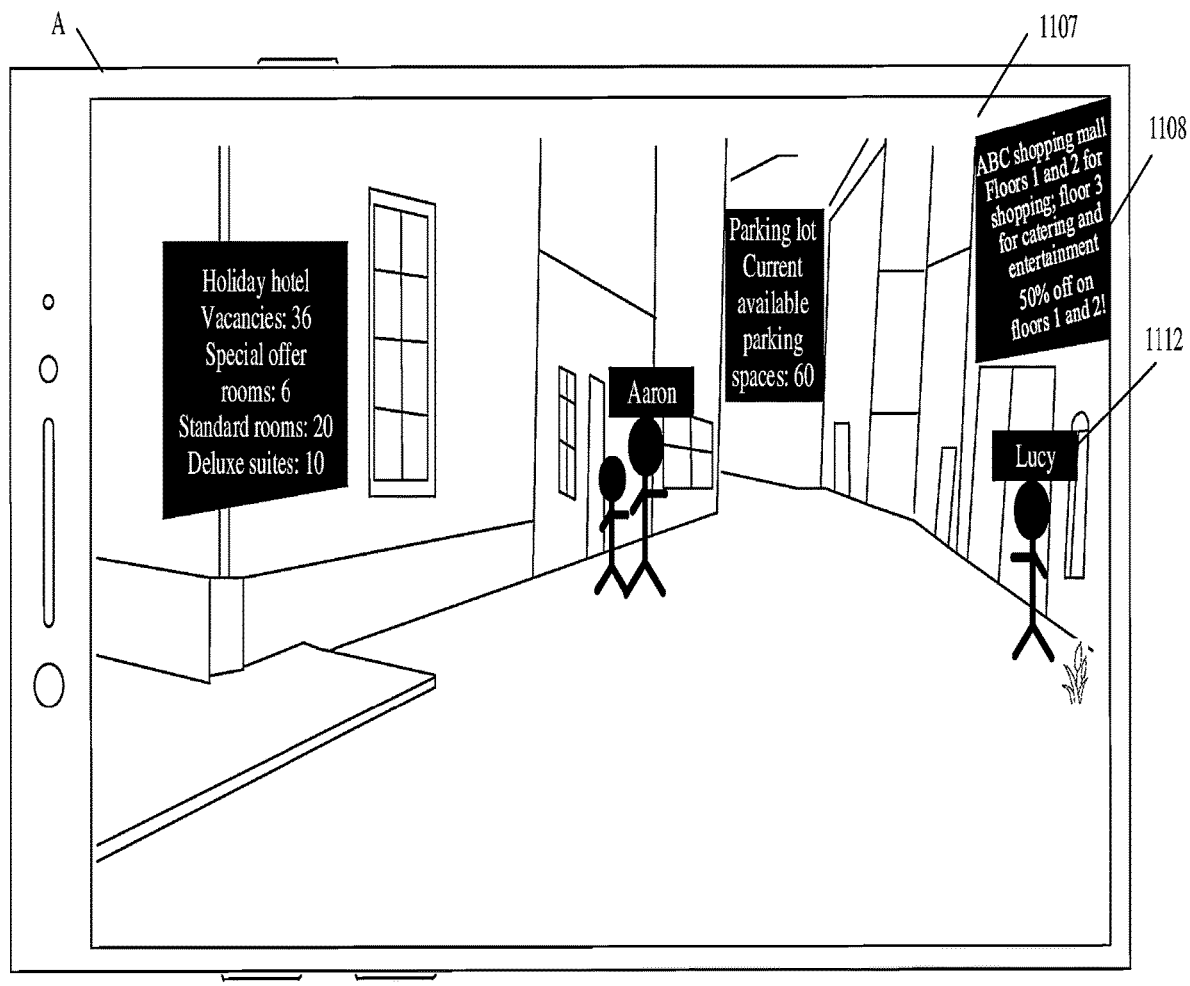

In an implementation, for a user corresponding to the user biometric feature included in the second image, a location of the second 3D identifier of the user in the first image may be preset. For example, as shown in FIG. 11B(b), the second 3D identifier (for example, Lucy 1112) of the user b may be displayed on top of the user b.

In another implementation, for a user corresponding to the user biometric feature included in the second image, a location of the second 3D identifier of the user in the first image may be determined based on location information of an electronic device (for example, a mobile phone) of the user.

As described in S1002, the mobile phone A may send the location information of the mobile phone A to the server C. Similarly, another electronic device (for example, the mobile phone B) may also send location information of the another electronic device (for example, the mobile phone B) to the server C. The second message may further include location information of the user corresponding to the user biometric feature included in the second image. In this way, the mobile phone A may determine a location of the second 3D identifier of the user b in the first image based on the location information of the mobile phone B. For example, in response to the first operation, the mobile phone B may start the Cyberverse app of the mobile phone B, perform a related method in S1002, obtain the location information of the mobile phone B, and send the location information of the mobile phone B to the server C.

Alternatively, the location information of the user b corresponding to the user biometric feature included in the second image may be obtained by the mobile phone A by performing depth calculation on the user b based on the second image captured by the camera. Certainly, the mobile phone A may further perform depth calculation on the user b based on the second image with reference to the 3D model of the digital world corresponding to the location information of the mobile phone A, to obtain the location information of the user b. The location information is a location of the user b relative to the mobile phone A in the first image (that is, the virtual-reality integrated image).

It may be understood that the second image of the real world changes with a location or a shooting angle of the mobile phone A and movement of each user in the field of view. The first image is obtained by integrating the first 3D identifier and the second 3D identifier into the second image and performing AR rendering. Therefore, the first image also changes with the location or the shooting angle of the mobile phone A and the movement of each user in the field of view. For example, the user b identified by Lucy 1112 (that is, the second 3D identifier) shown in FIG. 11B(b) may move, so that the first image changes.

In some embodiments, after displaying a second 3D identifier of a user in the first image, the mobile phone A may continuously track the user by using a body tracking algorithm until the user leaves the field of view of the camera of the mobile phone A. It may be understood that the mobile phone A continuously tracks a user by using the body tracking algorithm, so that a second 3D identifier of the user can be continuously displayed in the first image until the user leaves the field of view of the camera of the mobile phone A.

In some cases, the user b identified by Lucy 1112 (that is, the second 3D identifier) shown in FIG. 11B(b) may move, so that the user b faces away the camera of the mobile phone A. In this case, even if the mobile phone A cannot obtain the user biometric feature of the user b, the mobile phone A may continuously track the user b by using the human body tracking algorithm to determine which user the user b is, and determine and display the second 3D identifier of the user b.

S1003: The mobile phone A displays one or a plurality of virtual objects in response to a second operation.

The one or the plurality of virtual objects may include one or more of a virtual ship, a virtual car, a virtual currency, a virtual rose, an emoticon, and the like. The virtual object may be downloaded by the mobile phone A from the server C. The server C may store the first virtual information of the first ID, and the one or the plurality of virtual objects are virtual objects indicated by the first virtual information (the first virtual information shown in Table 4-1). For example, the server C may store the first virtual information shown in Table 4-1 and the second virtual information shown in Table 4-2.

Certainly, the mobile phone A may also store a virtual object downloaded by an account (that is, the first ID) of the Cyberverse app to which the mobile phone A logs in or a virtual object received from another device. For example, the mobile phone A may store the virtual object shown in Table 6. An identifier of the virtual object shown in Table 6 is the same as the identifier of the virtual object in the first virtual information shown in Table 4-1.

TABLE 6

| Virtual object | |
| --- | --- |
| Identifier (for example, virtual identifier 1) of an emoticon a (for example, a love icon) | Emoticon a |
| Identifier (for example, virtual identifier 3) of a virtual car | Virtual car |
| Identifier (for example, virtual identifier n) of a virtual rose | Virtual rose |

The second operation may be a preset sliding operation entered by the user on the mobile phone A when the mobile phone A displays the first image. The preset sliding operation is used to trigger the mobile phone A to display the one or the plurality of virtual objects. For example, the second operation may be an operation of sliding from a lower bezel of the mobile phone A to the display shown in FIG. 12(*a*).

Alternatively, the second operation may be a preset gesture (not shown in the figure), for example, an S-shaped gesture, an L-shaped gesture, a √-shaped gesture, or a gesture of any shape, input by the user on the display of the mobile phone A when the mobile phone A displays the first image. Alternatively, when displaying the first image, the mobile phone A may further display a preset control (for example, a button), and the preset control is used to trigger the mobile phone A to display the one or the plurality of virtual objects. The second operation may be a tap operation (for example, a single-tap operation) performed by the user on the preset control. In the following embodiment, the method in this embodiment of this application is described by using an example in which the mobile phone A displays the plurality of virtual objects.

Figures 12A, 12B:
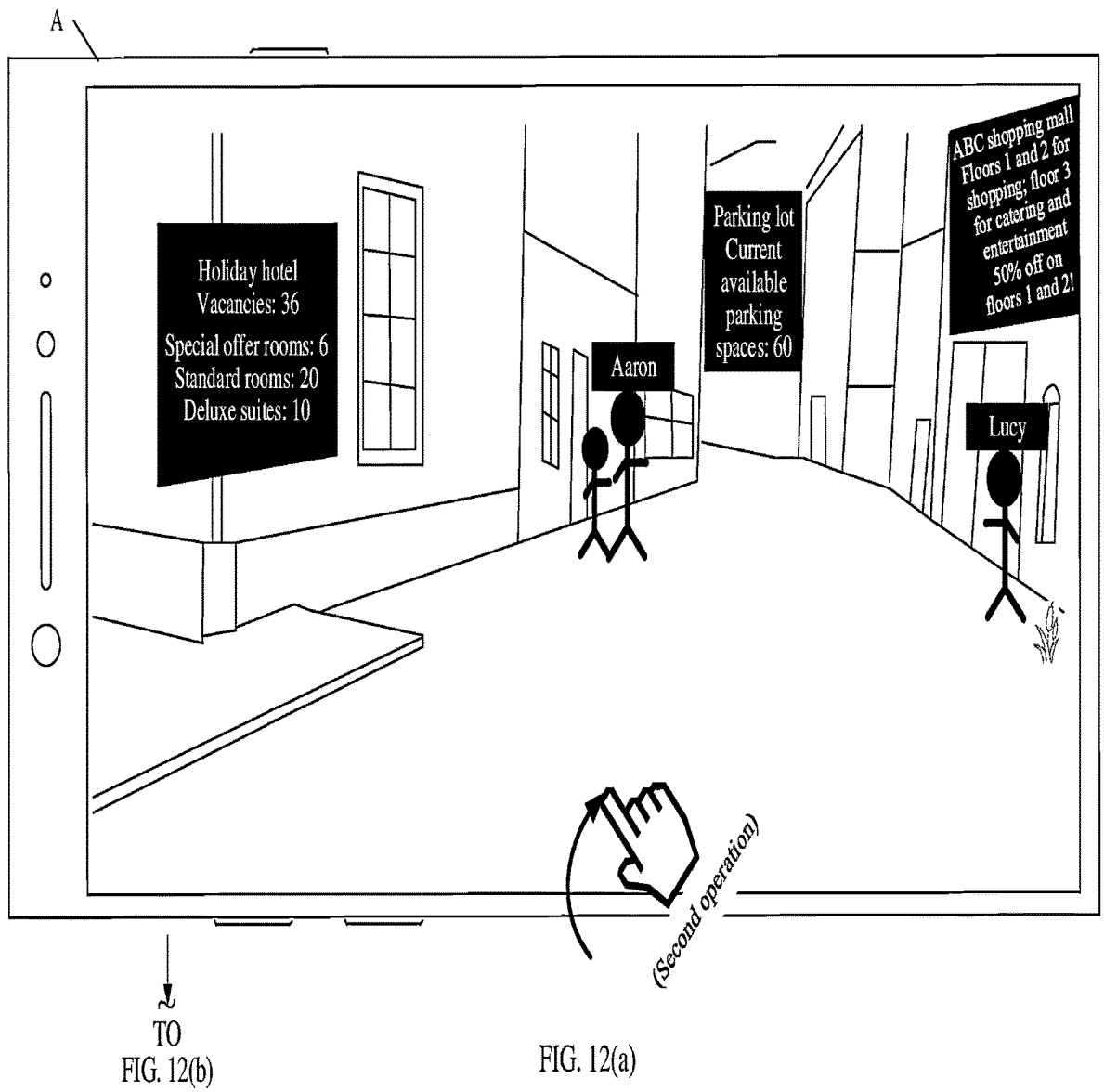
FIG. 12(a) and FIG. 12(b) are a schematic diagram of another interface of a Cyberverse app according to an embodiment of this application.

For example, the second operation is the operation of sliding from a lower bezel of the mobile phone A to the display shown in FIG. 12(a). As shown in Table 6, the virtual object stored in the mobile phone A includes the emoticon a (for example, the love icon), the virtual car, and the virtual rose. Therefore, in response to the second operation that is entered by the user on the mobile phone A and that is shown in FIG. 12(a), the mobile phone A may display an interface 1201 shown in FIG. 12(b). The interface 1201 includes a plurality of virtual objects 1202. The plurality of virtual objects 1202 may include a love icon, a virtual car, a virtual rose, and an identifier of a virtual-reality integrated image or video shot by the user a in Block X by using the Cyberverse app (for example, Cyberverse Block X shooting 1204). Optionally, the one or the plurality of virtual objects may further include a virtual model in the 3D model of the digital world, for example, a virtual model (demo) 1205 of a bear shown in FIG. 12(b). The virtual model 1205 of the bear is the first 3D identifier 1113 shown in FIG. 11A(b). The first 3D identifier 1113 is a virtual model of a bear.

Optionally, in response to the second operation, the mobile phone A may further display prompt information, for example, prompt information "Please select a gift for a friend" 1203 shown in FIG. 12(b).

It should be noted that, in this embodiment of this application, a manner in which the mobile phone A displays the plurality of virtual objects includes but is not limited to the display manner shown in FIG. 12(b), and another display manner is not described in detail herein in this embodiment.

S1004: In response to a first sliding operation of the user, the mobile phone A displays a dynamic image of a first virtual object moving towards the image of the user b along a sliding track of the first sliding operation, where a start point of the sliding track is the first virtual object, and an end point is the image of the user b.

The start point of the sliding track of the first sliding operation is the first virtual object, which indicates that the user a selects the first virtual object as to-be-shared data. The end point of the sliding track of the first sliding operation is the image of the user b, which indicates that the user a selects the user b as a destination end for receiving the first virtual object. That is, the user a wants to share the first virtual object with the user b.

Figures 13A, 13B:
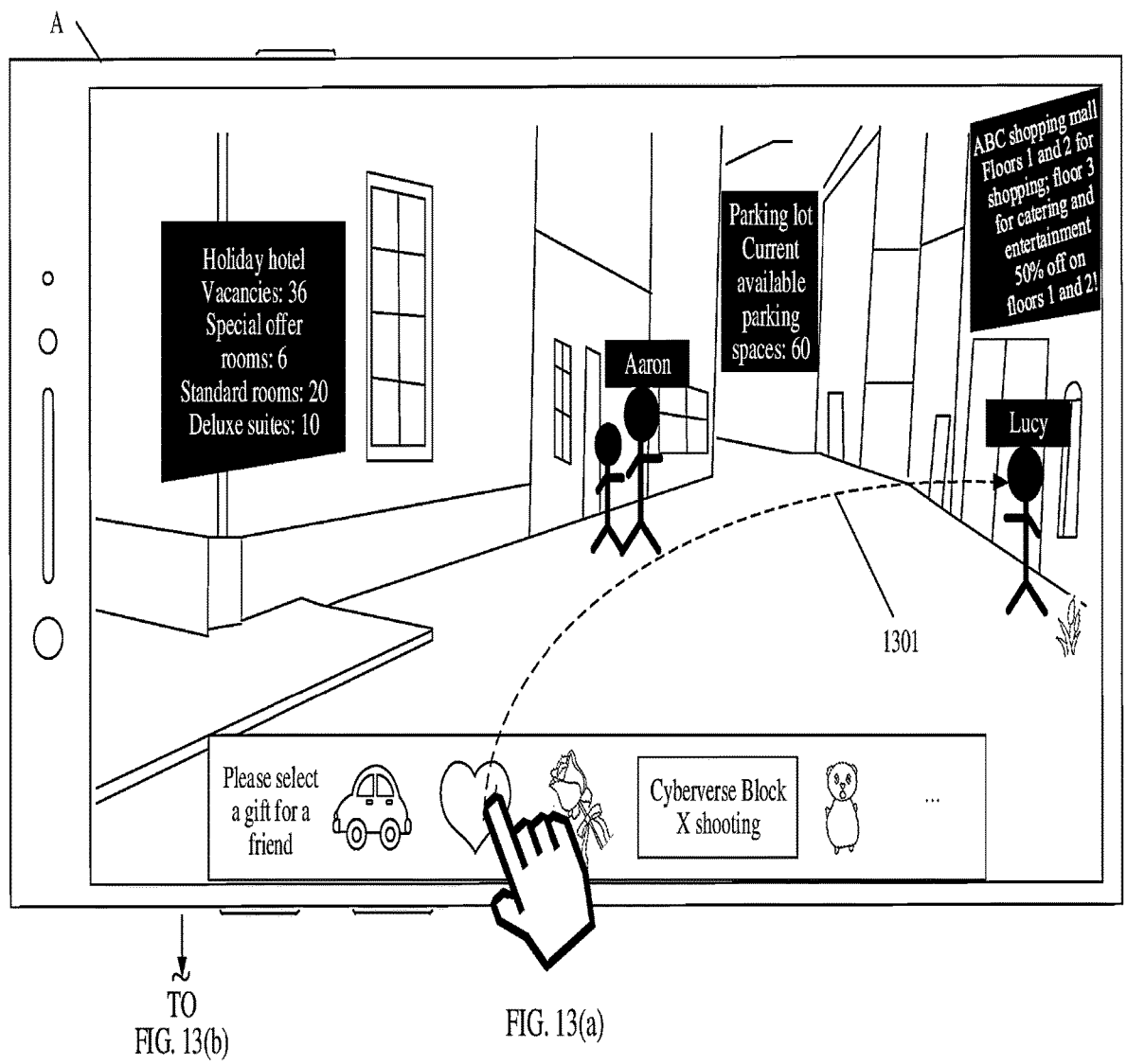
FIG. 13(a) and FIG. 13(b) are a schematic diagram of another interface of a Cyberverse app according to an embodiment of this application.

For example, the sliding track of the first sliding operation may be a sliding track 1301 shown by a dashed line in FIG. 13(a). A start point of the sliding track 1301 is a love icon (that is, the first virtual object), and an end point of the sliding track 1301 is an image of Lucy (that is, the user b). Therefore, in response to the first sliding operation shown in FIG. 13(a), the mobile phone A may display a dynamic image of the love icon (that is, the first virtual object) shown in FIG. 13(b) moving towards the image of Lucy along the sliding track 1301.

The dynamic image of the first virtual object moving towards the image of the user b along the sliding track may be obtained by the mobile phone A by performing rendering in a parabolic process based on the sliding track 1301.

Optionally, in response to the first sliding operation, the virtual object stored in the mobile phone A changes. For example, in response to the first sliding operation, the virtual object stored in the mobile phone A changes from the virtual object shown in Table 6 to the virtual object shown in Table 7.

TABLE 7

| Virtual object | |
| --- | --- |
| Identifier (for example, virtual identifier 3) of a virtual car | Virtual car |
| Identifier (for example, virtual identifier n) of a virtual rose | Virtual rose |
| ... | ... |

It can be learned by comparing Table 6 with Table 7 that, in response to the first sliding operation, the mobile phone A deletes the emoticon a (for example, the love icon) in Table 6.

Correspondingly, as shown in FIG. 13(b), in response to the first sliding operation, the plurality of virtual objects displayed by the mobile phone A also change. For example, in response to the first sliding operation, the plurality of virtual objects displayed by the mobile phone A change from the love icon, the virtual car, and the virtual rose shown in FIG. 13(a) to the virtual car and the virtual rose shown in FIG. 13(b).

Certainly, in response to the first sliding operation, the mobile phone A may not delete the emoticon a (for example, the love icon) in Table 6. The user of the mobile phone B may accept the love icon shared by the mobile phone A, or may reject the love icon shared by the mobile phone A. The mobile phone A may determine, based on a sharing result fed back by the server C to the mobile phone A (for example, the mobile phone B accepts/rejects the love icon), whether to delete the emoticon icon a (for example, the love icon) in Table 6.

S1005: The mobile phone A sends a first request message to the server C, where the first request message is used to request the server C to push the first virtual object to the mobile phone B logging in to the second ID.

The first request message includes the first ID, an identifier of the first virtual object, and the second ID.

Figure 14:
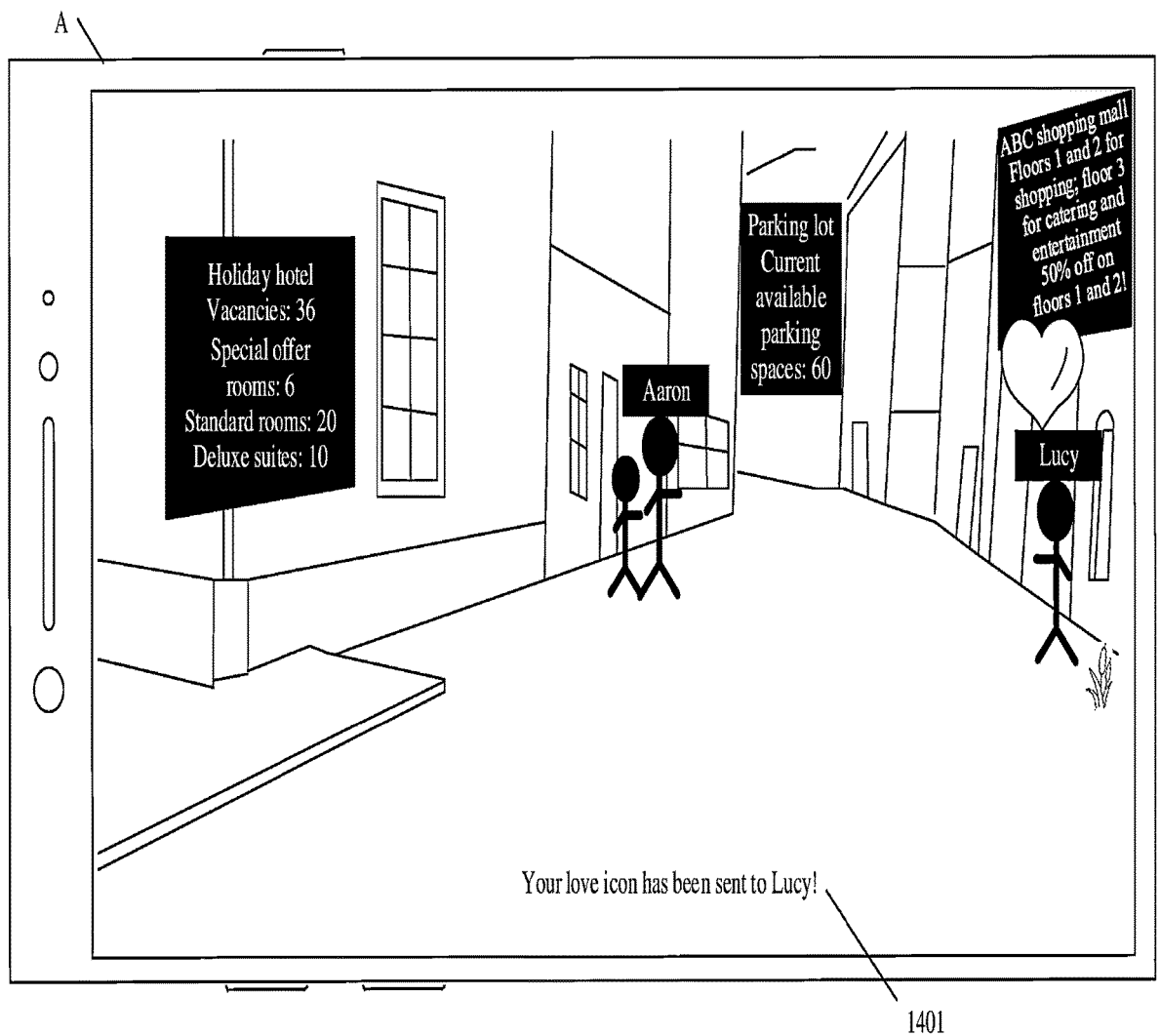
FIG. 14 is a schematic diagram of another interface of a Cyberverse app according to an embodiment of this application.

In some other embodiments, after the mobile phone A sends the first request message to the server C, the mobile phone A may display third prompt information. The third prompt information is used to indicate that the first virtual object is shared with the user b. For example, the mobile phone A may display third prompt information 1401 shown in FIG. 14, for example, "Your love icon has been sent to Lucy!".

S1006: The server C receives the first request message.

S1007: The server C sends a first push message to the mobile phone B logging in to the second ID, where the first push message includes the first ID and the first virtual object.

For example, the server C may send the first push message to the mobile phone B after the mobile phone B goes online (that is, the mobile phone B logs in to the second ID in the Cyberverse app). Optionally, the first push message may further include the identifier of the first virtual object, and a user name or a nickname corresponding to the first ID.

In this embodiment of this application, the mobile phone A requests, by using the Cyberverse app, the server C to share the first virtual object with the mobile phone B. Regardless of whether the Cyberverse app of the mobile phone B is online (that is, whether the mobile phone B logs in to the second ID in the Cyberverse app) when the mobile phone A sends the first request message to the server C, provided that the server C receives the first request message, the server C may send the first push message to the mobile phone B after the mobile phone B goes online. That is, according to this solution, offline sharing of a virtual object can be implemented between electronic devices.

S1008: The mobile phone B receives the first push message from the server C, and displays a first interface, where the first interface is used to indicate that the mobile phone B receives the first virtual object from the first ID.

It may be understood that, when the mobile phone B receives the first push message, the mobile phone B may display an interface of the first app, or may display any one of an interface of another application, a lock screen interface, or a home screen (that is, a desktop) of the mobile phone. For example, the mobile phone B displays the home screen. With reference to the foregoing example, the nickname of the first ID is Bob. As shown in (a) in FIG. 15A, the mobile phone B may display a first interface shown in (a) in FIG. 15A, that is, display prompt information 1501 on the home screen in a form of a notification message, for example, "Bob shares a love icon with you".

Optionally, the mobile phone B may further indicate, to the user in another manner, that the mobile phone B receives the first virtual object from the first ID, for example, display the first virtual object (for example, the love icon) on the first interface. For example, the mobile phone B may display a first interface shown in FIG. 15B, that is, display prompt information 1503 on the home screen in a form of a notification message. The first interface shown in FIG. 15B includes the first virtual object (for example, the love icon).

In this embodiment of this application, a specific manner of indicating, by the mobile phone B to the user, that the mobile phone B receives the first virtual object from the first ID is not limited.

In the method provided in this embodiment of this application, the mobile phone A can present, to the user by using the Cyberverse app, a virtual-reality integrated image (namely, the first image) obtained after AR rendering is performed on the real world wherever the user goes, so that the user can easily learn of various information in a surrounding real scenario.

In addition, if the user enters, in the virtual-reality integrated image displayed by the mobile phone, a parabolic operation (that is, the first sliding operation) in which a start point of the sliding track is the to-be-shared virtual object and an end point is an image of a target user, the mobile phone A may be triggered to share the virtual object with a mobile phone of the target user in response to the first sliding operation. The mobile phone A may display the dynamic image of the first virtual object moving towards the image of the user b along the sliding track.

According to this solution, the mobile phone A can implement sharing of a virtual object in response to the parabolic operation pointing to the image of the target user. This can reduce UI interaction for data sharing in an AR/VR scenario, thereby ensuring display effects of information in the AR/VR scenario. In addition, by using the foregoing solution, a visualization feature of an AR/VR platform provided by the Cyberverse app for the real world can be fully demonstrated, and a visualized data sharing service in the real world can be provided for the user.

Further, if the user b who has registered an ID with the Cyberverse app exists in the field of view of the camera of the mobile phone A, the first image may include the second 3D identifier of the user b. The second 3D identifier of the user b may identify the user b, so that the user a using the mobile phone A can identify and select the target user.

Figure 13B:
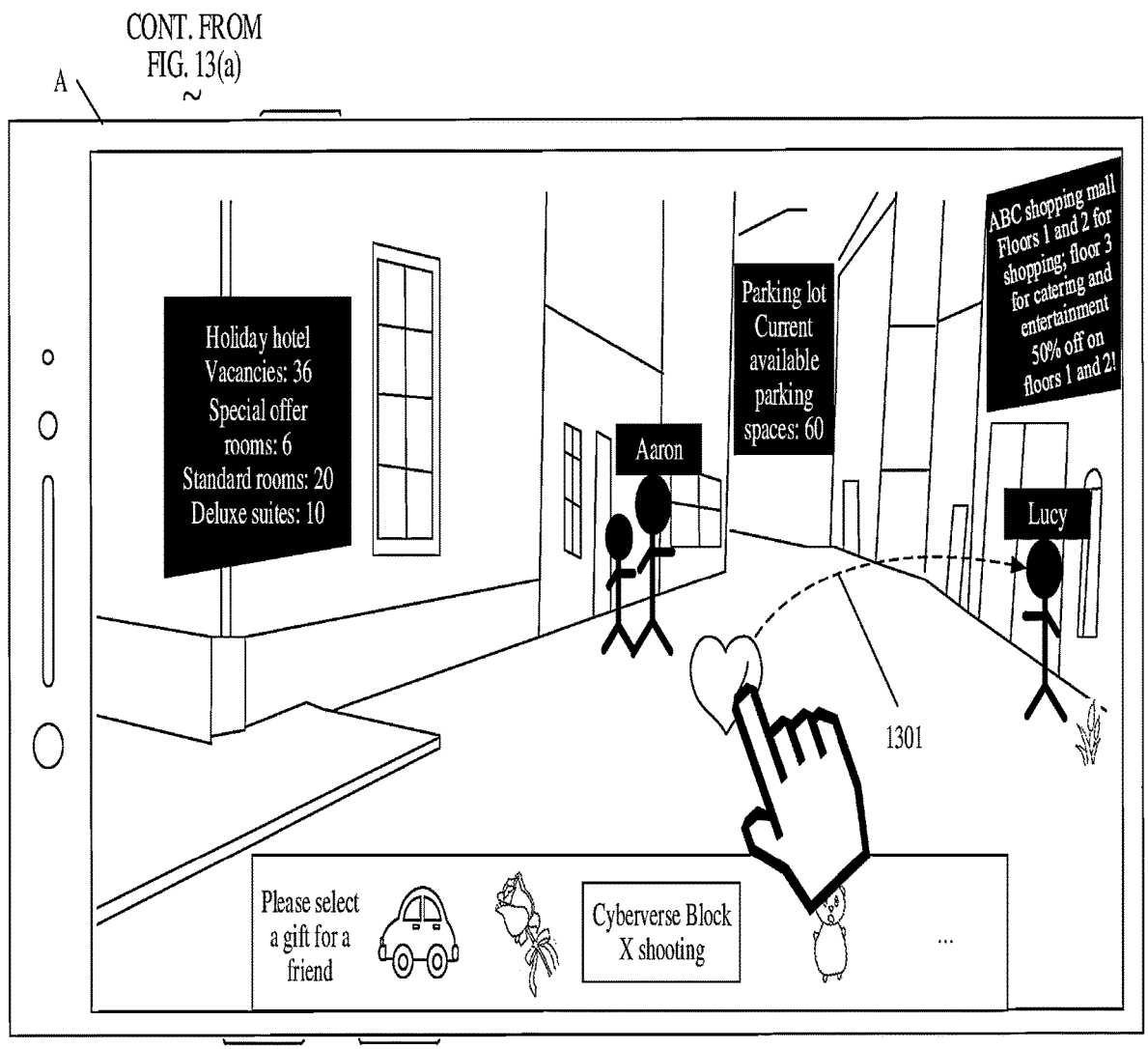

In some other embodiments, the first image displayed by the mobile phone A may include images of a plurality of users and second 3D identifiers of the plurality of users. For example, as shown in FIG. 13(*a*), the first interface includes images and second 3D identifiers of Aaron and Lucy. Different from the foregoing embodiment, in this embodiment, in response to the first sliding operation, regardless of which user in the first image the first sliding operation points to, the mobile phone A may share the first virtual object with an ID corresponding to each user in the plurality of users.

Alternatively, in this embodiment, in response to the first sliding operation, the mobile phone A may not only share the first virtual object with an ID of a user to which the first sliding operation points, but also share the first virtual object with an ID of a user whose distance from the user is less than a preset distance threshold.

In some other embodiments, the field of view of the camera of the mobile phone A may include a plurality of users. The plurality of users include a target object (for example, the user b) with which the user a wants to share the virtual object. In some cases, the user b may be with a plurality of other users, and the other users may block the user biometric feature of the user b. Consequently, the mobile phone A cannot collect the user biometric feature of the user b, and the mobile phone A cannot determine the ID and the second 3D identifier of the user b. In this case, the mobile phone A may send prompt information to indicate that the user b cannot receive a shared virtual object. In addition, the mobile phone A may continuously track the user b by using the body tracking algorithm. After the mobile phone A collects the user biometric feature of the user, the mobile phone A may send prompt information to indicate that the user a can share a virtual object with the user b or the user b can receive a shared virtual object.

It should be noted that, that the mobile phone A cannot collect the user biometric feature of the user b specifically means that the mobile phone A cannot collect an important biometric feature that can be used to identify an identity of the user b. For example, the important biometric feature may be iris information of the user.

In conclusion, according to the method provided in this embodiment of this application, even if the target object (for example, the user b) with which the user a wants to share the virtual object is in the crowd, the virtual object may be shared with the target object by using the method in this embodiment of this application.

In some embodiments, the first interface may be further used to request the user b to confirm whether to accept the first virtual object. For example, prompt information 1502 shown in (b) in FIG. 15A includes: "Bob shares a love icon with you. Do you accept it?", and a "Yes" button and a "No" button. In this way, the mobile phone B may accept or reject the first virtual object such as the love icon according to a selection of the user b and an intention of the user b.

Figures 1, 16A:
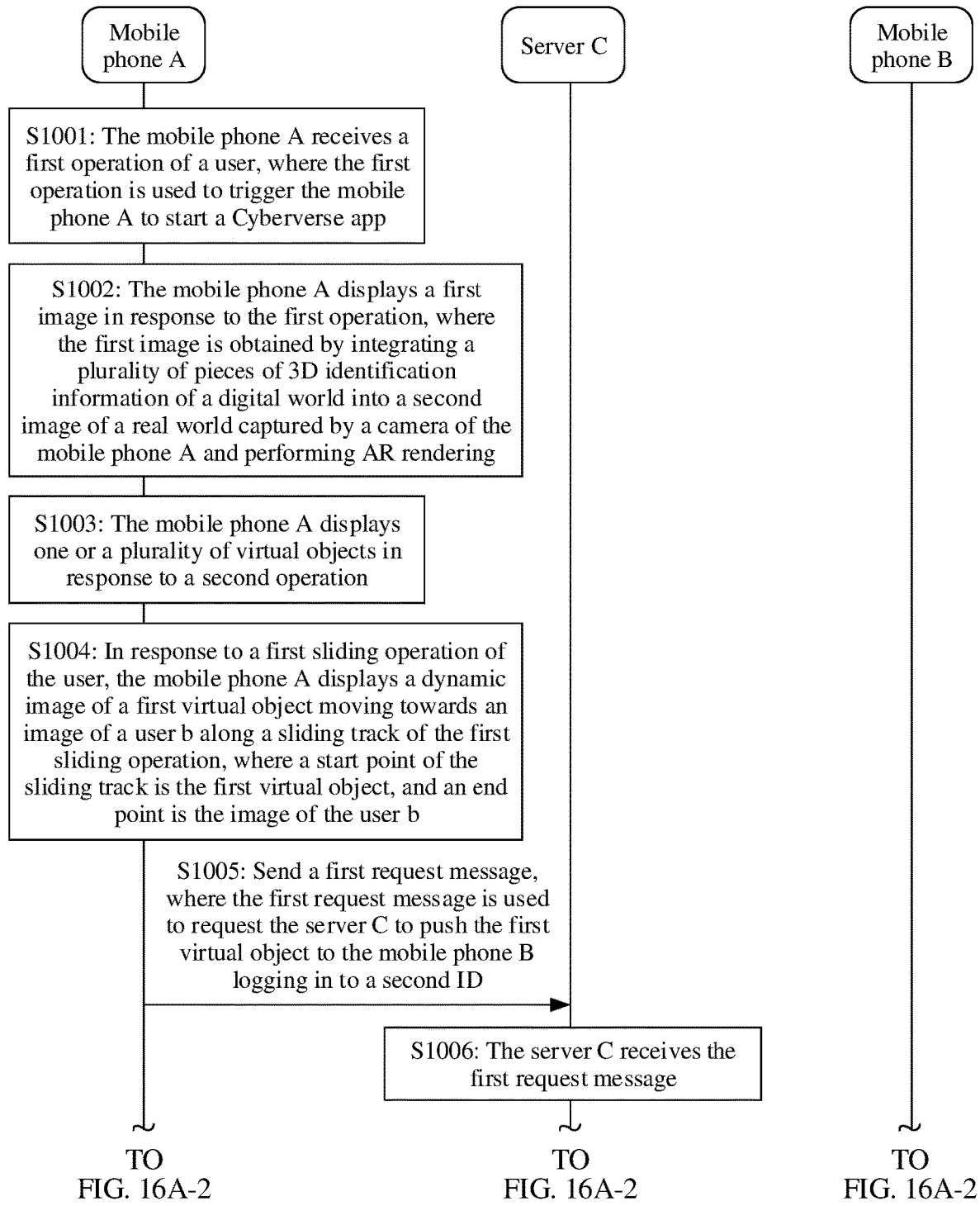

As shown in FIG. 16A-1 to FIG. 16A-3, after S1008 shown in FIG. 10, the method in this embodiment of this application further includes S1601 to S1608.

S1601: The mobile phone B sends a first push response to the server C in response to a third operation of the user b on the first interface, where the first push response is used to indicate the mobile phone B to accept the first virtual object shared by the mobile phone A.

The first push response may include the first ID, the second ID, the identifier of the first virtual object, and first indication information. The first indication information is used to indicate the mobile phone B logging in to the second ID to accept the first virtual object shared by the mobile phone A logging in to the first ID.

Figure 15A:
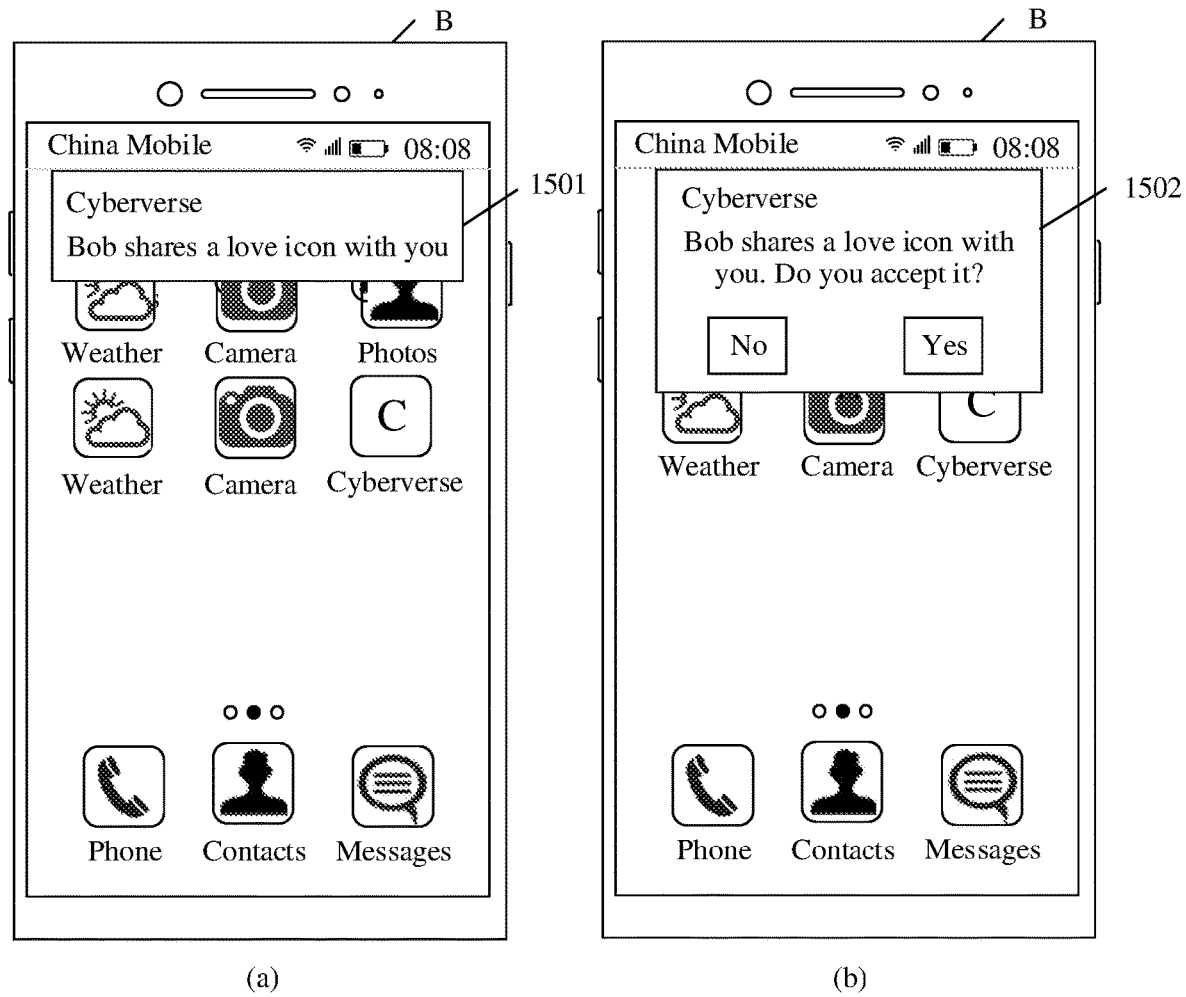
FIG. 15A is a schematic diagram of a first interface according to an embodiment of this application.
Figure 15B:
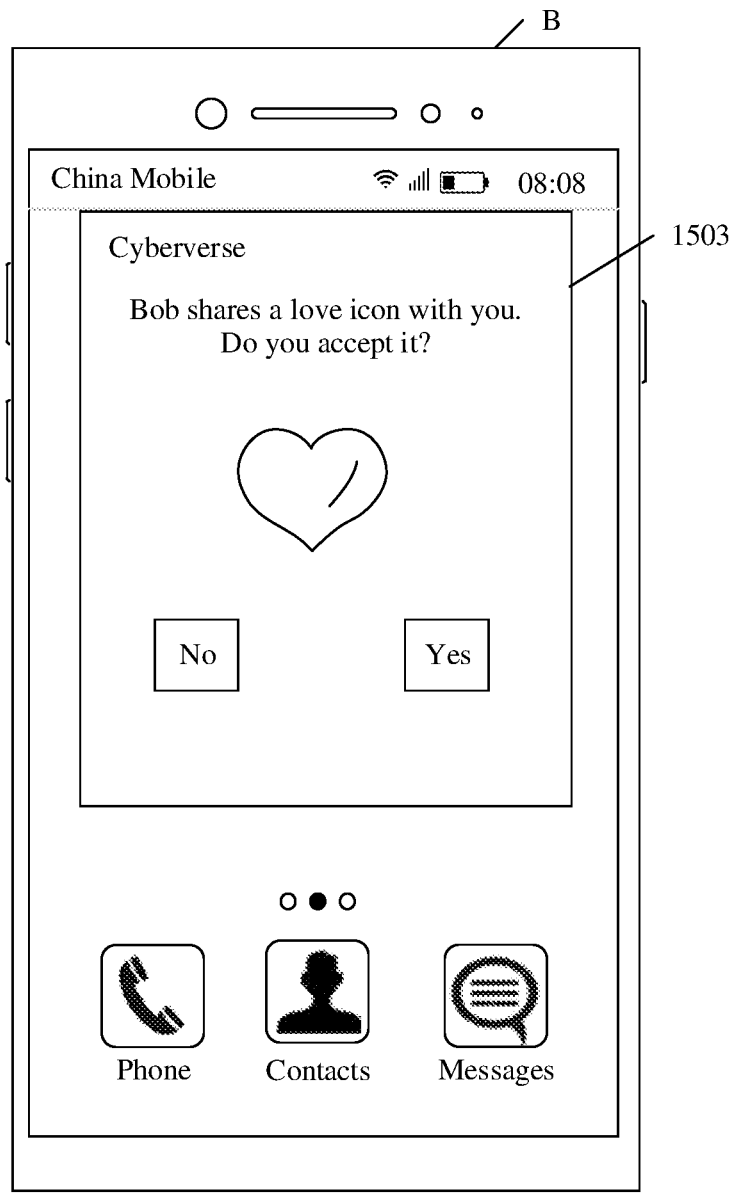
FIG. 15B is a schematic diagram of another first interface according to an embodiment of this application.

For example, the third operation may be a tap operation (for example, a single-tap operation) of the user on the "Yes" button shown in (b) in FIG. 15A. Alternatively, the third operation may be a first preset gesture, for example, an S-shaped gesture, an L-shaped gesture, a √-shaped gesture, or a gesture of any shape, input by the user on the first interface.

S1602: The server C receives the first push response from the mobile phone B, deletes the identifier of the first virtual object from the first virtual information (that is, virtual information of the first ID), and adds the identifier of the first virtual object to the second virtual information (that is, virtual information of the second ID).

The first virtual information includes the first ID and identifiers of a plurality of virtual objects corresponding to the first ID. For example, as shown in Table 4, the first virtual information includes: the first ID, the identifier of the virtual car, the identifier of the emoticon a (for example, the love icon), and the identifier of the virtual rose.

The second virtual information includes the second ID and identifiers of a plurality of virtual objects corresponding to the second ID. For example, as shown in Table 4, the second virtual information includes: the second ID, the identifier of the virtual rose, and the identifier of the emoticon b.

For example, the server C performs S1602, and may delete the identifier of the emoticon a (for example, the love icon) in the first virtual information shown in Table 4-1, and add the identifier of the emoticon a (for example, the love icon) to Table 4-2, to obtain the first virtual information shown in Table 8-1 and the second virtual information shown in Table 8-2.

TABLE 8-1

| First virtual information | |
| --- | --- |
| Account ID of the Cyberverse app | Identifier of a virtual object |
| First ID | Identifier (for example, virtual identifier 3) of a virtual car |
| First ID | Identifier (for example, virtual identifier n) of a virtual rose |

TABLE 8-2

| Second virtual information | |
| --- | --- |
| Account ID of the Cyberverse app | Identifier of a virtual object |
| Second ID | Identifier (for example, virtual identifier 1) of an emoticon a (for example, a love icon) |
| Second ID | Identifier (for example, virtual identifier n) of a virtual rose |
| Second ID | Identifier (for example, virtual identifier 4) of an emoticon b |

S1603: The server C sends a first sharing result to the mobile phone A.

The first sharing result is used to indicate the mobile phone B logging in to the second ID to accept the first virtual object shared by the mobile phone A logging in to the first ID.

S1604: The mobile phone A receives the first sharing result from the server C, and sends first prompt information, where the first prompt information is used to indicate that the first virtual object is successfully shared.

For example, the first prompt information may be "Lucy has received the love icon shared by you!" The mobile phone A may display an interface including the first prompt information. Alternatively, the mobile phone A may send a voice prompt of the first prompt information. This is not limited in this embodiment of this application. It should be noted that S1603 and S1604 are optional. Alternatively, S1603 and S1604 may not be performed in this embodiment of this application.

S1605: The mobile phone B sends a second push response to the server C in response to a fourth operation of the user b on the first interface, where the second push response is used to indicate the mobile phone B to reject the first virtual object shared by the mobile phone A.

The second push response may include the first ID, the second ID, the identifier of the first virtual object, and second indication information. The second indication information is used to indicate the mobile phone B logging in to the second ID to reject the first virtual object shared by the mobile phone A logging in to the first ID.

For example, the fourth operation may be a tap operation (for example, a single-tap operation) of the user on the "No" button shown in (b) in FIG. 15A. Alternatively, the fourth operation may be a second preset gesture, for example, an S-shaped gesture, an L-shaped gesture, a √-shaped gesture, or a gesture of any shape, input by the user on the first interface. The second preset gesture is different from the first preset gesture.

S1606: The server C receives the second push response from the mobile phone B, and the server C does not modify the first virtual information and the second virtual information.

S1607: The server C sends a second sharing result to the mobile phone A.

The second sharing result is used to indicate the mobile phone B logging in to the second ID to reject the first virtual object shared by the mobile phone A logging in to the first ID.

S1608: The mobile phone A receives the second sharing result from the server C, and sends second prompt information, where the second prompt information is used to indicate that the first virtual object fails to be shared.

For example, the second prompt information may be "Lucy refuses to accept the love icon shared by you!", or "Love icon sharing failed". The mobile phone A may display an interface including the second prompt information. Alternatively, the mobile phone A may send a voice prompt of the second prompt information. This is not limited in this embodiment of this application. It should be noted that S1607 and S1608 are optional. Alternatively, S1607 and S1608 may not be performed in this embodiment of this application.

In this embodiment, the server C may update the first virtual information of the first ID and the second virtual information of the second ID based on a sharing result of sharing the first virtual object by the mobile phone A with the mobile phone B. In this way, the server C may store real-time virtual information of each ID, and the electronic device (for example, the mobile phone A or the mobile phone B) may obtain accurate virtual information from the server C.

In some other embodiments, the server C performs S1006. After receiving the first request message from the mobile phone A, the server C may delete the identifier of the first virtual object from the first virtual information (that is, the virtual information of the first ID), and add the identifier of the first virtual object to the second virtual information (that is, the virtual information of the second ID).

In this embodiment, the mobile phone B may accept the first virtual object shared by the mobile phone A, or may reject the first virtual object shared by the mobile phone A. However, regardless of whether the mobile phone B accepts or rejects the first virtual object shared by the mobile phone A, after receiving the first request message, the server C may delete the identifier of the first virtual object from the first virtual information, and add the identifier of the first virtual object to the second virtual information. After S1601, if the server C receives the second push response from the mobile phone B, it indicates that the mobile phone B rejects the first virtual object shared by the mobile phone A, and the server C may delete the identifier of the first virtual object from the second virtual information, and add the identifier of the first virtual object to the first virtual information. After S1601, if the server C receives the first push response from the mobile phone B, the server C does not modify the first virtual information and the second virtual information.

In some embodiments, it is assumed that the first sliding operation is used to trigger the mobile phone A to share, with the second ID corresponding to the user b, the virtual-reality integrated image or video (referred to as Cyberverse shooting sharing of Block X) corresponding to the Cyberverse Block X shooting 1204 shown in FIG. 12(b). After the mobile phone B logging in to the second ID receives the Cyberverse shooting sharing of Block X, the mobile phone B may display a first interface 1601 shown in FIG. 16B. The first interface 1601 is used to prompt the mobile phone B to receive the Cyberverse shooting sharing of Block X from the user a (for example, Bob). The first interface 1601 is further used to request the user b (for example, Lucy) to confirm whether to receive sharing of Bob.

Figure 16B:
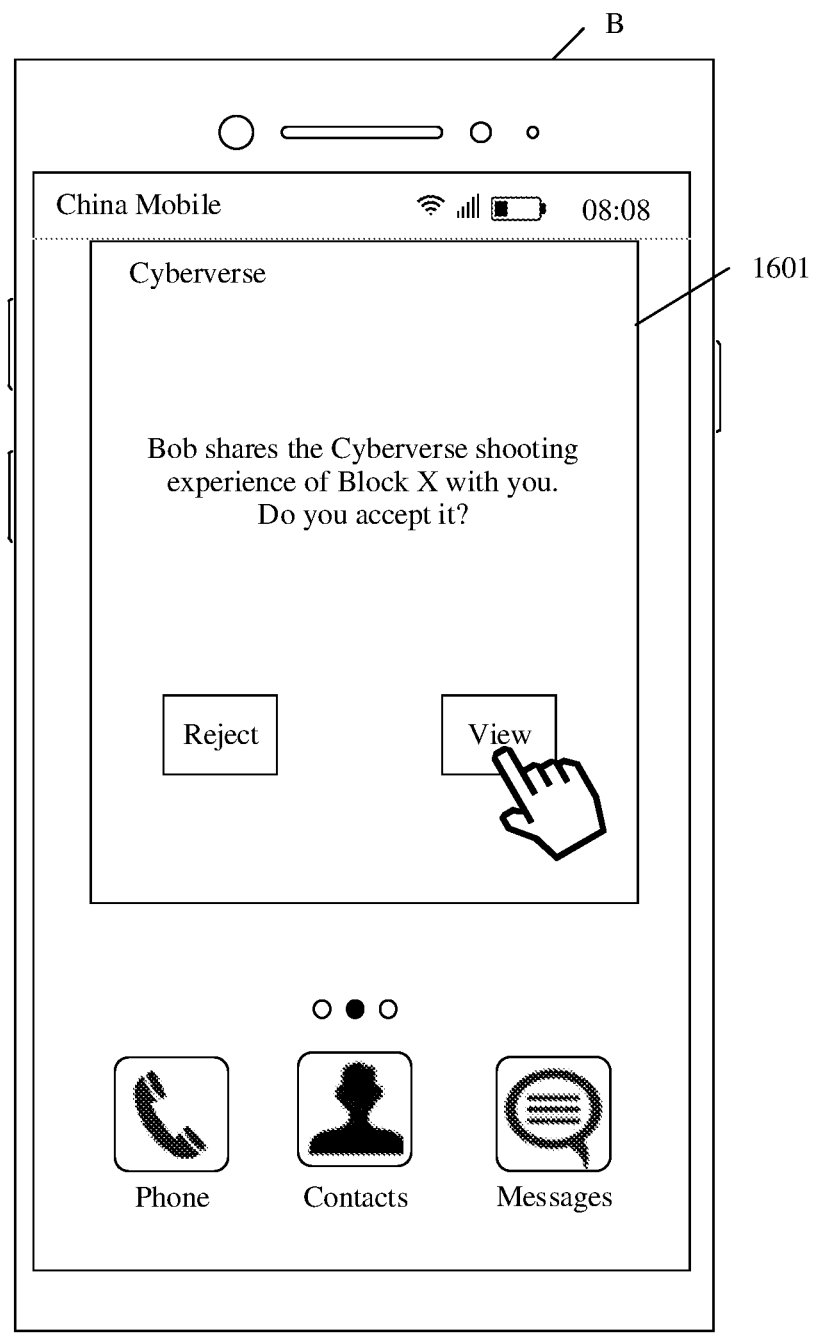
FIG. 16B is a schematic diagram of another interface of a Cyberverse app according to an embodiment of this application.

The mobile phone B may send the second push response to the server C in response to the fourth operation performed by the user b on the first interface, for example, a tap operation performed by Lucy on a "Reject" button on the first interface 1601 shown in FIG. 16B. The mobile phone B may display a Cyberverse experience interface shown in FIG. 16C(a) to FIG. 16C(d) in response to the third operation performed by the user b on the first interface, for example, a tap operation performed by Lucy on a "View" button on the first interface 1601 shown in FIG. 16B. The Cyberverse experience interface includes the first image. The mobile phone B may further send the first push response to the server C in response to the third operation of the user b on the first interface.

Figure 16C:
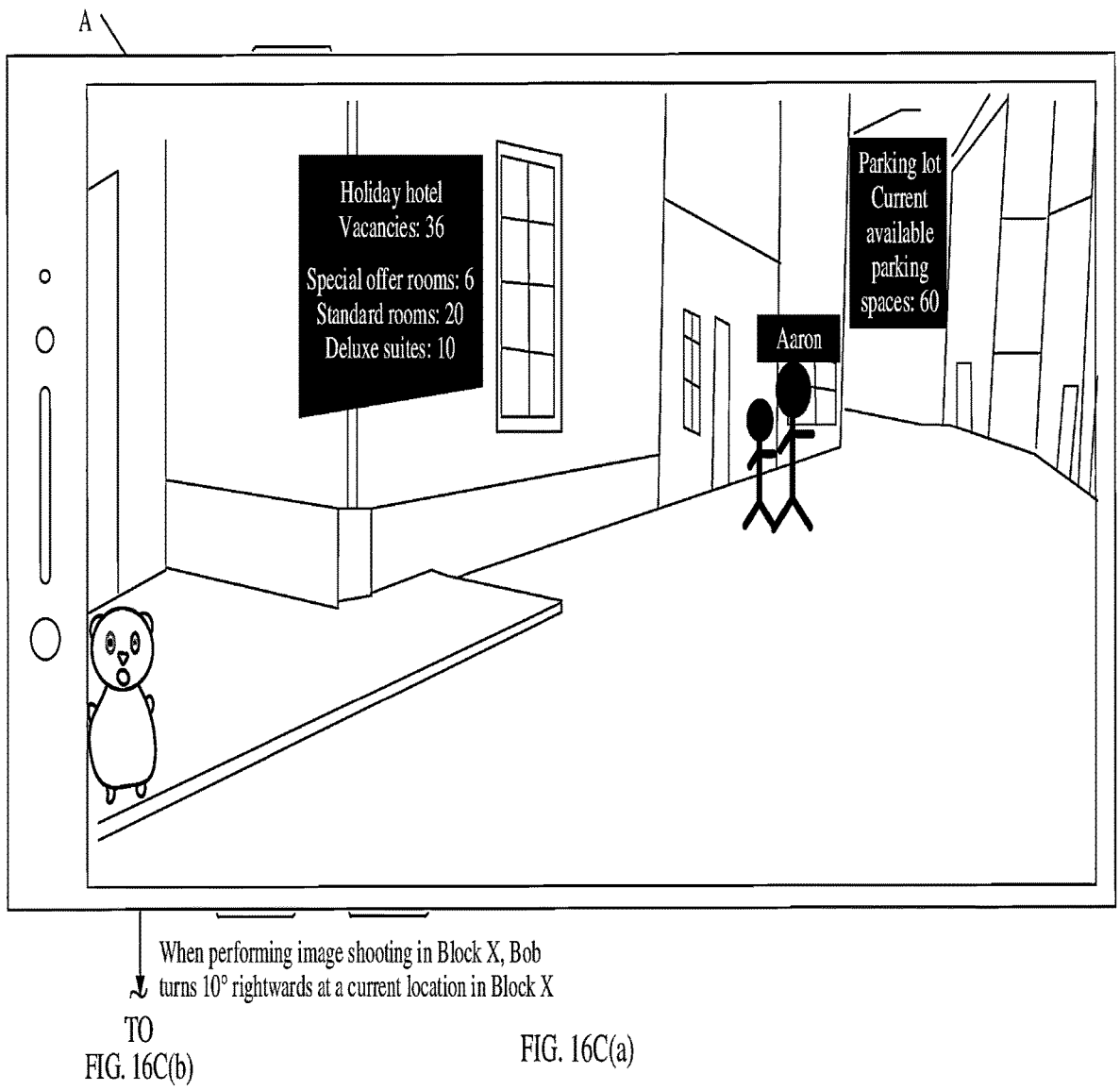
FIG. 16C(a) to FIG. 16C(d) are a schematic diagram of another interface of a Cyberverse app according to an embodiment of this application.
Figure 16C:
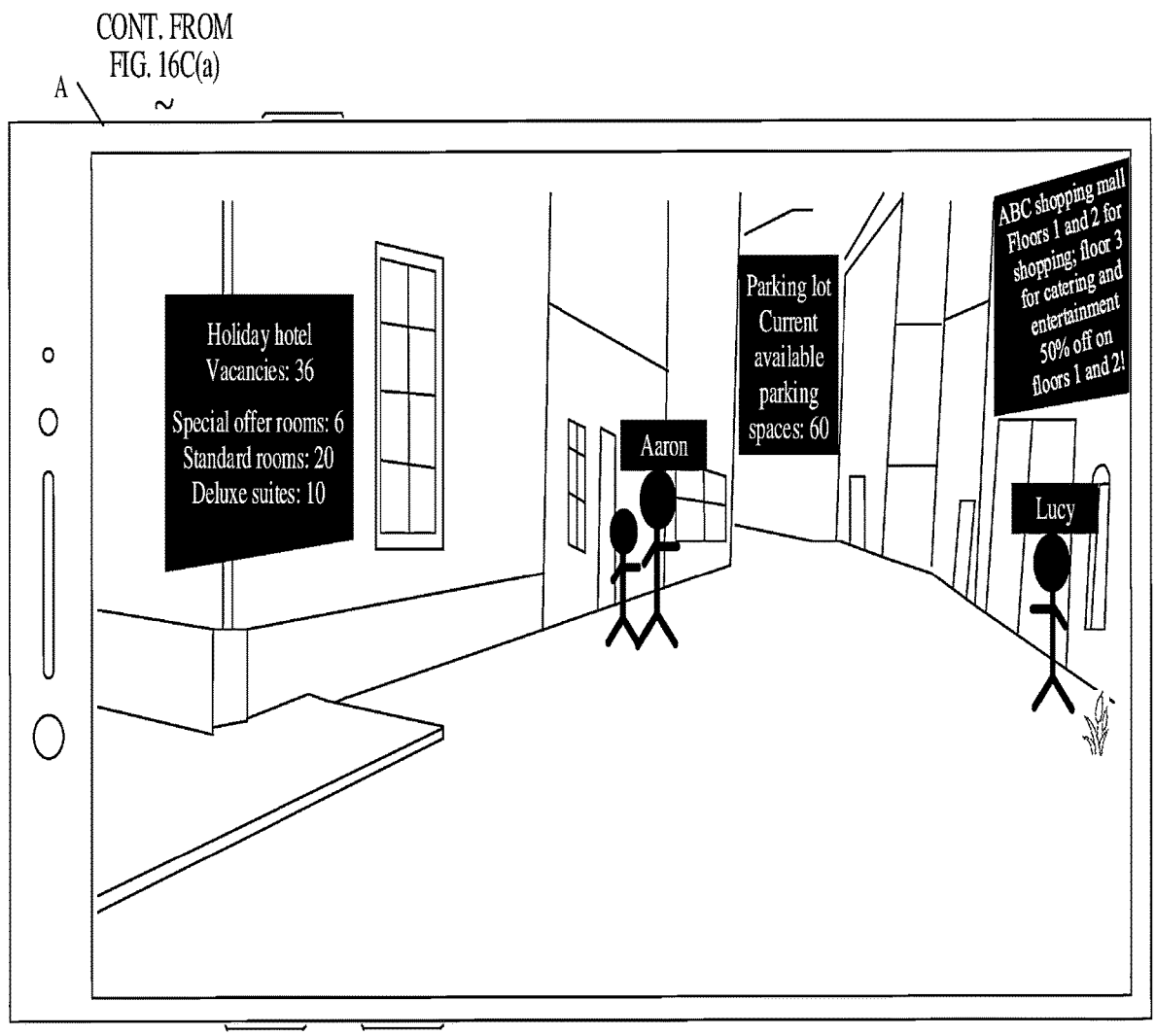
Figure 16C:
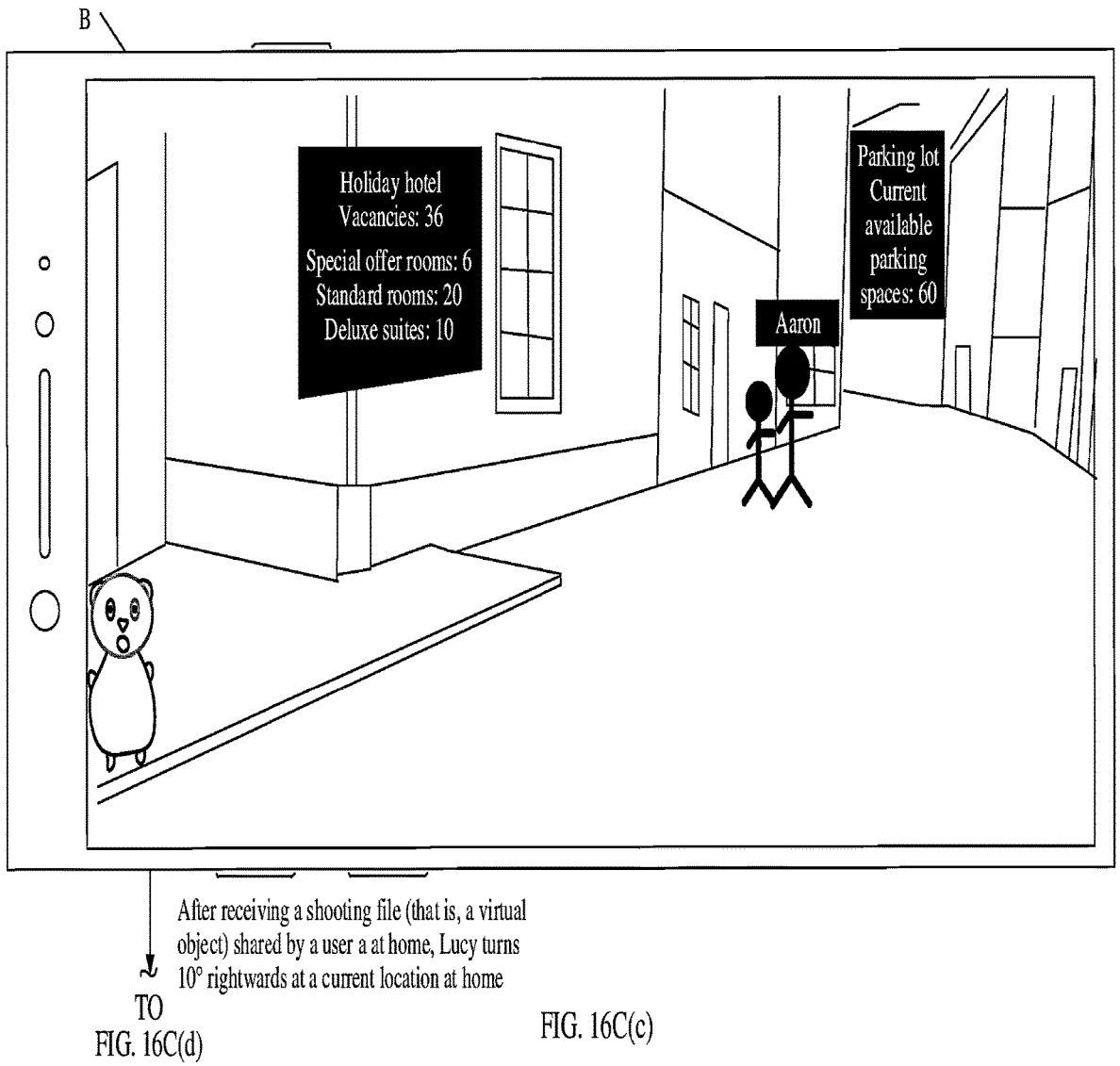
Figure 16C:
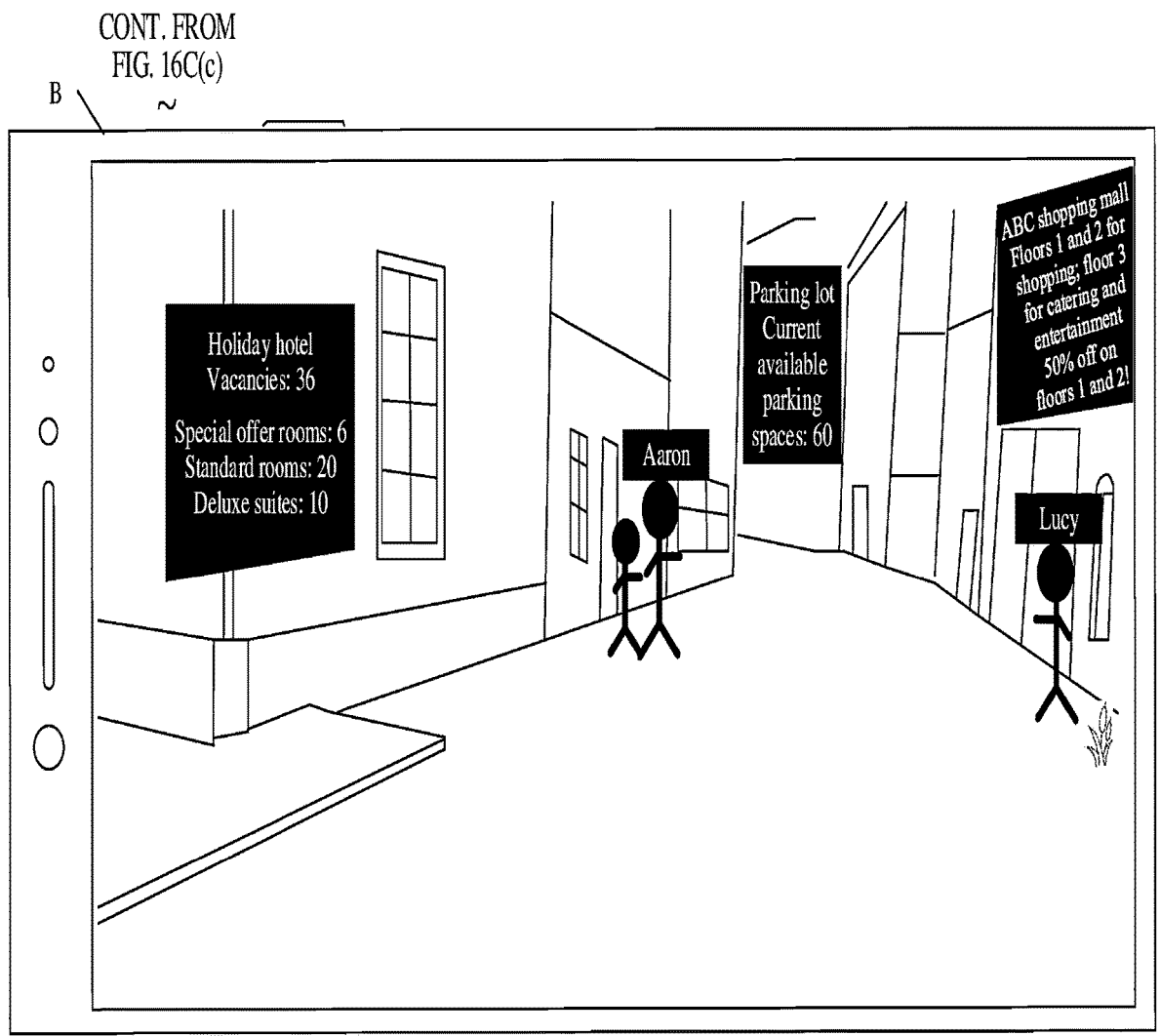

Interfaces shown in FIG. 16C(a) and FIG. 16C(b) are a Cyberverse experience process of Bob in Block X. Refer to FIG. 16C(a). When Bob performs image shooting in Block X, after Bob turns 10° rightwards at a current location in Block X, the mobile phone A may display an interface shown in FIG. 16C(b). After Bob turns 10° rightwards at the current location in Block X, the image and the second 3D identifier of Lucy appear on the display interface of the mobile phone A.

Interfaces shown in FIG. 16C(c) and FIG. 16C(d) are a Cyberverse experience process at home after Lucy accepts the Cyberverse shooting sharing of Block X shared by Bob at home. Refer to FIG. 16C(c). When Lucy turns 10° rightwards at a current location at home, the mobile phone B may display an interface shown in FIG. 16C(d). After Lucy turns 10° rightwards at the current location at home, the image and the second 3D identifier of Lucy appear on the display interface of the mobile phone B.

In this embodiment of this application, the Cyberverse app may play back a file stored after Cyberverse experience. With reference to an operation performed by the user on an existing device, the user can not only view video information in the file, but also perform interactive experience in the Cyberverse app.

In some embodiments, the first interface is used to indicate that the mobile phone B has received the first virtual object from the first ID, and may be further used to present the first virtual object (the virtual model 1205 of the bear shown in FIG. 12(b)) to the user. After the mobile phone B displays the first interface, the user b may view the first virtual object on the first interface. In this embodiment, the first interface may not request the user to confirm whether to accept the first virtual object, but directly displays the first virtual object to the user; or displays the first virtual object to the user in response to an operation of the user.

The following embodiment describes the ground coordinate system and the preset coordinate system of the mobile phone A in the foregoing embodiments, and the Euler angle of the preset coordinate system of the mobile phone A relative to the ground coordinate system.

Figure 17:
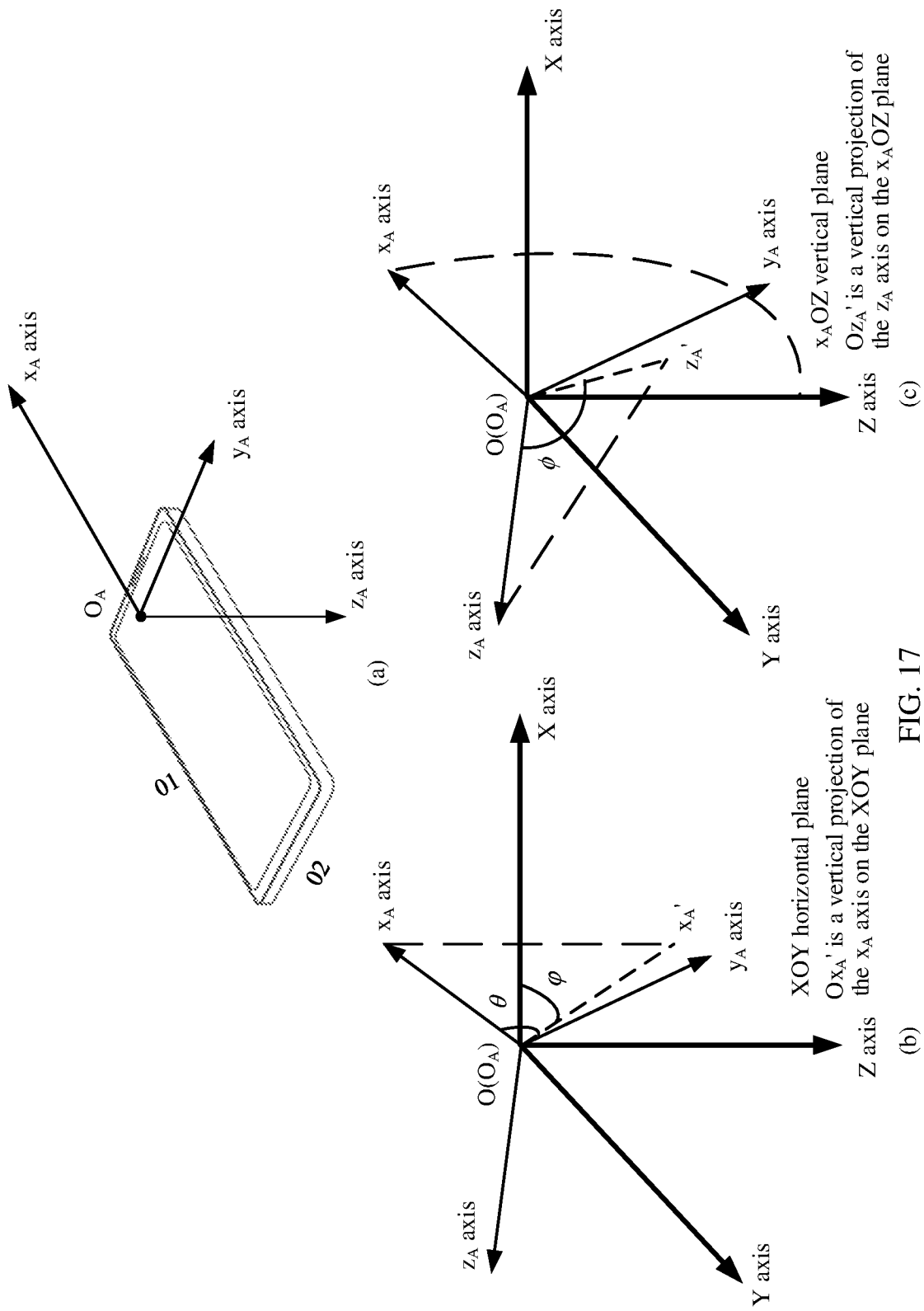
FIG. 17 is a schematic diagram of a preset coordinate system and a ground coordinate system according to an embodiment of this application.

For example, a coordinate system shown in (a) in FIG. 17 is the preset coordinate system of the mobile phone A. A coordinate system shown in (b) in FIG. 17 is the ground coordinate system.

An $x_A$ axis, a $y_A$ axis, and a $z_A$ axis that use $O_A$ as a coordinate origin form a right-hand rectangular coordinate system. The $O_A$ shown in (a) in FIG. 17 may be a location of a camera of a mobile phone. The mobile phone A may include four edges: a long edge 01, a short edge 02, another long edge that is parallel to the long edge 01 and has an equal length, and another short edge that is parallel to the short edge 02 and has an equal length. The $y_A$ axis is parallel to the short edge 02 of the mobile phone. The $x_A$ axis is parallel to the long edge 01 of the mobile phone A and is upward. The $z_A$ axis is perpendicular to the $y_A$ axis, and is perpendicular to the $x_A$ axis.

As shown in (b) in FIG. 17 or (c) in FIG. 17, an X axis, a Y axis, and a Z axis that use O as a coordinate origin form a right-hand rectangular coordinate system. The coordinate origin O shown in (b) in FIG. 17 or (c) in FIG. 17 may be any point in space. The X axis points to any direction in a horizontal plane. The Z axis is perpendicular to a plane where the X axis is located and points to the center of the earth. The Y axis is perpendicular to the X axis, and is perpendicular to the Z axis.

The Euler angle of the preset coordinate system of the mobile phone A relative to the ground coordinate system may include: a pitch (pitch) angle θ, a yaw (yaw) angle φ, and a roll (roll) angle φ of the preset coordinate system of the mobile phone A relative to the ground coordinate system.

The pitch angle θ of the preset coordinate system of the mobile phone A relative to the ground coordinate system may be an included angle between the $x_A$ axis of the preset coordinate system of the mobile phone A and a plane (that is, the horizontal plane) where XOY of the ground coordinate system is located. For example, as shown in (b) in FIG. 17, the pitch angle θ of the preset coordinate system of the mobile phone A relative to the ground coordinate system is an included angle between the $x_A$ axis and the horizontal plane (that is, the plane where XOY is located). As shown in (b) in FIG. 17, $Ox_A'$ (that is, $O_A x_A'$) is a vertical projection of the $x_A$ axis on the horizontal plane (that is, the plane where XOY is located). It may be understood that the pitch angle θ of the preset coordinate system of the mobile phone A relative to the ground coordinate system is an included angle between $Ox_A'$ (that is, $O_A x_A'$) and the $x_A$ axis. When an included angle between the $x_A$ axis and the Z axis is greater than 90°, the pitch angle θ is positive.

As shown in (b) in FIG. 17, the yaw angle φ of the preset coordinate system of the mobile phone A relative to the ground coordinate system is a horizontal angle between an x axis of the preset coordinate system of the mobile phone A and an X axis of the ground coordinate system, that is, an included angle between $Ox_A'$ (that is, $O_A x_A'$) and the X axis of the ground coordinate system. When $Ox_A'$ (that is, $O_A x_A'$) rotates clockwise on the plane where XOY is located with a change of the $x_A$ axis, the yaw angle φ is positive.

As shown in (c) in FIG. 17, the roll angle φ of the preset coordinate system of the mobile phone A relative to the ground coordinate system is an included angle between the $z_A$ axis of the preset coordinate system of the mobile phone A and a vertical plane (that is, a plane where $x_A OZ$ is located) passing through the $x_A$ axis. As shown in (c) in FIG. 17, $Oz_A'$ (that is, $O_A z_A'$) is a vertical projection of the $z_A$ axis on the vertical plane (that is, the plane where $x_A OZ$ is located) passing through the $x_A$ axis. It may be understood that the roll angle φ of the preset coordinate system of the mobile phone A relative to the ground coordinate system is an included angle between $Oz_A'$ (that is, $O_A Z_A'$) and the $z_A$ axis. When the $z_A$ axis rotates clockwise, the roll angle φ is positive.

It should be noted that (a) in FIG. 17 is merely used as an example to describe the preset coordinate system of the mobile phone A. The preset coordinate system of the mobile phone A may be further defined according to another rule. For example, the coordinate origin may alternatively be any other point (for example, a center of gravity) on the mobile phone. Directions of the three axes of the preset coordinate system are not limited to the $x_A$ axis, the $y_A$ axis, and the $z_A$ axis that are shown in (a) in FIG. 17. Settings of a coordinate origin location and a coordinate axis direction of the preset coordinate system of the mobile phone A are not limited in this embodiment of this application.

It may be understood that, to implement the foregoing functions, the electronic device (for example, the mobile phone A or the mobile phone B) includes a corresponding hardware structure and/or software module for performing each function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device (for example, the mobile phone A or the mobile phone B) may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used.

Figure 18:
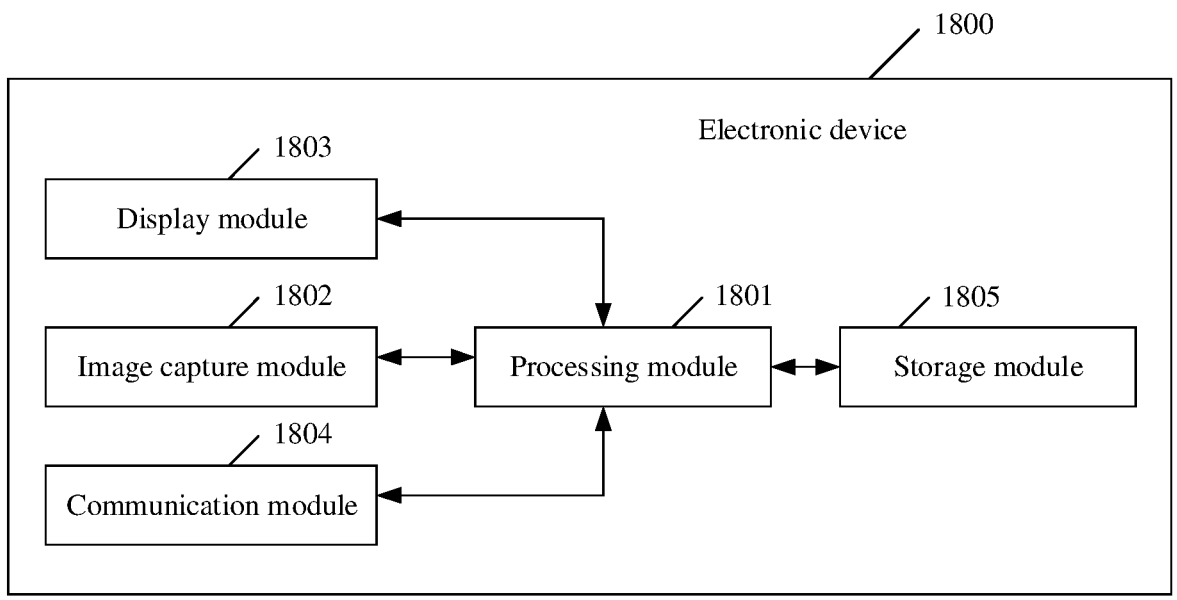
FIG. 18 is a schematic diagram of a structure of an electronic device according to an embodiment of this application.

When an integrated unit is used, FIG. 18 is a schematic diagram of a possible structure of an electronic device 1800 in the foregoing embodiments. The electronic device 1800 may include a processing module 1801, an image capture module 1802, a display module 1803, a communication module 1804, and a storage module 1805.

In some embodiments, the electronic device 1800 is the first device 110 (for example, the mobile phone A) shown in FIG. 1. In this case, the processing module 1801 may be configured to support the electronic device 1800 in performing the operation of "performing AR rendering on the second image to obtain the first image" in S502, S602, S1001, S1002B, and S1002E, the operation of "sending first prompt information" in S1604, the operation of "sending second prompt information" in S1608 in the foregoing method embodiment, and/or another process of the technology described in this specification. The image capture module 1802 may be configured to support the electronic device 1800 in performing the operation of "capturing the second image" in S1002A in the foregoing method embodiment, and/or another process of the technology described in this specification. The display module 1803 may be configured to support the electronic device 1800 in performing the operation of "displaying the first image" in S501, S601, S1002, and S1002E in the foregoing method embodiment, S1003, S1004, and/or another process of the technology described in this specification. The communication module 1804 may be configured to support the electronic device 1800 in performing the operation of "sending location information to the server C", the operation of "sending the user biometric feature or the second image to the server C", the operation of "receiving the 3D model of the digital world from the server C", and the operation of "receiving the second 3D identifier from the server C" in S503 and S603, the operation of "receiving the first sharing result" in S1005 and S1604, the operation of "receiving the second sharing result" in S1608 in the foregoing method embodiment, and/or another process of the technology described in this specification. The storage module 1805 may be configured to support the electronic device 1800 in storing the first virtual information in the foregoing embodiment. The storage module 1805 may be further configured to store program code and data of the electronic device 1800.

Optionally, the electronic device 1800 may further include another function module such as a sensor module. For example, the sensor module is configured to collect location information of the electronic device 1800. Specifically, the sensor module may be configured to support the electronic device 1800 in performing the operation of "collecting data by the preset sensor" in S1002A in the foregoing method embodiment, and/or another process of the technology described in this specification. The communication module is configured to support the electronic device 1800 in communicating with another device.

In some other embodiments, the electronic device 1800 is the second device 120 (for example, the mobile phone B) shown in FIG. 1. In this case, the processing module 1801 may be configured to support the electronic device 1800 in performing the operation of "entering the user biometric feature b" in S505 and S605 in the foregoing method embodiment, and/or another process of the technology described in this specification. The image capture module 1802 may be configured to support the electronic device 1800 in capturing an image of a real world. The display module 1803 may be configured to support the display processing module 1801 of the electronic device 1800 in performing AR rendering on the image of the real world to obtain a virtual-reality integrated image, the operation of "displaying the first interface" in S1008, and/or another process of the technology described in this specification. The communication module 1804 may be configured to support the electronic device 1800 in performing the operation of "sending the second ID and the user biometric feature b to the server C" in S605, the operation of "receiving the first push message" in S1008 in the foregoing method embodiment, S1605, and/or another process of the technology described in this specification. The storage module 1805 may be configured to support the electronic device 1800 in storing the second virtual information, and/or another process of the technology described in this specification. The storage module may be further configured to store program code and data of the electronic device 1800.

It should be noted that, in this embodiment of this application, the first device 110 shown in FIG. 1 may perform the method steps performed by the mobile phone A. In a process of receiving a virtual object shared by another electronic device, the first device 110 may further perform the method steps performed by the mobile phone B. The second device 120 shown in FIG. 1 may perform the method steps performed by the mobile phone B. In a process of sharing a virtual object with another electronic device, the second device 120 may further perform the method steps performed by the mobile phone A.

The processing module 1801 may be a processor or a controller, for example, may be a central processing unit (Central Processing Unit, CPU), a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may include an application processor and a baseband processor. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

For example, the processing module 1801 is one or more processors (the processor 410 shown in FIG. 4), and the storage module 1805 may be a memory (the internal memory 421 shown in FIG. 4). The display module 1803 may be a display (for example, the display 494 shown in FIG. 4). The image capture module 1802 may be a camera (for example, the camera 493 shown in FIG. 4). The sensor module may be the sensor module 480 shown in FIG. 4. The communication module 1804 may be a transceiver (for example, the mobile communication module 450 or the wireless communication module 460 shown in FIG. 4). The electronic device 1800 provided in this embodiment of this application may be the electronic device 400 shown in FIG. 4. The one or more processors, the memory, the camera, the transceiver, the display, and the like may be connected together, for example, connected through a bus.

Figure 19:
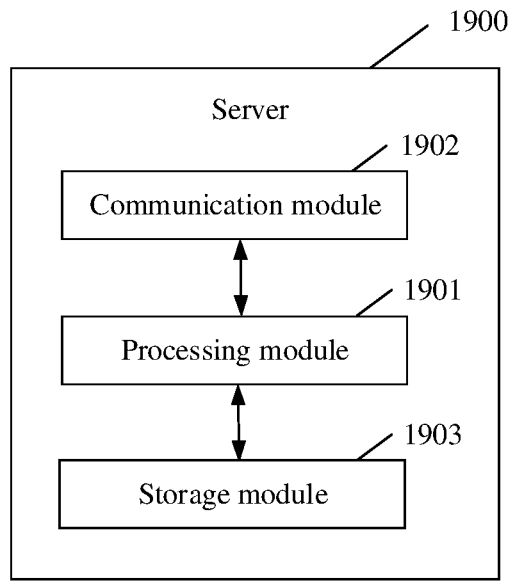
FIG. 19 is a schematic diagram of a structure of a server according to an embodiment of this application.

When an integrated unit is used, FIG. 19 is a schematic diagram of a possible structure of a server 1900 in the foregoing embodiment. The server 1900 may include a processing module 1901, a communication module 1902, and a storage module 1903.

The processing module 1901 may be configured to support the electronic device 1800 in performing the operation of "obtaining the 3D model of the digital world corresponding to the location information in the first message", and the operation of "deleting the identifier of the first virtual object from the first virtual information, and adding the identifier of the first virtual object to the second virtual information" in S1602 in the foregoing method embodiment, and/or another process of the technology described in this specification. The communication module 1902 may be configured to support the electronic device 1800 in performing the operation of "receiving the user biometric feature a", the operation of "receiving the first message from the mobile phone A", the operation of "sending the second message to the mobile phone A", the operation of "receiving the location information from the mobile phone A", the operation of "receiving the user biometric feature or the second image from the mobile phone A", the operation of "sending the 3D model of the digital world to the mobile phone A", and the operation of "sending the second 3D identifier to the mobile phone A" in S504 and S604, the operation of "receiving the first push response" in S1006, S1007, S1601, and S1602 in the foregoing method embodiment, S1603, S1606, S1607, and/or another process of the technology described in this specification. The storage module 1903 may be configured to support the electronic device 1800 in performing the operation of "storing the first ID and the user biometric feature a corresponding to the first ID" in S604, and the operation of "storing the second ID and the user biometric feature b corresponding to the second ID" in S605 in the foregoing method embodiment, and/or another process of the technology described in this specification. The storage module 1903 may be further configured to store program code and data of the server C.

The storage module 1903 may include the user information database 903 and the virtual object database 904 that are shown in FIG. 9A. The processing module 1901 integrates functions of the user management service 901 and the virtual object management service 902 that are shown in FIG. 9A. Alternatively, the storage module 1903 may include the content database 911 shown in FIG. 9B. The processing module 1901 integrates a function of the content management service 910 shown in FIG. 9B.

The processing module 1901 may be one or more processors, and the storage module 1903 may be a memory. The communication module 1902 may be a transceiver (for example, a mobile communication module or a wireless communication module). The one or more processors, the memory, the transceiver, and the like may be connected together, for example, connected through a bus.

Figure 20:
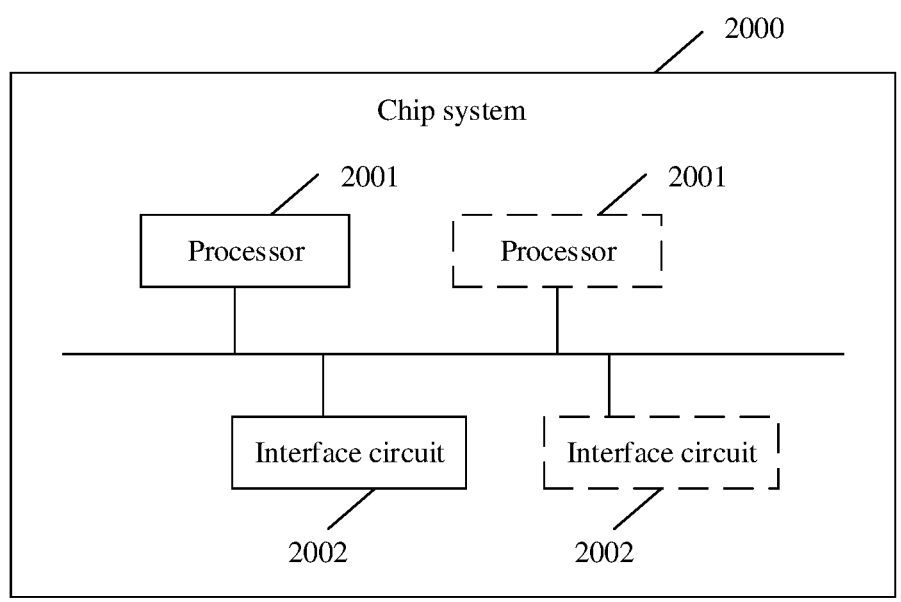
FIG. 20 is a schematic diagram of a structure of a chip system according to an embodiment of this application.

An embodiment of this application further provides a chip system. As shown in FIG. 20, the chip system 2000 includes at least one processor 2001 and at least one interface circuit 2002. The processor 2001 and the interface circuit 2002 may be interconnected through a line. For example, the interface circuit 2002 may be configured to receive a signal from another apparatus (for example, a memory of an electronic device). For another example, the interface circuit 2002 may be configured to send a signal to another apparatus (for example, the processor 2001). For example, the interface circuit 2002 may read instructions stored in a memory, and send the instructions to the processor 2001. When the instructions are executed by the processor 2001, the electronic device is enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device (for example, the first device or the second device) is enabled to perform the functions or the steps performed by the mobile phone in the foregoing method embodiments.

An embodiment of this application further provides a computer storage medium. The computer storage medium includes computer instructions. When the computer instructions are run on the foregoing electronic device, the server is enabled to perform the functions or the steps performed by the server in the foregoing method embodiments.

An embodiment of this application further provides a computer program product. When the computer program product runs on a computer, the computer is enabled to perform the functions or the steps performed by the mobile phone or the server in the foregoing method embodiments.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a first device, wherein a first application is installed on the first device, the first application provides a digital world that is in a 1:1 correspondence with a real world, the first device logs in to a first user account in the first application, and the method comprises:
   receiving, by the first device, a first operation of a second user, wherein the first operation triggers the first device to start the first application, wherein the second user is a user of the first device;
   displaying, by the first device on a display of the first device using the first application, a first image in response to the first operation, wherein the first image is obtained by integrating, using the first application, a plurality of pieces of 3D identification information of the digital world into a second image of the real world captured by a camera of the first device and performing augmented reality (AR) rendering, the first image and the second image each comprise an image of a first user, the plurality of pieces of 3D identification information comprise a first 3D identifier and a second 3D identifier, the first 3D identifier identifies at least a building, a plant, or a mountain scenery in the real world, the second 3D identifier identifies the first user, and the second 3D identifier is obtained based on a user biometric feature of the first user in the second image, and the first user is associated with a second device that logs into a second account in the first application;
   receiving, by the first device, a second operation of the second user;
   displaying, by the first device on the display of the first device using the first application, one or a plurality of virtual objects in response to receiving the second operation, wherein the one or the plurality of virtual objects comprise: an image or a file in the first device, and a virtual model or an emoticon that is provided by a server of the first application and that is configured to be usable for mutual sharing between different user accounts of the first application;
   receiving, by the first device, a first sliding operation of the second user on the display of the first device, wherein a start point of a sliding track of the first sliding operation is a first virtual object in the one or the plurality of virtual objects, and an end point is the image of the first user;
   in response to receiving the first sliding operation, displaying, by the first device, a dynamic image of the first virtual object moving towards the image of the first user along the sliding track, and sending, by the first device, a request message to the server requesting the server to transmit the first virtual object to the second device that logs in to the second account, and the request message carries the second 3D identifier; and after requesting, by the first device, the server to transmit the first virtual object to the second device logging in to the second account, receiving, by the first device, a first sharing result from the server, wherein the first sharing result indicates whether the second device accepts the first virtual object.

2. The method according to claim 1, wherein displaying, by the first device on the display of the first device using the first application, the first image in response to the first operation comprises:
   in response to the first operation, capturing, by the first device, the second image by using the camera, and collecting data by using a preset sensor, wherein the preset sensor comprises at least one of a gyroscope sensor, an acceleration sensor, or a global positioning system (GPS) positioning sensor;
   obtaining, by the first device, location information and posture information of the first device based on the second image and the data collected by the preset sensor, wherein the posture information of the first device indicates a spatial posture of the first device;
   obtaining, by the first device from the server, a 3D model of the digital world corresponding to the location information and the posture information, wherein the 3D model of the digital world comprises the first 3D identifier and garage kit data of an object identified by the first 3D identifier, the garage kit data indicates a three-dimensional structure of the object identified by the first 3D identifier, and the 3D model of the digital world is created based on 3D data of the real world;
   obtaining, by the first device, the second 3D identifier from the server based on the user biometric feature of the first user in the second image, wherein the user biometric feature comprises a face image or iris information of the first user; and
   integrating, by the first device using the first application, the first 3D identifier and the second 3D identifier into the second image based on the 3D model of the digital world, the location information, and the posture information of the first device, performing AR rendering to obtain the first image, and displaying the first image.

3. The method according to claim 2, wherein obtaining, by the first device, the location information and the posture information of the first device based on the second image and the data collected by the preset sensor comprises:
   sending, by the first device to the server, the second image and the data collected by the preset sensor; and
   receiving, by the first device, the location information and the posture information from the server, wherein the location information and the posture information are determined by performing spatial computing based on the second image and the data collected by the preset sensor.

4. The method according to claim 2, wherein obtaining, by the first device, the second 3D identifier from the server based on the user biometric feature of the first user in the second image comprises:
   obtaining, by the first device, the user biometric feature in the second image;
   sending, by the first device, the user biometric feature to the server; and
   receiving, by the first device, the second account and the second 3D identifier of the second account from the server, wherein the second account is associated with the first user and corresponds to the user biometric feature.

5. The method according to claim 2, wherein obtaining, by the first device, the second 3D identifier from the server based on the user biometric feature of the first user in the second image comprises:
   sending, by the first device, the second image to the server, wherein the second image comprises the user biometric feature; and
   receiving, by the first device, the second account and the second 3D identifier of the second account from the server, wherein the second account is associated with the first user and corresponds to the user biometric feature.

6. The method according to claim 2, wherein:
   a location of the second 3D identifier in the first image is preset based on a location of the user biometric feature in the second image; or
   a location of the second 3D identifier in the first image is determined based on location information of the second device, and the location information of the second device is obtained by the first device from the server.

7. The method according to claim 1, wherein displaying, by the first device, the one or the plurality of virtual objects in response to the second operation comprises:
   obtaining, by the first device, first virtual information in response to the second operation, wherein the first virtual information comprises an identifier of a virtual object downloaded by the first user account from the server or an identifier of a virtual object shared by another account with the first user account; and
   displaying, by the first device, the one or the plurality of virtual objects indicated by the first virtual information.

8. The method according to claim 7, further comprising:
   deleting, by the first device, an identifier of the first virtual object from the first virtual information in response to the first sliding operation.

9. The method according to claim 1,
   wherein the first sharing result indicates that the second device accepts the first virtual object; and
   wherein the method further comprises: sending, by the first device, first prompt information, wherein the first prompt information indicates that the first virtual object is successfully shared.

10. The method according to claim 1, further comprising:
    displaying, by the first device, a user biometric feature recording interface in response to a first event, wherein the user biometric feature recording interface is usable to record a user biometric feature, and the user biometric feature comprises a face image or iris information;
    receiving, by the first device, a user biometric feature of the second user that is entered by the second user on the user biometric feature recording interface; and
    sending, by the first device, the first user account and the user biometric feature of the second user to the server.

11. An electronic device, comprising:
    a wireless communication interface;
    a non-transitory memory;
    a display;
    a camera; and
    one or more processors;
    wherein the wireless communication interface, the memory, the display, and the camera are coupled to the one or more processors;
    wherein a first application is installed on the electronic device, the first application provides a digital world that is in a 1:1 correspondence with a real world, and the electronic device logs in to a first account in the first application; and wherein the non-transitory memory is configured to store computer program code, the computer program code comprises computer instructions, and when the computer instructions are executed by the processor, the electronic device is enabled to perform the following operations:

receiving a first operation of a second user, wherein the first operation triggers the electronic device to start the first application, wherein the second user is a user of the electronic device;

displaying, on the display using the first application, a first image in response to the first operation, wherein the first image is obtained by integrating a plurality of pieces of 3D identification information of the digital world into a second image of the real world captured by the camera and performing augmented reality (AR) rendering, the first image and the second image each comprise an image of a first user, the plurality of pieces of 3D identification information comprise a first 3D identifier and a second 3D identifier, the first 3D identifier identifies at least a building, a plant, or a mountain scenery in the real world, the second 3D identifier identifies the first user, the second 3D identifier is obtained based on a user biometric feature of the first user in the second image, and the first user is associated with a second device that logs into a second account in the first application;

receiving a second operation of the user;

displaying, on the display using the first application, one or a plurality of virtual objects in response to the second operation, wherein the one or the plurality of virtual objects comprise: an image or a file in the electronic device, and a virtual model or an emoticon that is provided by a server of the first application and that is configured to be usable for mutual sharing between different user accounts of the first application;

receiving a first sliding operation of the user on the display, wherein a start point of a sliding track of the first sliding operation is a first virtual object in the plurality of virtual objects, and an end point is the image of the first user;

in response to receiving the first sliding operation, displaying a dynamic image of the first virtual object moving towards the image of the first user along the sliding track, and sending a request message to the server requesting the server to transmit the first virtual object to the second device logging in to the second account, wherein the second account is associated with the first user, and the request message carries the second 3D identifier; and after requesting the server to transmit the first virtual object to the second device logging in to the second account, receiving a first sharing result from the server, wherein the first sharing result indicates whether the second device accepts the first virtual object.

12. The electronic device according to claim 11, wherein when the computer instructions are executed by the one or more processors, the electronic device is enabled to further perform the following operations:

in response to receiving the first operation, capturing the second image by using the camera, and collecting data by using a preset sensor, wherein the preset sensor comprises at least one of a gyroscope sensor, an acceleration sensor, or a global positioning system (GPS) positioning sensor;

obtaining location information and posture information of the electronic device based on the second image and the data collected by the preset sensor, wherein the posture information of the electronic device indicates a spatial posture of the electronic device;

obtaining, from the server, a 3D model of the digital world corresponding to the location information and the posture information, wherein the 3D model of the digital world comprises the first 3D identifier and garage kit data of an object identified by the first 3D identifier, the garage kit data indicates a three-dimensional structure of the object identified by the first 3D identifier, and the 3D model of the digital world is created based on 3D data of the real world;

obtaining the second 3D identifier from the server based on the user biometric feature of the first user in the second image, wherein the user biometric feature comprises a face image or iris information; and integrating, using the first application, the first 3D identifier and the second 3D identifier into the second image based on the 3D model of the digital world, and the location information and the posture information of the electronic device, performing AR rendering to obtain the first image, and displaying the first image.

13. The electronic device according to claim 12, wherein when the computer instructions are executed by the one or more processors, the electronic device is enabled to further perform the following operations:

sending, to the server, the second image and the data collected by the preset sensor; and receiving the location information and the posture information of the electronic device from the server, wherein the location information and the posture information are determined by performing spatial computing based on the second image and the data collected by the preset sensor.

14. The electronic device according to claim 12, wherein when the computer instructions are executed by the one or more processors, the electronic device is enabled to further perform the following operations:

obtaining the user biometric feature of the first user in the second image;

sending the user biometric feature of the first user to the server; and receiving the second account and the second 3D identifier of the second account from the server, wherein the second account is associated with the first user and corresponds to the user biometric feature of the first user.

15. The electronic device according to claim 12, wherein when the computer instructions are executed by the one or more processors, the electronic device is enabled to further perform the following operations:

sending the second image to the server, wherein the second image comprises the user biometric feature of the first user; and receiving the second account and the second 3D identifier of the second account from the server, wherein the second account is associated with the first user and corresponds to the user biometric feature of the first user.

16. The electronic device according to claim 11, wherein:

a location of the second 3D identifier in the first image is preset based on a location of the user biometric feature of the first user in the second image; or a location of the second 3D identifier in the first image is determined based on location information of the second device, and the location information of the second device is obtained by the electronic device from the server.

17. The electronic device according to claim 11, wherein when the computer instructions are executed by the one or more processors, the electronic device is enabled to further perform the following operations:
  obtaining first virtual information in response to the second operation, wherein the first virtual information comprises an identifier of a virtual object downloaded by the first account from the server, or an identifier of a virtual object shared by another account with the first account; and
  displaying the one or the plurality of virtual objects indicated by the first virtual information.

18. The electronic device according to claim 17, wherein when the computer instructions are executed by the one or more processors, the electronic device is enabled to further perform the following operations:
  deleting an identifier of the first virtual object from the first virtual information in response to the first sliding operation.

19. The electronic device according to claim 11,
  wherein the first sharing result indicates that the second device accepts the first virtual object; and
  wherein when the computer instructions are executed by the one or more processors, the electronic device is enabled to further perform the following operations: sending first prompt information, wherein the first prompt information indicates that the first virtual object is successfully shared.

* * * * *